United States Patent
Kim et al.

(10) Patent No.: US 12,041,680 B2
(45) Date of Patent: Jul. 16, 2024

(54) METHOD AND APPARATUS FOR COMMUNICATION IN NEXT-GENERATION MOBILE COMMUNICATION SYSTEM

(71) Applicant: Samsung Electronics Co., Ltd., Suwon-si (KR)

(72) Inventors: Soenghun Kim, Suwon-si (KR); Sangbum Kim, Suwon-si (KR); Jaehyuk Jang, Suwon-si (KR); Donggun Kim, Seoul (KR); Gert-Jan Van Lieshout, Middlesex (GB); Himke Van Der Velde, Middlesex (GB); Alexander Sayenko, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 184 days.

(21) Appl. No.: 17/168,710

(22) Filed: Feb. 5, 2021

(65) Prior Publication Data

US 2021/0160952 A1 May 27, 2021

Related U.S. Application Data

(63) Continuation of application No. 15/715,810, filed on Sep. 26, 2017, now Pat. No. 10,917,932.

(30) Foreign Application Priority Data

Sep. 26, 2016 (KR) .......................... 10-2016-0123440

(51) Int. Cl.
*H04W 76/27* (2018.01)
*H04W 12/03* (2021.01)
(Continued)

(52) U.S. Cl.
CPC ........... *H04W 76/27* (2018.02); *H04W 12/03* (2021.01); *H04W 72/1273* (2013.01);
(Continued)

(58) Field of Classification Search
CPC . H04W 76/27; H04W 12/03; H04W 72/0406; H04W 72/1273; H04W 76/19;
(Continued)

(56) References Cited

U.S. PATENT DOCUMENTS

| 8,768,305 B1 | 7/2014 | Singh et al. |
| 2010/0184438 A1 | 7/2010 | Wu |

(Continued)

FOREIGN PATENT DOCUMENTS

| CN | 101888684 A | 11/2010 |
| CN | 104756593 A | 7/2015 |

(Continued)

OTHER PUBLICATIONS

Ericsson. "Security k1r HBC suspend and resume" 3GPP TSG-SA WG3 Meeting #83 S3-160822 San Jose Del Cabo, Mexico, May 9-13, 2016 (Year: 2016).*

(Continued)

*Primary Examiner* — Umair Ahsan
(74) *Attorney, Agent, or Firm* — Jefferson IP Law, LLP

(57) ABSTRACT

The present disclosure relates to a communication method and system for converging a 5$^{th}$-Generation (5G) communication system for supporting higher data rates beyond a 4$^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method for operating a terminal is provided. The method includes receiving a first radio resource control (RRC) message including information for RRC connection suspension, maintaining a signaling radio bearer (SRB) 0 and suspending a data radio bearer (DRB) and at least one (Continued)

other SRB based on the first RRC message, transmitting, to a base station, a second RRC message for requesting RRC connection resumption through the SRB0, receiving, from the base station, a third RRC message for the RRC connection resumption through an SRB1, and resuming an SRB2 and the DRB based on the third RRC message.

12 Claims, 59 Drawing Sheets

(51) Int. Cl.
    *H04W 12/04*     (2021.01)
    *H04W 72/1273*     (2023.01)
    *H04W 72/20*     (2023.01)
    *H04W 76/19*     (2018.01)
    *H04W 76/28*     (2018.01)
    *H04B 7/0413*     (2017.01)
    *H04W 72/1268*     (2023.01)

(52) U.S. Cl.
    CPC .......... *H04W 72/20* (2023.01); *H04B 7/0413* (2013.01); *H04W 12/04* (2013.01); *H04W 72/1268* (2013.01); *H04W 76/19* (2018.02); *H04W 76/28* (2018.02)

(58) Field of Classification Search
    CPC . H04W 76/28; H04W 12/04; H04W 72/1268; H04B 7/0413
    See application file for complete search history.

(56) References Cited

U.S. PATENT DOCUMENTS

| | | | |
|---|---|---|---|
| 2011/0117905 | A1 | 5/2011 | Huang et al. |
| 2013/0039287 | A1 | 2/2013 | Rayavarapu et al. |
| 2014/0128058 | A1 | 5/2014 | Ji et al. |
| 2015/0282248 | A1 | 10/2015 | Lee et al. |
| 2016/0255675 | A1 | 9/2016 | Van Lieshout et al. |
| 2016/0262194 | A1 | 9/2016 | Zhang et al. |
| 2017/0202047 | A1 | 7/2017 | Tiwari et al. |
| 2017/0290072 | A1 | 10/2017 | Chen et al. |
| 2018/0035484 | A1 | 2/2018 | Kim et al. |
| 2018/0092156 | A1 | 3/2018 | Kim et al. |
| 2019/0037395 | A1 | 1/2019 | Lehtovirta et al. |
| 2019/0037629 | A1 | 1/2019 | Ryu et al. |
| 2019/0052607 | A1* | 2/2019 | Ohlsson .............. H04W 12/041 |
| 2019/0124710 | A1* | 4/2019 | Stattin ................... H04L 63/061 |
| 2019/0174366 | A1 | 6/2019 | Susitaival et al. |
| 2019/0191483 | A1* | 6/2019 | Ryoo ................ H04W 12/0433 |
| 2021/0185759 | A1* | 6/2021 | Ohlsson ................ H04W 76/27 |

FOREIGN PATENT DOCUMENTS

| | | | | |
|---|---|---|---|---|
| CN | 105706387 | A | | 6/2016 |
| CN | 107734639 | B * | 8/2019 | .......... H04W 68/005 |
| EP | 2 557 889 | A1 | | 2/2013 |
| EP | 3407666 | A1 | | 11/2018 |
| EP | 3 487 258 | A1 | | 5/2019 |
| WO | 2015/070445 | A1 | | 5/2015 |
| WO | 2017/200477 | A1 | | 11/2017 |
| WO | 2018/029621 | A1 | | 2/2018 |

OTHER PUBLICATIONS

Ericsson, Security for RRC Connection Suspend and Resume procedure in solution 18 for Narrow Band CIoT, 3GPP TSG-SA WG3 Meeting #82 S3-160157, Dubrovnik, Croatia, Feb. 1-5, 2016. (Year: 2016).*
Chinese Office Action dated Jun. 9, 2021, issued in Chinese Application No. 201780059438.9.
Ericsson: "Corrections to C-IoT optimisations in Stage-2", 3GPP Draft; 36300_CR0909R1_(REL-13)_R2-165844, 3rd Generation Partnership Project (3GPP), Mobile Competence Centre; 650, Route Des Lucioles; F-06921 Sophia-Antipolis Cedex; France, vol. RAN WG2, No. Gothenburg, Sweden; Aug. 22, 2016-Aug. 26, 2016; Sep. 22, 2016 (Sep. 22, 2016), XP051160910, Retrieved from the Internet: URL:http://www.3gpp.org/ftp/tsg_ran/WG2_RL2/SpecificationsI201609_draft_specs_after_RAN_73/; [retrieved on Sep. 22, 2016].
Ericsson et al: "Security for RRC suspend and resume", 3GPP Draft; 33401_CR0580R1_(REL-13_S3-160822_MERGE590_532_CR_RRCRESUME, 3rd Generation Partnership Project (3GPP), Mobile Competence Centre; 650, Route Des Lucioles; F-06921 Sophia-Antipolis Cedex, vol. SA WG3, No. San Jose Del Cabo, Mexico; May 9, 2016-May 13, 2016, Jun. 12, 2016 (Jun. 12, 2016), XP051110487, Retrieved from the Internet: URL:http://www.3gpp.org/ftp/Meetings_3GPP_SYNC/tsg_sa/SA/Docs/; [retrieved on Jun. 12, 2016].
Ericsson: "Security for RRC Connection Suspend and Resume", 3GPP Draft; S3-160588_NBCIOT Disc Paper_RRC Resume_Fin, 3rd Generation Partnership Project (3GPP), Mobile Competence Centre; 650, Route Des Lucioles ; F-06921 Sophia-Antipolis Cedex ; France, vol. SA WG3, No. San Jose Del Cabo, Mexico; May 9, 2016-May 13, 2016, May 8, 2016 (May 8, 2016), XP051099204, Retrieved from the Internet: URL:http://www.3gpp.org/ftp/Meetings_3GPP_SYNC/Docs/; [retrieved on May 8, 2016].
Extended European Search Report dated Aug. 29, 2019, issued in European Application No. 17853499.6-1231.
Indian Office Action dated Oct. 18, 2022, issued in Indian Application No. 202138053100.
Ericsson (Rapporteur), "Email discussion report on Message 3 size for NB-IoT," 3GPP TSG-RAN WG2 #93 Tdoc R2-161745, Malta, Feb. 15-19, 2016.
Sequans Communications, "Early RRC Connection Release for UP solution," 3GPP TSG-RAN WG2 NB-IOT Ad-hoc Meeting #2 R2-163252, Sophia Antipolis, France, May 3-4, 2016.
Ericsson, Security for RRC Connection Suspend and Resume procedure in solution 18 for Narrow Band CIoT, 3GPP TSG-SA WG3 Meeting #82 S3-160157, Dubrovnik, Croatia, Feb. 1-5, 2016.
Ericsson, "Security solution for Infrequent Small Data," 3GPP TSG SA WG3 (Security) Adhoc Meeting on FS_NSA S3-161408, Sep. 27-29, 2016, San Diego, USA.
Notice of Allowance dated Feb. 24, 2023, issued in the Korean Application No. 10-2019-7007019.
European Search Report dated May 8, 2023, issued in European Application No. 23153733.3.
Korean Office Action with English translation dated Jan. 31, 2024; Korean Appln. No. 10-2023-7017540.

* cited by examiner

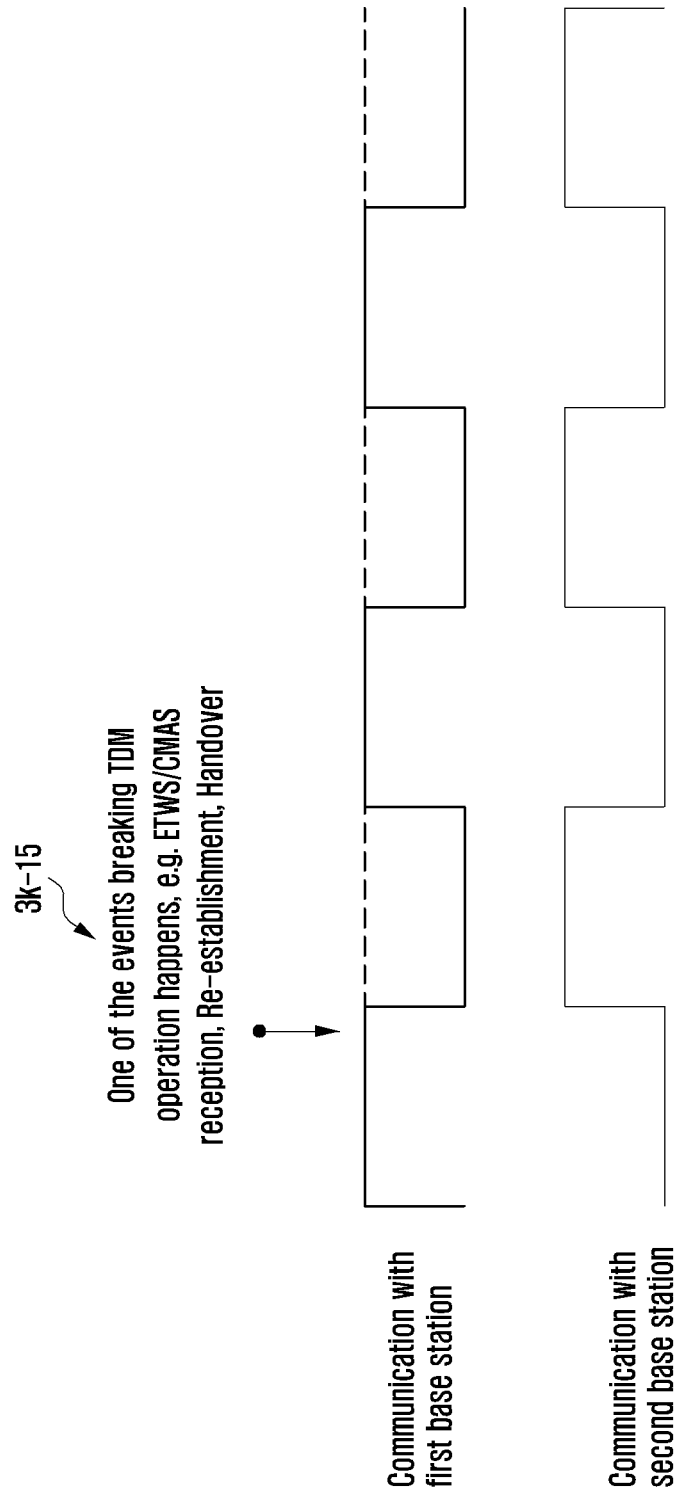

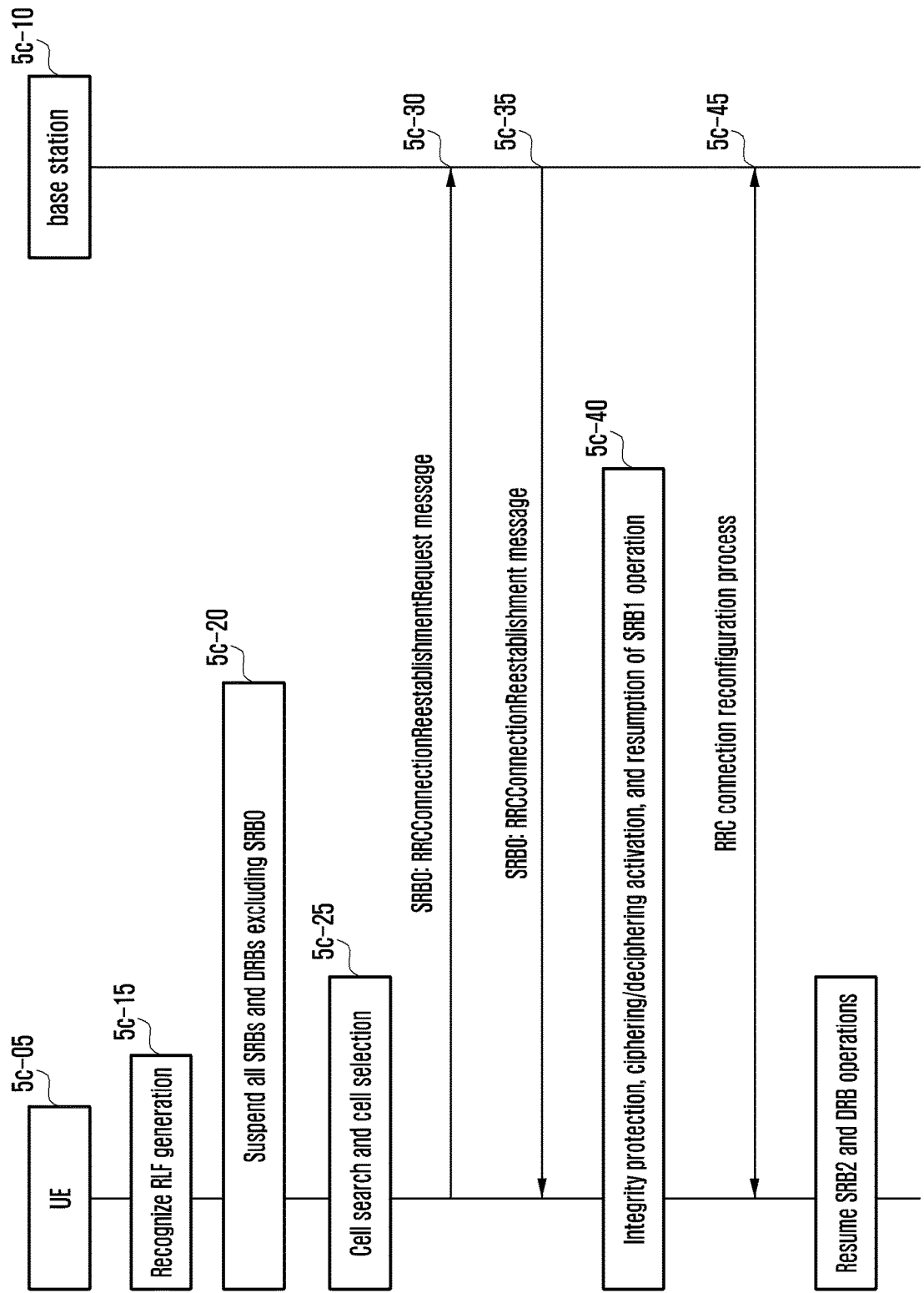

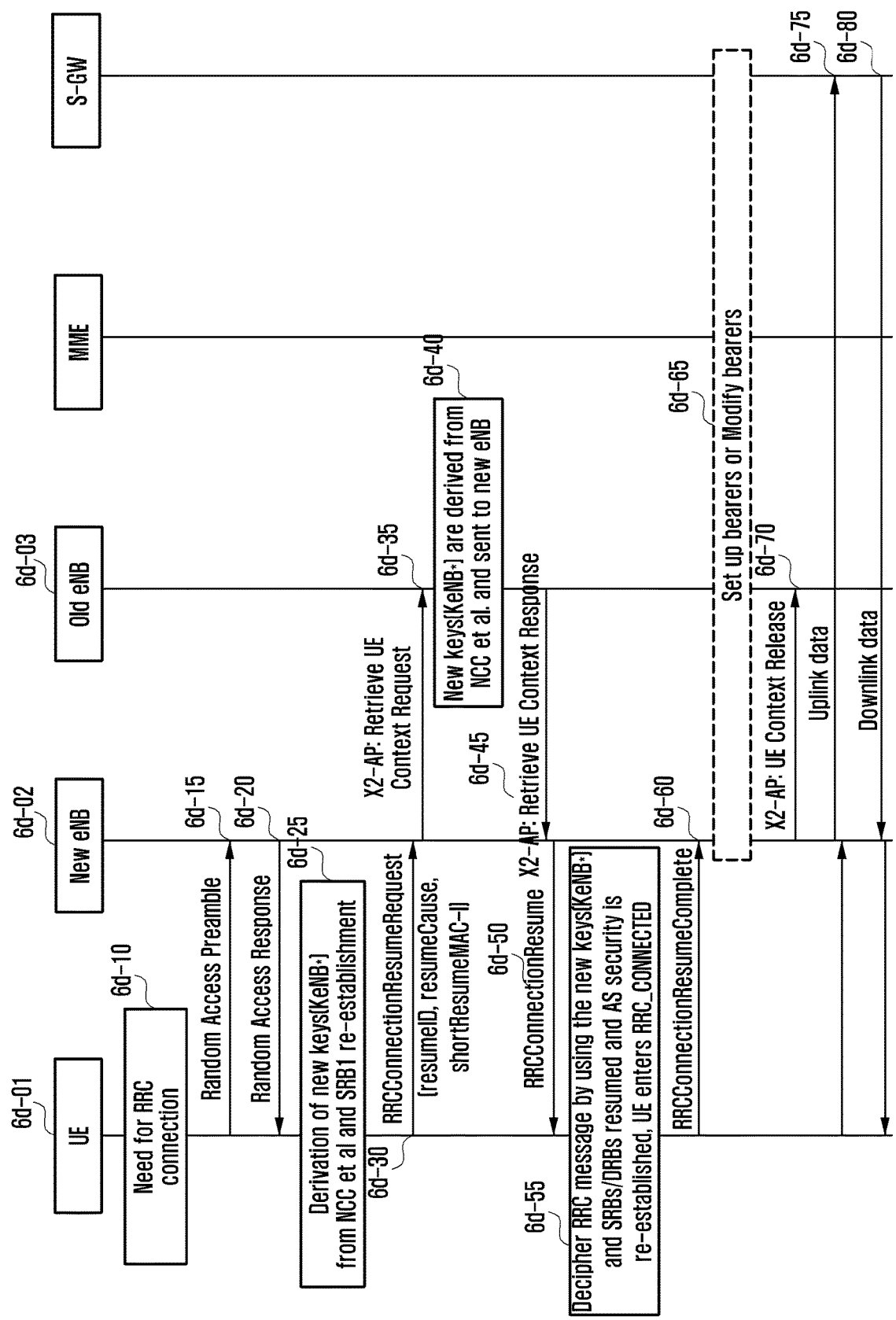

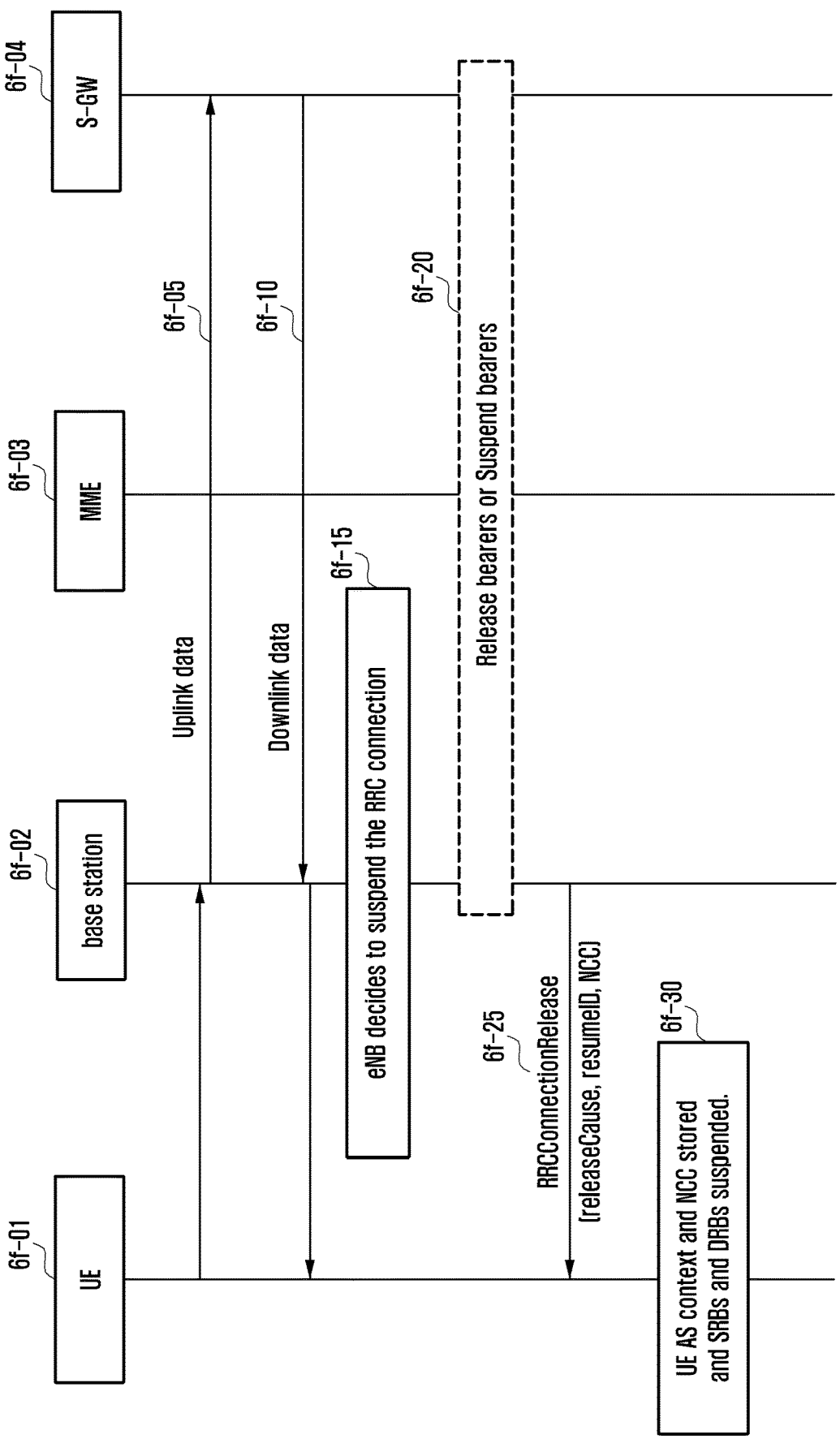

METHOD AND APPARATUS FOR COMMUNICATION IN NEXT-GENERATION MOBILE COMMUNICATION SYSTEM

CROSS-REFERENCE TO RELATED APPLICATION(S)

This application is a continuation application of prior application Ser. No. 15/715,810, filed on Sep. 26, 2017, which has issued as U.S. Pat. No. 10,917,932 on Feb. 9, 2021; and which is based on and claims the benefit under 35 U.S.C. § 119(a) of a Korean patent application filed on Sep. 26, 2016 in the Korean Intellectual Property Office and assigned Application No. 10-2016-0123440, the entire disclosure of each of which is hereby incorporated by reference.

TECHNICAL FIELD

The present disclosure relates to a method and an apparatus for communication in a next-generation mobile communication system. More particularly, the present disclosure relates to a method and an apparatus for configuring and transmitting a physical uplink control channel (PUCCH) in a next-generation mobile communication system using an analog beamforming technology together with the use of a plurality of antennas.

BACKGROUND

To meet the demand for wireless data traffic having increased since deployment of fourth-generation (4G) communication systems, efforts have been made to develop an improved fifth generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a RAN as the above-described Big Data processing technology may also be considered to be as an example of convergence between the 5G technology and the IoT technology.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below.

At present, in a long term evolution (LTE) system, a physical uplink control channel (PUCCH) resource is allocated and configured using a time resource and a frequency resource, and a PUCCH is transmitted using the PUCCH resource. However, in the case of using an analog beamforming technology together with a plurality of antennas in the next-generation mobile communication system, it is necessary to consider a beam direction. Further, if a new cell is defined or a new base station structure is defined, a method for configuring and transmitting a PUCCH becomes necessary to be suitable thereto. Accordingly, an aspect of the present disclosure is to provide a method and an apparatus for configuring and transmitting a PUCCH in the next-generation mobile communication system.

Another aspect of the present disclosure is to provide an apparatus and a method for packet loss recovery during providing of multiple connections in a wireless communication system.

Another aspect of the present disclosure proposes a method for a terminal to measure a signal in a wireless communication system performing a beam-based communication.

Another aspect of the present disclosure is to provide a signaling radio bearer (SRB)-related configuration and operation in order for a terminal and a base station to correctly send and receive a control message in the case where the base station and the terminal perform, if needed, a procedure of resuming their connection after suspending the connection in a wireless communication system.

Another aspect of the present disclosure is to provide operations of a base station and a terminal in order for the base station and the terminal to correctly send and receive a control message in the case where they resume, if needed, their connection after suspending the connection in a wireless communication system.

In accordance with an aspect of the present disclosure, a method for operating a terminal is provided. The method includes receiving a first radio resource control (RRC) message including information for RRC connection suspension, maintaining a signaling radio bearer (SRB) 0 and suspending a data radio bearer (DRB) and at least one other SRB based on the first RRC message, transmitting, to a base station, a second RRC message for requesting RRC connection resumption through the SRB0, receiving, from the base station, a third RRC message for the RRC connection resumption through an SRB1, and resuming an SRB2 and the DRB based on the third RRC message.

In accordance with another aspect of the present disclosure, a terminal is provided. The terminal includes a transceiver configured to transmit and receive a signal, and a controller configured to receive a first radio resource control (RRC) message including information for RRC connection suspension, maintain a signaling radio bearer (SRB) 0 and to suspend a data radio bearer (DRB) and at least one other SRB based on the first RRC message, transmit, to a base station, a second RRC message for requesting RRC connection resumption through the SRB0, receive, from the base station, a third RRC message for the RRC connection resumption through an SRB1, and resume an SRB2 and the DRB based on the third RRC message.

In accordance with another embodiment of the present disclosure, a method for operating a base station is provided. The method includes transmitting, to a terminal, a first radio resource control (RRC) message including information for RRC connection suspension, receiving, from the terminal, a second RRC message for requesting RRC connection resumption through a signaling radio bearer (SRB) 0, transmitting, to the terminal, a third RRC message for the RRC connection resumption through an SRB1, and resuming an SRB2 and a data radio bearer (DRB) based on the third RRC message. The DRB and at least one other SRB are suspended while the SRB0 is maintained based on the first RRC message, and the SRB1 is not in a suspended state before the third RRC message is received.

In accordance with another embodiment of the present disclosure, a base station is provided. The base station includes a transceiver configured to transmit and receive a signal, and a controller configured to transmit, to a terminal, a first radio resource control (RRC) message including information for RRC connection suspension, receive, from the terminal, a second RRC message for requesting RRC connection resumption through a signaling radio bearer (SRB) 0, transmit, to the terminal, a third RRC message for the RRC connection resumption through an SRB1, and resume an SRB2 and a data radio bearer (DRB) based on the third RRC message. The DRB and at least one other SRB are suspended while the SRB0 is maintained based on the first RRC message, and the SRB1 is not in a suspended state before the third RRC message is received.

In accordance with an aspect of the present disclosure, an efficient PUCCH transmission becomes possible through the method for configuring and transmitting the PUCCH suitable to the next-generation mobile communication system (NR).

In accordance with another aspect of the present disclosure, the terminal can prevent a data loss even in the case where the connection configuration is changed or cancelled during providing of multiple connections.

In accordance with another aspect of the present disclosure, the terminal can measure the strength and quality of a reference signal (RS) in accordance with a specific downlink reception beam configuration in a predetermined period without continuously measuring all beams after determining suitable transmission beam and reception beam, and thus power consumption of the terminal can be reduced.

In accordance with another aspect of the present disclosure, the SRB-related configuration and operation are specified in the case where the base station and the terminal resume, if needed, their connection after suspending the connection in the wireless communication system, and thus the terminal and the base station can correctly send and receive the control message.

In accordance with another aspect of the present disclosure, the operations of the base station and the terminal are clearly examined in the case where they resume their connection after suspending the connection in the wireless communication system, and thus the base station and the terminal can correctly send and receive the control message.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3K is a diagram explaining a scenario of releasing a TDM method according to an embodiment of the present disclosure;

FIG. 5C is a diagram explaining operations of an RLF-related terminal and network according to an embodiment of the present disclosure;

FIG. 6D is a diagram illustrating a procedure in which a terminal and a network resume connection according to the (6-1)-th embodiment of the present disclosure;

FIG. 6F is a diagram illustrating a procedure in which a network suspends connection with a terminal according to a (6-2)-th embodiment of the present disclosure;

Throughout the drawings, it should be noted that like reference numbers are used to depict the same or similar elements, features, and structures.

DETAILED DESCRIPTION

Figure 1A:
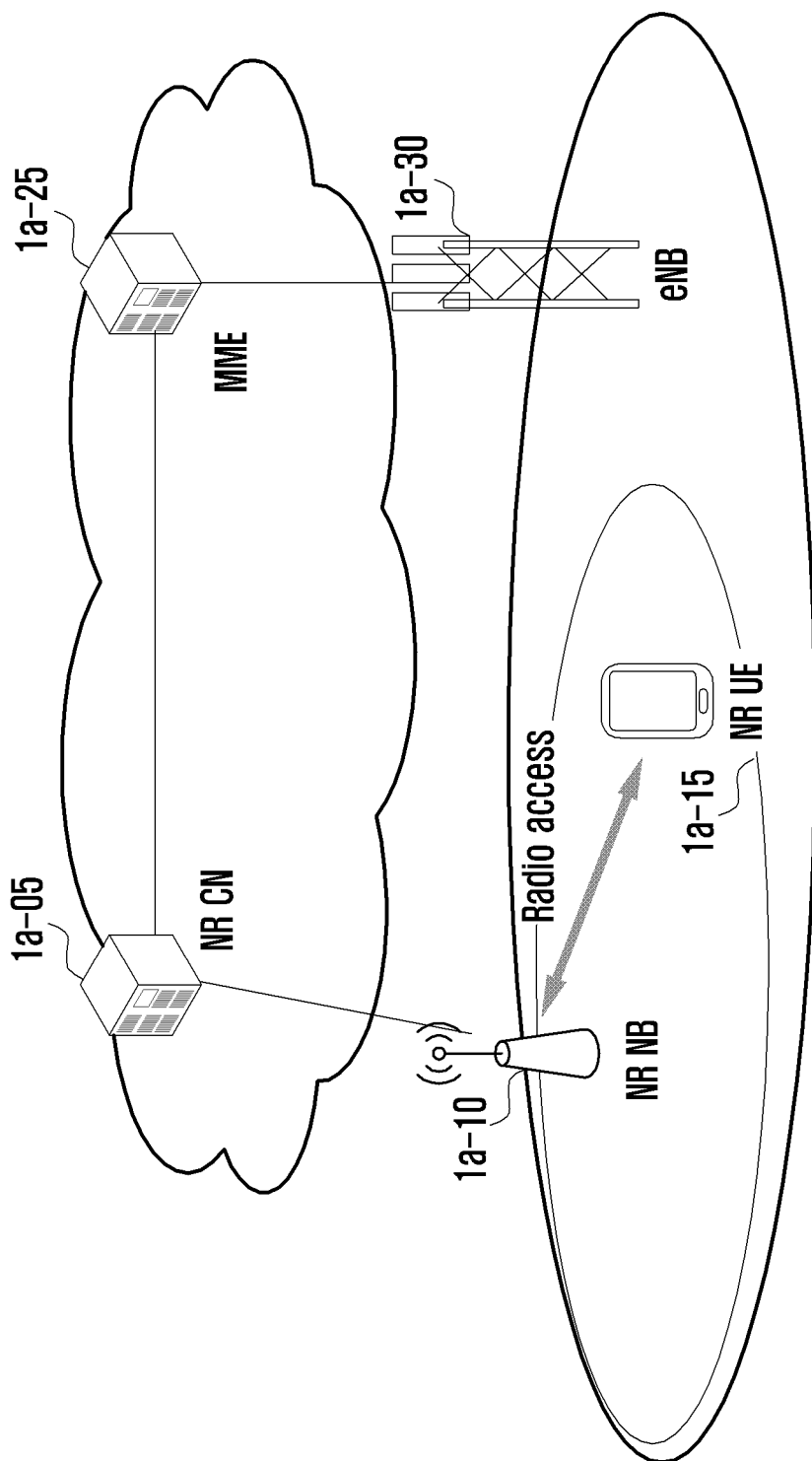
FIG. 1A is a diagram illustrating the structure of a next-generation mobile communication system to which the present disclosure can be applied according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The aspects and features of the present disclosure and methods for achieving the aspects and features will be apparent by referring to the embodiments to be described in detail with reference to the accompanying drawings. However, the present disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the present disclosure is only defined within the scope of the appended claims. In the entire description of the present disclosure, the same drawing reference numerals are used for the same elements across various figures.

First Embodiment

An embodiment of present disclosure relates to a method and an apparatus for configuring and transmitting a physical uplink control channel (PUCCH) in a next-generation mobile communication system (new radio (NR) or fifth-generation (5G)), and a terminal may include the following operations.

An operation at which the terminal receives first information through an radio resource control (RRC) message (layer 3 message).

The first information may include a format of a type 1 PUCCH and a format of a type 2 PUCCH. Information on the format may be an integer between a predetermined minimum value and a predetermined maximum value.

The information on the format may indicate the size of the PUCCH and the contents to be put in the PUCCH.

The first information may indicate a frequency resource for measurement of channel state information (CSI).

The type 1 PUCCH may be periodically transmitted. Further, the type 1 PUCCH may be periodically transmitted in accordance with a specific period indicated by second information.

Transmission of the type 1 PUCCH may be triggered by MAC control information (or MAC control element) including the second information.

The type 1 PUCCH may include a periodic CSI. Information, such as channel quality indicator (CQI), precoding matrix indicator (PMI), and rank indicator (RI), may be included in the CSI.

The type 2 PUCCH may be aperiodically transmitted. Further, it may be transmitted n times. The integer n may be indicated in the first information or the second information.

Transmission of the type 2 PUCCH may be triggered by downlink control information (DCI) including third information.

The type 2 PUCCH may include aperiodic CSI.

An operation at which the terminal receives the second information through a media access control (MAC) control message (MAC control information or MAC control element).

The second information may include a transmission period of the type 1 PUCCH or transmission resource information (frequency resource or time resource) for the type 1 PUCCH.

An operation at which the terminal receives the third information through a PHY control message (physical control information or DCI in PDCCH).

The third information may include the number of transmissions of the type 2 PUCCH or transmission resource information (frequency resource or time resource) for the type 2 PUCCH.

An operation at which the terminal transmits the type 1 PUCCH or type 2 PUCCH.

The terminal may apply the first information or the second information, and may transmit the type 1 PUCCH using an uplink beam with a specific direction.

The terminal may apply the first information or the third information, and may transmit the type 2 PUCCH using an uplink beam with a specific direction.

The uplink beam with the specific direction may be a beam determined by a random access procedure most recently performed by the terminal. Further, the uplink beam with the specific direction may be a beam having an uplink direction that coincides with a downlink beam direction of a serving beam by which the terminal is currently being serviced. Further, the uplink beam with the specific direction may be an uplink beam selected through a best beam pair selection process performed by the terminal and the base station. The best beam selection process means a process in which the base station transmits downlink beams supported by the base station in a specific time period, and the terminal checks all possible pairs of the downlink beams and the uplink beams using the uplink beams supported by the terminal, and then selects a pair having the highest signal quality.

An operation at which the terminal receives a first message from a network.

The first message may be an RRC message.

The first message includes at least the first information.

An operation at which the terminal confirms whether the second information is included in the first message.

An operation at which the terminal transmits the type 1 PUCCH after receiving the first message if the second information is included in the first message.

Transmission of the type 1 PUCCH is performed based on the first information of the first message and the second information of the first message.

Transmission of the type 1 PUCCH is performed by the uplink beam with the specific direction.

The uplink beam with the specific direction may be a beam determined by the random access procedure most recently performed by the terminal. Further, the uplink beam with the specific direction may be a beam having an uplink direction that coincides with a downlink beam direction of a serving beam by which the terminal is currently being serviced. Further, the uplink beam with the specific direction may be indicated by a network. Further, the uplink beam with the specific direction may be an uplink beam selected through a best beam pair selection process performed by the terminal and the base station. The best beam selection process means a process in which the base station transmits downlink beams supported by the base station in a specific time period, and the terminal checks all possible pairs of the downlink beams and the uplink beams using the uplink beams supported by the terminal, and then selects a pair having the highest signal quality.

An operation at which the terminal transmits the type 1 PUCCH after receiving the second information if the second information is included in the first message.

Transmission of the type 1 PUCCH is performed based on the first information of the first message and the second information of the second message.

The second message may be a MAC control message.

Transmission of the type 1 PUCCH is performed by the uplink beam with the specific direction.

The uplink beam with the specific direction may be a beam determined by the random access procedure most recently performed by the terminal. Further, the uplink beam with the specific direction may be a beam having an uplink direction that coincides with a downlink beam direction of a serving beam by which the terminal is currently being serviced. Further, the uplink beam with the specific direction may be indicated by the network. Further, the uplink beam with the specific direction may be an uplink beam selected through a best beam pair selection process performed by the terminal and the base station. The best beam selection process means a process in which the base station transmits downlink beams supported by the base station in a specific time period, and the terminal checks all possible pairs of the downlink beams and the uplink beams using the uplink beams supported by the terminal, and then selects a pair having the highest signal quality.

An embodiment of the present disclosure has a procedure of configuring and transmitting the PUCCH as described above, and more detailed contents thereof will be described hereinafter with reference to the drawings.

FIG. 1A is a diagram illustrating the structure of a next-generation mobile communication system to which the present disclosure can be applied according to an embodiment of the present disclosure.

Referring to FIG. 1A, a radio access network of a next-generation mobile communication system is composed of a new radio node B (NR NB) 1a-10 and a new radio core network (NR CN) 1a-05. A user terminal (new radio user equipment (NR UE)) 1a-15 connects to an external network through the NR NB 1a-10 and the NR CN 1a-05.

In FIG. 1A, the NR NB 1a-10 corresponds to an evolved node B (eNB) of the existing LTE system. The NR NB may be connected to the NR UE 1a-15 through a radio channel, and thus can provide a more superior service than the service of the existing node B. Since all user traffics are serviced through shared channels, a device that performs scheduling through consolidation of status information, such as a buffer state, an available transmission power state, and a channel state, of each UE is necessary, and the NR NB 1a-10 takes charge of this. One NR NB generally controls plural cells. In order to implement ultrahigh-speed data transmission as compared with the existing LTE, the NR NB may have a bandwidth that is equal to or higher than the existing maximum bandwidth, and a beamforming technology may be additionally grafted in consideration of orthogonal frequency division multiplexing (OFDM) as a radio connection technology. Further, an adaptive modulation & coding (AMC) method that determines a modulation scheme and a channel coding rate to match the channel state of the terminal is applied to the NR NB. The NR CN 1a-05 performs mobility support, bearer configuration, and quality of service (QoS) configuration. The NR CN is a device that takes charge of not only terminal mobility management but also various kinds of control functions, and is connected to a plurality of base stations. Further, the next-generation mobile communication system may interlock with the existing LTE system, and the NR CN is connected to a mobility management entity (MME) 1a-25 through a network interface. The MME is connected to an eNB 1a-30 that is the existing base station.

Figure 1B:
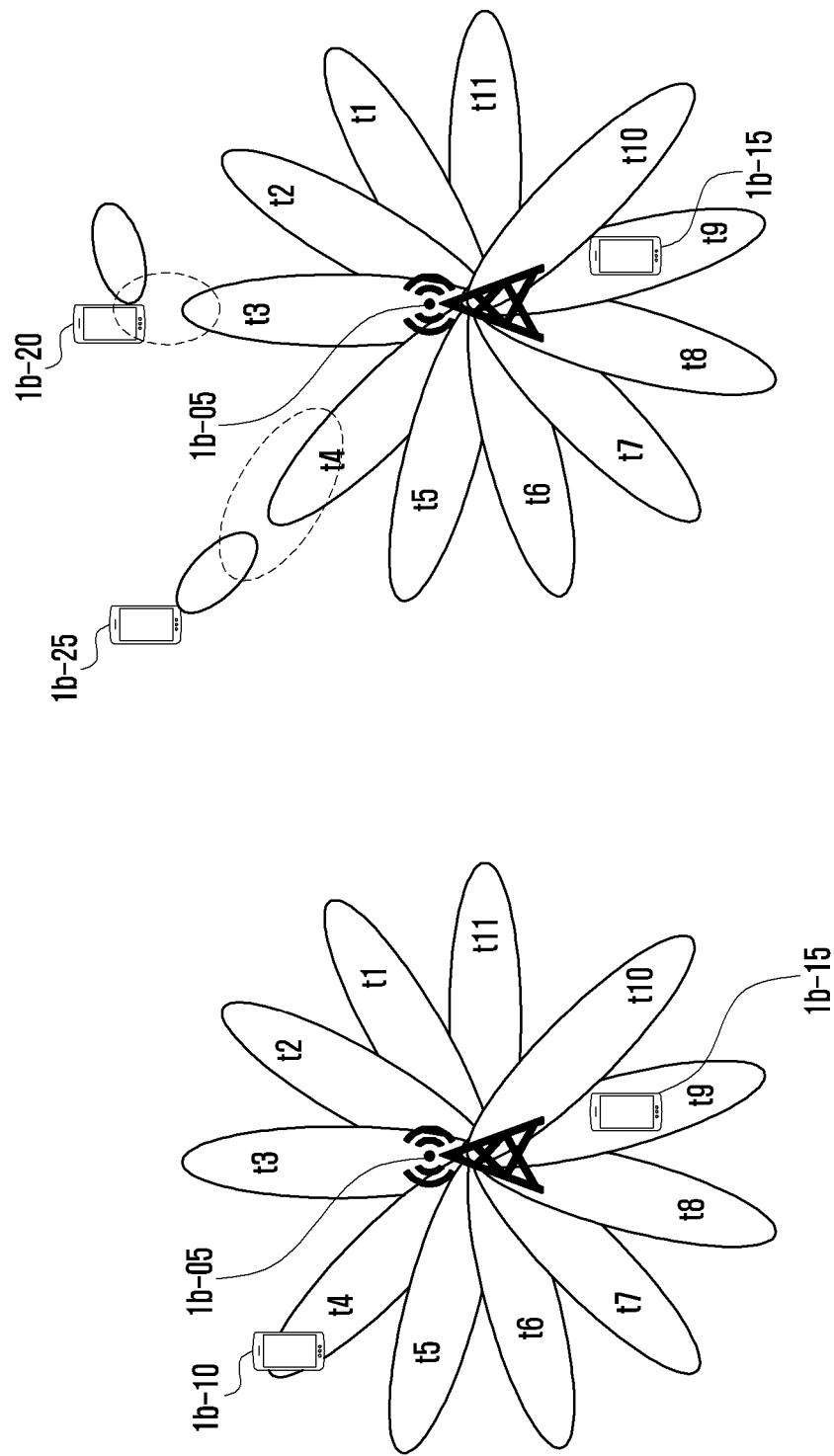
FIG. 1B is a diagram explaining beam sweeping of a next-generation mobile communication system to which the present disclosure can be applied according to an embodiment of the present disclosure.

FIG. 1B is a diagram explaining beam sweeping of a next-generation mobile communication system to which the present disclosure can be applied according to an embodiment of the present disclosure.

Referring to FIG. 1B, the NR takes aim at supporting a data transmission speed that is increased as compared with that of the existing LTE. As a method for heightening the data transmission speed in the NR, a method for transmitting a signal using a wide frequency band existing in a frequency band of 6 GHz or more has been considered. That is, it has been considered to increase the transmission rate using a millimeter wave (hereinafter referred to as "mmWave")

band, such as a 28 GHz band or 60 GHz band. The frequency band that is considered for the mmWave has a relatively large signal attenuation size per distance, and thus in order to secure a coverage, a transmission based on a directional beam generated using multiple antennas is necessary. The transmission based on the directional beam has a problem that it is difficult to transmit or receive a signal in a location where a beam is not formed, and in order to overcome this, a beam sweeping technique is used. The beam sweeping is a technique in which a transmission device transmits a directional beam having a constant beam width while successively sweeping or rotating the directional beam to cause a reception device that is within a beam arrival distance of the transmission device to receive the beam. For example, a transmission reception point (TRP) 1b-05 is a device that transmits and receives a radio signal in a network, and may be a 5G NB or a device connected to the 5G NB. The TRP may transmit a directional beam having a specific width in a specific direction at a certain time t1, and transmit the directional beam having the same width in another direction at time t2, so that the beam covers all directions for a specific time period. As a result, a downlink signal transmitted by the base station arrives at a terminal 1b-15 at time t9, and arrives at a terminal 1b-10 at time t4.

The beam sweeping is mainly used in the case where the base station does not know the direction of the directional beam to be applied to the terminal, and a common overhead signal (OSF) to be transmitted to a terminal in an idle state (idle state terminal) is transmitted through the beam sweeping.

In order to heighten the beam efficiency, not only a transmission directional beam but also a reception directional beam may be used. If the reception directional beam is used, the directivity/direction of the transmission beam and the directivity/direction of the reception beam should be synchronized with each other. For example, if the directivity of the reception beam is not synchronized with the directivity of the transmission beam although the terminal (1b-20) is located in a region of the transmission beam, the terminal is unable to receive the transmission beam. In contrast, if the directivity of the transmission beam is synchronized with the directivity of the reception beam and the terminal (1b-25) is located in a region of the transmission beam, data can be transmitted and received with much higher efficiency as compared with a case where the reception beam is not used.

In order to find a reception beam that is synchronized with the transmission beam, the reception device searches for a reception beam that provides the most prominent reception quality through applying different reception beams with respect to the same transmission beam. This process is called a reception beam sweeping.

Figure 1C:
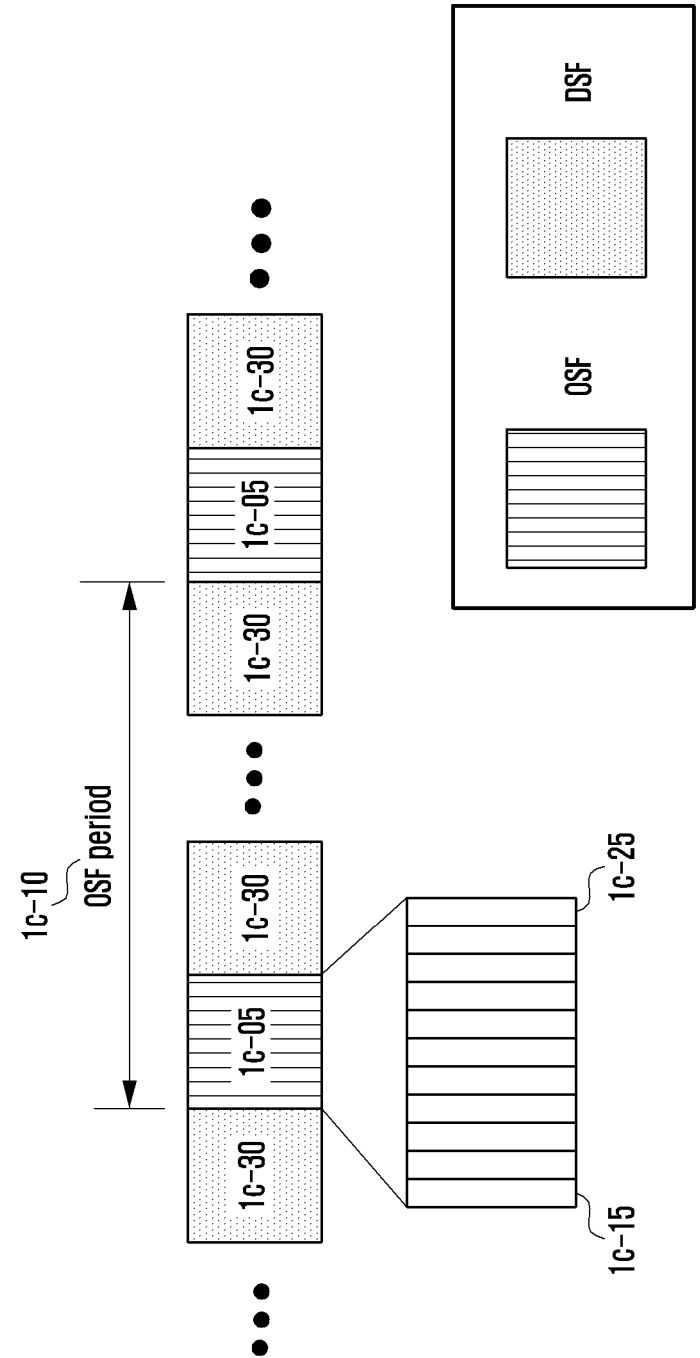
FIG. 1C is a diagram explaining a subframe structure of a next-generation mobile communication system to which the present disclosure can be applied according to an embodiment of the present disclosure.

FIG. 1C is a diagram explaining a subframe structure of a next-generation mobile communication system to which the present disclosure can be applied according to an embodiment of the present disclosure.

Referring to FIG. 1C, in a mobile communication system in which a directional beam, an analog beam, or a hybrid beam is used, the common overhead signal (OSF) is transmitted through beam sweeping at a specific subframe, and user data may be transmitted to or received from a specific terminal using the directional beam of a single direction in another subframe.

The subframe that has received the OSF 1c-05 is repeatedly transmitted in a predetermined period 1c-10. One subframe is composed of a plurality of symbols, and in the OSF, one directional beam is transmitted for one symbol. For example, a directional beam (or analog beam) is transmitted, in which first to eleventh symbols 1c-15 to 1c-25 respectively correspond to times t1 to t11, the respectively symbols have the same beam width, but cover different regions, and the directivities are configured in different directions.

Overhead signals below may be transmitted for the respective symbols of the OSF.

A signal for downlink synchronization establishment, such as a primary synchronization signal (PSS) and a secondary synchronization signal (SSS).

A beam reference signal (BRS) capable of measuring a reception signal strength or reception signal quality for each beam.

System information, master information block (MIB), or physical broadcast channel (PBCH).

In the PBCH, essential information for the terminal to access to a 1d system, for example, downlink beam bandwidth or system frame number, is included.

For reference, a public land mobile network (PLMN) identifier may be broadcast through another channel other than the MIB.

In a subframe that is not the OSF being periodically transmitted, the same beam is transmitted over several successive symbols, and user data for a specific terminal in a connected state may be transmitted through the beam. Hereinafter, the subframe is called a data subframe (DSF) 1c-30.

Figure 1D:
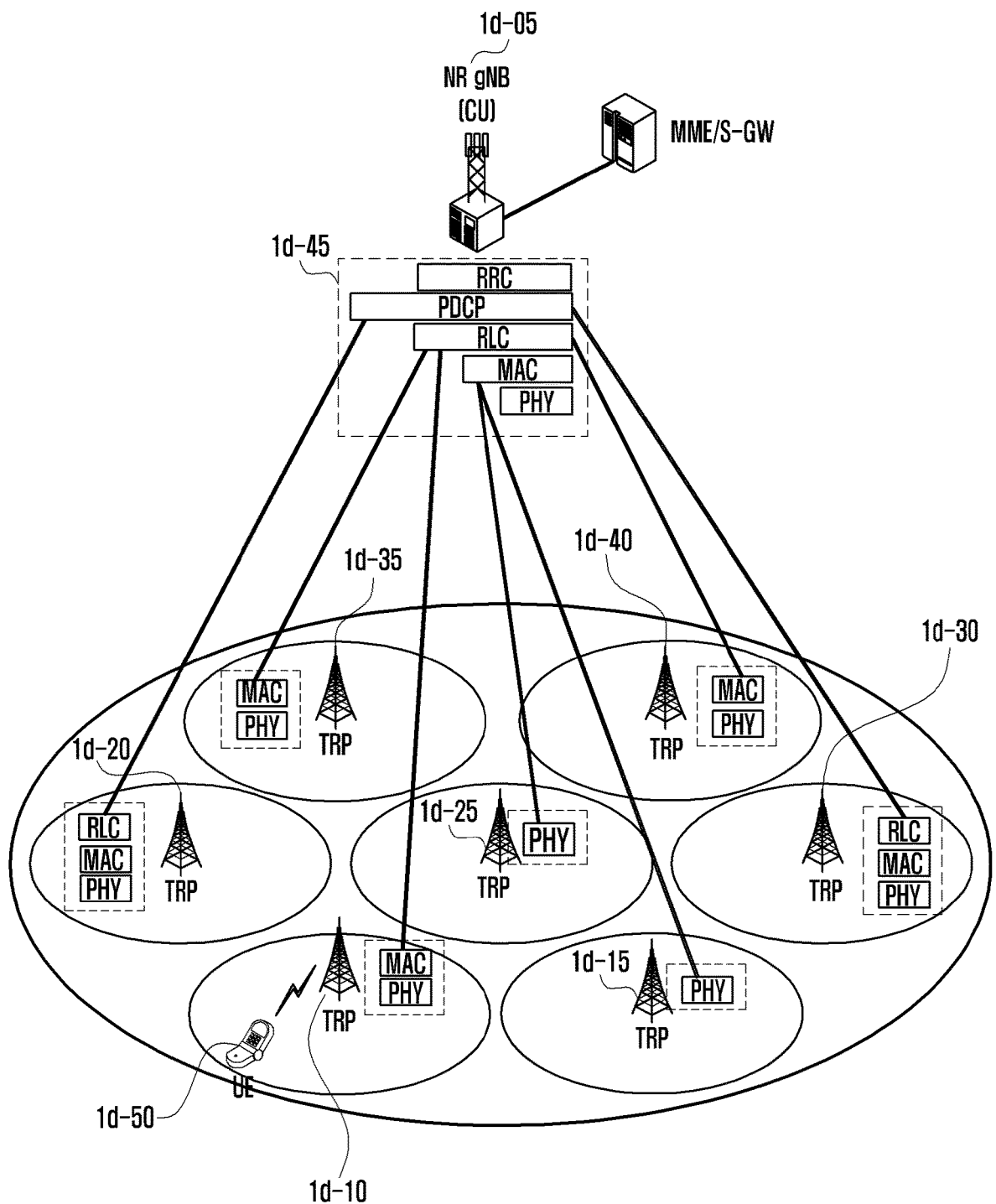
FIG. 1D is a diagram illustrating a structure of another next-generation mobile communication system to which the present disclosure can be applied according to an embodiment of the present disclosure.

FIG. 1D is a diagram illustrating the structure of another next-generation mobile communication system to which the present disclosure can be applied according to an embodiment of the present disclosure.

Referring to FIG. 1D, a cell that is serviced by an NR base station (NR gNB) 1d-05 operating based on a beam may be composed of several TRPs 1d-10, 1d-15, 1d-20, 1d-25, 1d-30, 1d-35, and 1d-40. The TRPs 1d-10, 1d-15, 1d-20, 1d-25, 1d-30, 1d-35, and 1d-40 indicate blocks obtained by separating partial functions of transmitting and receiving physical signals from the existing LTE base station eNB, and are composed of a plurality of antennas. The NR base station may be expressed as a central unit (CU), and the TRP may be expressed as a distributed unit (DU). The functions of the NR gNB and the TRP may be configured by separating respective layers 1d-45 from packet data convergence protocol (PDCP)/radio link control (RLC)/MAC/physical (PHY) layers. That is, the TRPs 1d-15 and 1d-25 can perform the function of the corresponding layer only with the PHY layer, the TRPs 1d-10, 1d-35, and 1d-40 can perform the functions of the corresponding layers only with the PHY layer and the MAC layer, and the TRPs 1d-20 and 1d-30 can perform the functions of the corresponding layers only with the PHY layer, MAC layer, and RLC layer. In particular, the TRPs 1d-10, 1d-15, 1d-20, 1d-25, 1d-30, 1d-35, and 1d-40 may use a beamforming technology that transmits and receives data through generation of narrow beams in several directions using a plurality of transmission/reception antennas. A user terminal 1d-50 connects to the NR gNB 1d-05 and an external network through the TRPs 1d-10, 1d-15, 1d-20, 1d-25, 1d-30, 1d-35, and 1d-40. In order to provide services to users, the NR gNB 1d-05 support a connection between the terminals and the core network (CN) by performing scheduling through consolidation of status information, such as a buffer state, an available transmission power state, and a channel state, of each terminal.

An embodiment of the present disclosure proposes the above-described next-generation mobile communication system structure, and proposes a method and an apparatus for configuring and transmitting a PUCCH in the above-described system. A transmission resource for transmitting the PUCCH may be configured based on a time resource and a frequency resource. However, in the next-generation mobile communication system, beamforming technology using narrow beams as shown in FIG. 1B can be applied, and thus it is necessary to consider the time resource, the frequency resource, and even the beam direction when transmitting the PUCCH. Further, in the next-generation mobile communication system, one CU (or gNB) may be connected to several DUs (TRPs) as shown in FIG. 1D, and layers and functions of the respective TRPs may differ from each other. Accordingly, when the PUCCH is configured, the followings should be considered.

A PUCCH may be received and processed in a TRP.
A PUCCH transmission resource may be controlled by a TRP.
A PUCCH transmission beam may be controlled by a TRP.

In this structure, it is difficult for one CU to manage all terminals existing in a large region as shown in FIG. 1D through control signals. That is, due to backhaul delay between the CU and the DU (TRP), it is difficult for the CU to send a control signal to the terminal, and since the CU should perform lots of signaling processes with respect to the terminals, complexity may be greatly increased.

Figure 1E:
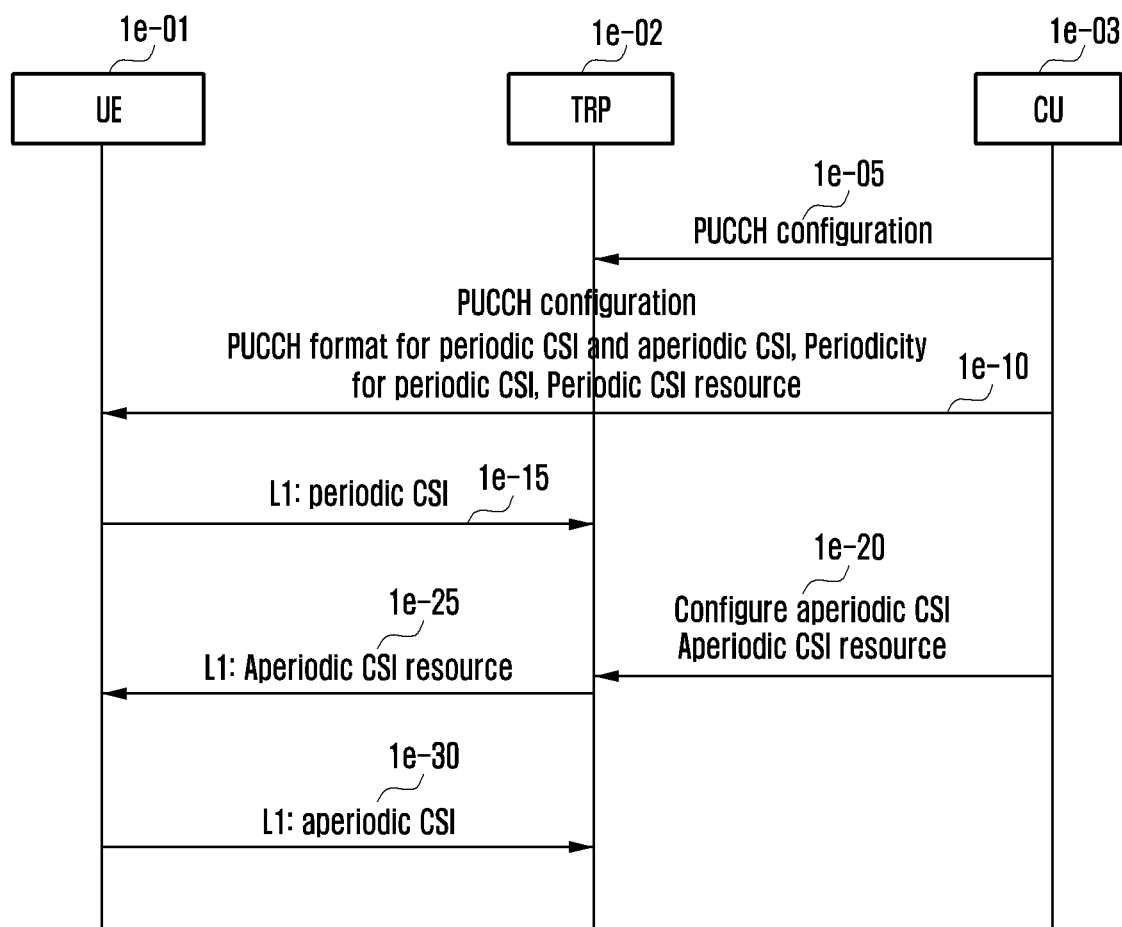
FIG. 1E is a diagram explaining a method for configuring and transmitting a physical uplink control channel (PUCCH) in a radio resource control (RRC) layer of a central unit (CU) according to a (1-1)-th embodiment of the present disclosure.

FIG. 1E is a diagram illustrating a method for configuring a PUCCH in an RRC layer of a CU, and transmitting configuration information according to the (1-1)-th embodiment of the present disclosure.

Referring to FIG. 1E, a CU 1e-03 or gNB may have PDCP/RLC/MAC layers, and the DUs or TRP 1e-02 may have only a PHY layer. Accordingly, the CU can manage scheduling of transmission resources. In the next-generation mobile communication system, if it is necessary to configure a PUCCH of a terminal 1e-01 for a specific reason, the CU 1e-03 determines PUCCH transmission configuration information of the corresponding terminal. The PUCCH transmission configuration information may include a PUCCH transmission period, PUCCH formats (format for periodic CSI, and format for aperiodic CSI), a transmission resource size, transmission resource information (time information and frequency information), transmission beam information, reception beam information, and the number of transmissions of the aperiodic CSI. The transmission resource information may include the number of subframes for indicating the period, a system frame number indicating an activation time, subframe number (SFN), resource block (RB) index indicating a frequency resource, and a symbol index indicating a time resource.

If the PUCCH transmission configuration information is determined, the CU 1e-03 transfers the information to the TRP 1e-02, at operation 1e-05. Further, the CU 1e-03 configures the PUCCH through transmission of the information to the terminal 1e-01 as an RRC message, at operation 1e-10. The terminal 1e-01, for which the PUCCH is configured from the RRC message, may report the periodic CSI to the TRP 1e-02 as a PUCCH format and a transmission resource for the periodic CSI using the PUCCH transmission configuration information received from operation 1e-10, at operation 1e-15. When reporting the periodic CSI, the terminal 1e-01 may transmit it using an uplink beam with a specific direction.

The uplink beam with the specific direction may be a beam determined by a random access procedure most recently performed by the terminal 1e-01. Further, the uplink beam with the specific direction may be a beam having an uplink direction that coincides with a downlink beam direction of a serving beam by which the terminal 1e-01 is currently being serviced. Further, the uplink beam with the specific direction may be indicated by the network. Further, the uplink beam with the specific direction may be an uplink beam selected through a best beam pair selection process performed by the terminal 1e-01 and the base station. The best beam selection process means a process in which the base station transmits downlink beams supported by the base station in a specific time period, and the terminal 1e-01 checks all possible pairs of the downlink beams and the uplink beams using the uplink beams supported by the terminal, and then selects a pair having the highest signal quality.

If it is necessary for the CU 1e-03 to receive the aperiodic CSI from the terminal 1e-01 for a specific reason, the CU 1e-03 configures the aperiodic CSI to the TRP 1e-02, and the TRP allocates a PUCCH or PUSCH transmission resource for the aperiodic CSI to the terminal 1e-01 from a PDCCH to DCI, at operations 1e-20 and 1e-25. The terminal 1e-01 reports the aperiodic CSI to the TRP 1e-02 using the PUCCH format for the aperiodic CSI configured in operation 1e-10 and the transmission resource configured in operation 1e-20, at operation 1e-30. The aperiodic CSI may be transmitted n times successively or according to a determined rule. The integer n may be included in PUCCH transmission configuration related information. The integer n may be indicated in the first information or the second information.

When reporting the aperiodic CSI, the terminal 1e-01 may transmit it using the uplink beam with the specific direction. The uplink beam with the specific direction may be a beam determined by a random access procedure most recently performed by the terminal 1e-01. Further, the uplink beam with the specific direction may be a beam having an uplink direction that coincides with a downlink beam direction of a serving beam by which the terminal 1e-01 is currently being serviced. Further, the uplink beam with the specific direction may be indicated by the network. Further, the uplink beam with the specific direction may be an uplink beam selected through a best beam pair selection process for selecting the optimum beam pair that is performed by the terminal 1e-01 and the base station. The best beam selection process means a process in which the base station transmits downlink beams supported by the base station in a specific time period, and the terminal 1e-01 checks all possible pairs of the downlink beams and the uplink beams using the uplink beams supported by the terminal 1e-01, and then selects a pair having the highest signal quality.

Figure 1F:
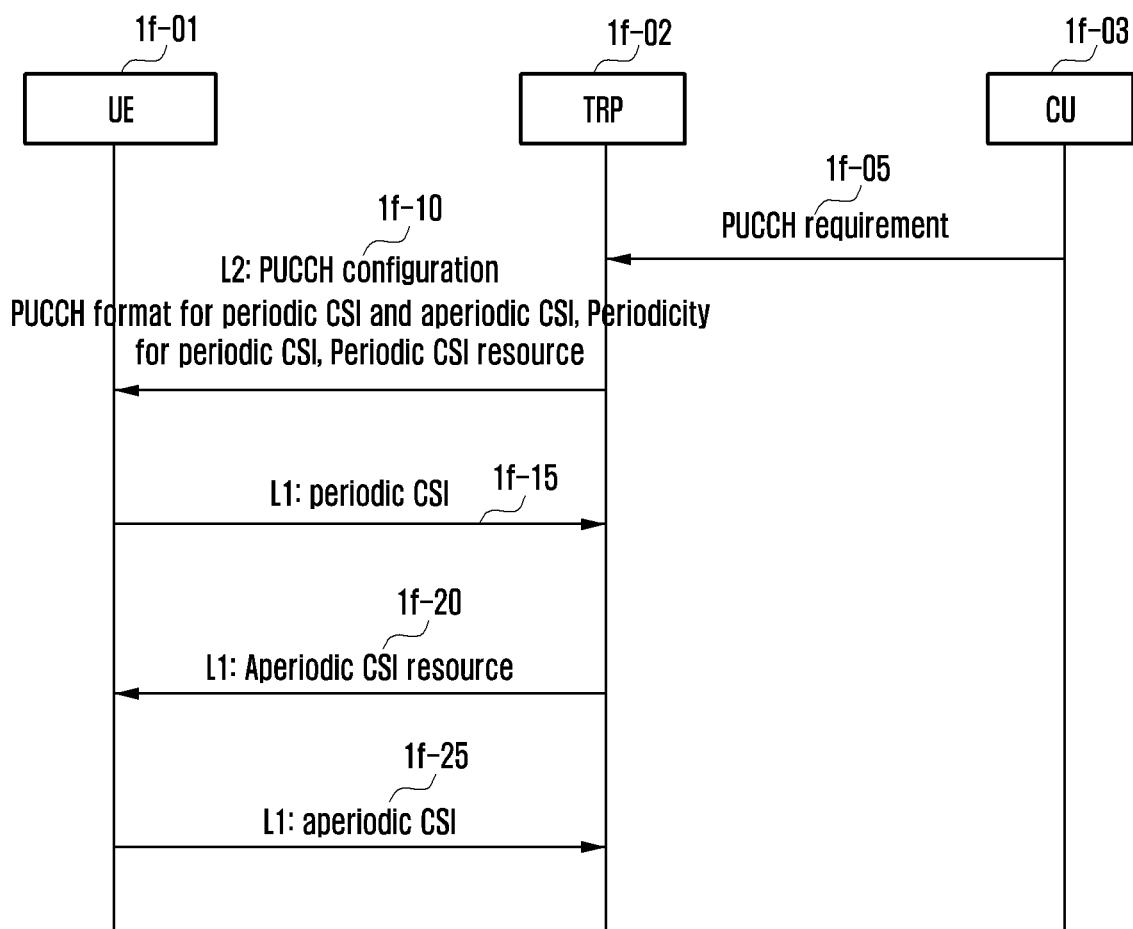
FIG. 1F is a diagram explaining a method 1 for an RRC layer of a CU and a media access control (MAC) layer of a distributed unit (DU) to configure and transmit a PUCCH according to a (1-2)-th embodiment of the present disclosure.

FIG. 1F is a diagram illustrating a method 1 for an RRC layer of a CU and a MAC layer of a DU to configure a PUCCH, and to transmit configuration information according to a (1-2)-th embodiment of the present disclosure.

Referring to FIG. 1F, the DUs or TRPs 1d-10, 1d-20, 1d-30, 1d-35, and 1d-40 may have MAC layers. Accordingly, a TRP 1f-02 can manage scheduling of transmission resources. In the next-generation mobile communication system, if it is necessary to configure a PUCCH of a terminal 1f-01 for a specific reason, a CU 1f-03 determines PUCCH transmission configuration information of the terminal 1f-01. The PUCCH transmission configuration information determined by the CU 1f-03 may include a PUCCH transmission period (the number of subframes for indicating a period, a system frame number indicating an activation time, and SFN), PUCCH formats (format for periodic CSI and format for aperiodic CSI), a transmission resource size, transmission beam information, reception beam information, and the number of transmissions of the aperiodic CSI. If the PUCCH transmission configuration information is determined, the CU 1f-03 transfers the information to the TRP 1f-02, at operation 1f-05.

The TRP 1f-02 receives the PUCCH transmission configuration information and determines actual transmission resource information of the PUCCH. The transmission resource information may include a system frame number indicating an activation time, SFN, RB index indicating a frequency resource, a symbol index indicating a time resource, transmission beam information, and reception beam information. If the transmission resource information is determined, the TRP 1f-02 configures the PUCCH of the terminal 1f-01 through transmission of the PUCCH transmission resource information together with the PUCCH transmission configuration information received from operation 1f-05 to the terminal 1f-01 as a MAC control message (MAC control information or MAC control element), at operation 1f-10.

The terminal 1f-01, for which the PUCCH is configured from the MAC control message, may report the periodic CSI to the TRP 1f-02 as a PUCCH format and a transmission resource for the periodic CSI using the PUCCH transmission configuration information received from the operation 1f-10, at operation 1f-15. When reporting the periodic CSI, the terminal 1f-01 may transmit it using an uplink beam with a specific direction. The uplink beam with the specific direction may be a beam determined by a random access procedure most recently performed by the terminal 1f-01. Further, the uplink beam with the specific direction may be a beam having an uplink direction that coincides with a downlink beam direction of a serving beam by which the terminal 1f-01 is currently being serviced. Further, the uplink beam with the specific direction may be indicated by the network. Further, the uplink beam with the specific direction may be an uplink beam selected through a best beam pair selection process performed by the terminal 1f-01 and the base station. The best beam selection process means a process in which the base station transmits downlink beams supported by the base station in a specific time period, and the terminal 1f-01 checks all possible pairs of the downlink beams and the uplink beams using the uplink beams supported by the terminal, and then selects a pair having the highest signal quality.

If it is necessary for the TRP 1f-02 or the CU 1f-03 to receive the aperiodic CSI from the terminal 1f-01 for a specific reason, the TRP allocates a PUCCH or PUSCH transmission resource for the aperiodic CSI to the terminal from a PDCCH to DCI, at operation 1f-20. The terminal 1f-01 reports the aperiodic CSI to the TRP using the PUCCH format for the aperiodic CSI configured in operation 1f-10 and the transmission resource configured in operation 1f-20, at operation 1f-25. The aperiodic CSI may be transmitted n times successively or according to a determined rule. The integer n may be included in PUCCH transmission configuration related information. When reporting the aperiodic CSI, the terminal 1f-01 may transmit it using the uplink beam with the specific direction. The uplink beam with the specific direction may be a beam determined by a random access procedure most recently performed by the terminal 1f-01. Further, the uplink beam with the specific direction may be a beam having an uplink direction that coincides with a downlink beam direction of a serving beam by which the terminal is currently being serviced. Further, the uplink beam with the specific direction may be indicated by the network. Further, the uplink beam with the specific direction may be an uplink beam selected through a best beam pair selection process for selecting the optimum beam pair that is performed by the terminal 1f-01 and the base station. The best beam selection process means a process in which the base station transmits downlink beams supported by the base station in a specific time period, and the terminal 1f-01 checks all possible pairs of the downlink beams and the uplink beams using the uplink beams supported by the terminal, and then selects a pair having the highest signal quality. As an acknowledgement for acknowledging good reception of the signal in the above-described procedures, a MAC control message (MAC control information or MAC control element) may be used.

Figure 1G:
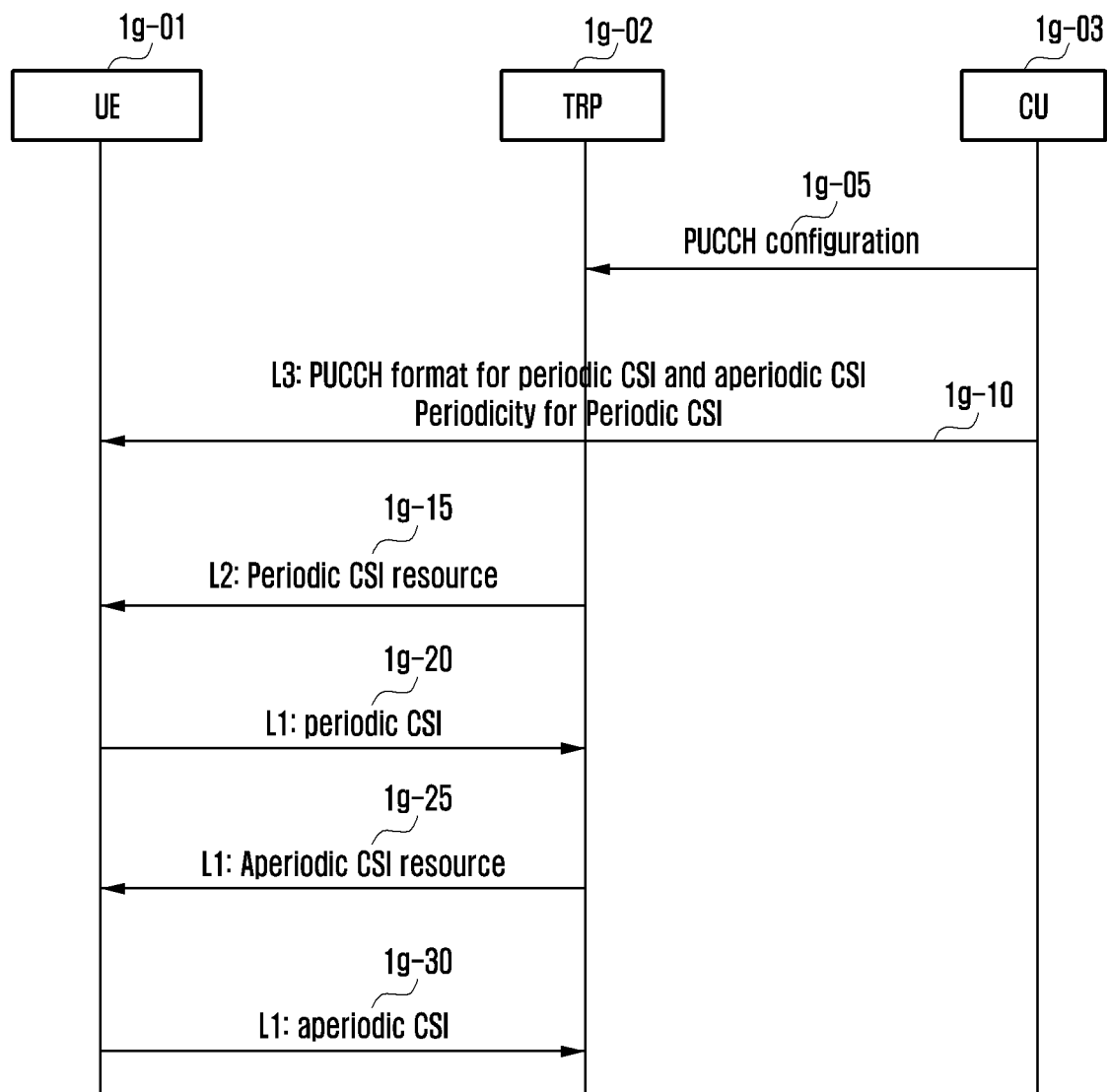
FIG. 1G is a diagram explaining a method 2 for an RRC layer of a CU and a MAC layer of a DU to configure and transmit a PUCCH according to a (1-3)-th embodiment of the present disclosure.

FIG. 1G is a diagram explaining a method 2 for an RRC layer of a CU and a MAC layer of a DU to configure a PUCCH and to transmit configuration information according to a (1-3)-th embodiment of the present disclosure.

Referring to FIG. 1G, the DUs or TRPs 1d-10, 1d-20, 1d-30, 1d-35, and 1d-40 may have MAC layers. Accordingly, the TRP 1g-02 can manage scheduling of transmission resources. In the next-generation mobile communication system, if it is necessary to configure a PUCCH of a terminal 1g-01 for a specific reason, a CU 1g-03 or gNB determines PUCCH transmission configuration information of the terminal 1g-01. The PUCCH transmission configuration information determined by the CU 1g-03 may include a PUCCH transmission period (the number of subframes for indicating a period, a system frame number indicating an activation time, and SFN), PUCCH formats (format for periodic CSI and format for aperiodic CSI), a transmission resource size, transmission beam information, reception beam information, and the number of transmissions of the aperiodic CSI. If the PUCCH transmission configuration information is determined, the CU transfers the information to the TRP, at operation 1g-05. Further, the CU 1g-03 configures the PUCCH transmission configuration information through direct transmission thereof to the terminal 1g-01 as an RRC message, at operation 1g-10.

The TRP 1g-02 receives the PUCCH transmission configuration information from the CU 1g-03 and determines actual transmission resource information of the PUCCH. The transmission resource information may include a system frame number indicating an activation time, SFN, RB index indicating a frequency resource, a symbol index indicating a time resource, transmission beam information, and reception beam information. If the transmission resource information is determined, the TRP 1g-02 configures the PUCCH of the terminal 1g-01 through transmission of the PUCCH transmission resource information to the terminal as a MAC control message (MAC control information or MAC control element), at operation 1g-15. The terminal 1g-01 allocated with the PUCCH transmission resource from the MAC control message may report the periodic CSI to the TRP as a PUCCH format for the periodic CSI using the PUCCH transmission configuration information received from operation 1g-10, at operation 1g-20. When reporting the periodic CSI, the terminal may transmit it using an uplink beam with a specific direction.

The uplink beam with the specific direction may be a beam determined by a random access procedure most recently performed by the terminal 1g-01. Further, the uplink beam with the specific direction may be a beam having an uplink direction that coincides with a downlink beam direction of a serving beam by which the terminal 1g-01 is currently being serviced. Further, the uplink beam with the specific direction may be indicated by the network. Further, the uplink beam with the specific direction may be an uplink beam selected through a best beam pair selection process performed by the terminal 1g-01 and the base station. The best beam selection process means a process in which the base station transmits downlink beams supported by the base station in a specific time period, and the terminal 1g-01 checks all possible pairs of the downlink beams and the uplink beams using the uplink beams supported by the terminal 1g-01, and then selects a pair having the highest signal quality.

If it is necessary for the TRP 1b-02 or the CU 1g-03 to receive the aperiodic CSI from the terminal 1g01 for a specific reason, the TRP allocates a PUCCH or PUSCH transmission resource for the aperiodic CSI to the terminal 1g-01 from a PDCCH to DCI, at operation 1g-25. The terminal 1g-01 reports the aperiodic CSI to the TRP using the PUCCH format for the aperiodic CSI configured in operation 1g-10 and the transmission resource configured in operation 1g-25, at operation 1g-30. The aperiodic CSI may be transmitted n times successively or according to a determined rule. The integer n may be included in PUCCH transmission configuration related information. When reporting the aperiodic CSI, the terminal 1g-01 may transmit it using the uplink beam with the specific direction.

The uplink beam with the specific direction may be a beam determined by a random access procedure most recently performed by the terminal 1g-01. Further, the uplink beam with the specific direction may be a beam having an uplink direction that coincides with a downlink beam direction of a serving beam by which the terminal 1g-01 is currently being serviced. Further, the uplink beam with the specific direction may be indicated by the network. Further, the uplink beam with the specific direction may be an uplink beam selected through a best beam pair selection process for selecting the optimum beam pair that is performed by the terminal 1g-01 and the base station. The best beam selection process means a process in which the base station transmits downlink beams supported by the base station in a specific time period, and the terminal 1g-01 checks all possible pairs of the downlink beams and the uplink beams using the uplink beams supported by the terminal 1g-01, and then selects a pair having the highest signal quality. As an acknowledgement for acknowledging good reception of the signal in the above-described procedures, a MAC control message (MAC control information or MAC control element) may be used.

Figure 1H:
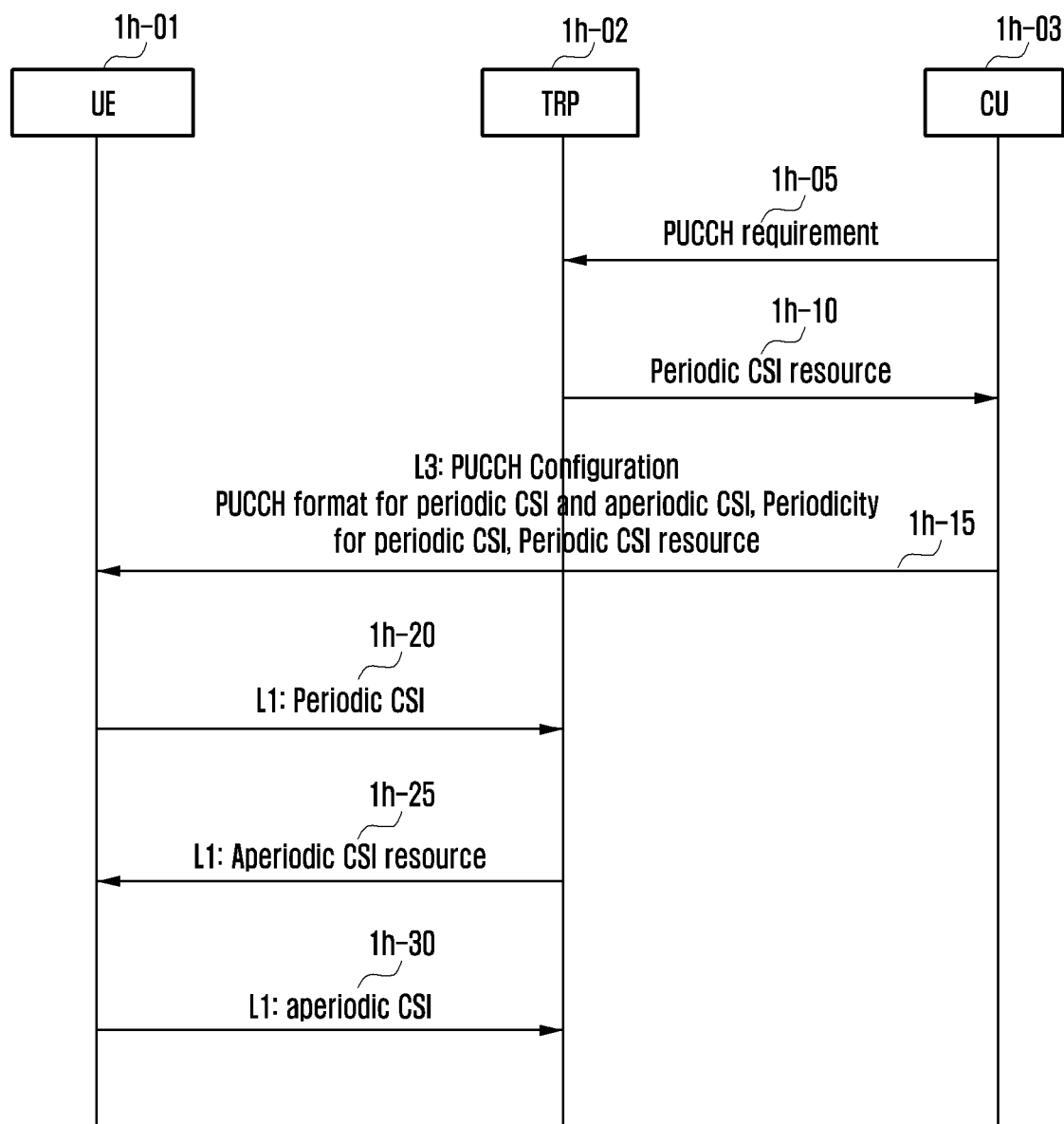
FIG. 1H is a diagram explaining a method 3 for an RRC layer of a CU and a MAC layer of a DU to configure and transmit a PUCCH according to a (1-4)-th embodiment of the present disclosure.

FIG. 1H is a diagram illustrating a method 3 for an RRC layer of a CU and a MAC layer of a DU to configure and transmit a PUCCH according to a (1-4)-th embodiment of the present disclosure.

Referring to FIG. 1H, the DUs or TRPs 1d-10, 1d-20, 1d-30, 1d-35, and 1d-40 may have MAC layers. Accordingly, the TRP 1h-02 can manage scheduling of transmission resources. In the next-generation mobile communication system, if it is necessary to configure a PUCCH of a terminal 1h-01 for a specific reason, a CU 1h-03 or gNB determines PUCCH transmission configuration information of the corresponding terminal. The PUCCH transmission configuration information determined by the CU 1h-03 may include a PUCCH transmission period (the number of subframes for indicating a period, a system frame number indicating an activation time, and SFN), PUCCH formats (format for periodic CSI and format for aperiodic CSI), a transmission resource size, transmission beam information, reception beam information, and the number of transmissions of the aperiodic CSI. If the PUCCH transmission configuration information is determined, the CU 1h-03 transfers the information to the TRP 1h-02, at operation 1h-05.

Then, the TRP 1h-02 receives the PUCCH transmission configuration information from the CU 1h-03 and determines actual transmission resource information of the PUCCH. The transmission resource information may include a system frame number indicating an activation time, SFN, RB index indicating a frequency resource, a symbol index indicating a time resource, transmission beam information, and reception beam information. If the transmission resource information is determined, the TRP 1h-02 transfers the PUCCH transmission resource information to the CU 1h-03, at operation 1h-10. Then, the CU 1h-03 configures the PUCCH transmission configuration information and the transmission resource information to the terminal 1h-01 as an RRC control message, at operation 1h-15. The terminal 1h-01 in which the PUCCH is configured may report the periodic CSI to the TRP 1h-02 as a PUCCH format for the periodic CSI using the PUCCH configuration information and the PUCCH transmission resource information, at operation 1h-20. When reporting the periodic CSI, the terminal may transmit it using an uplink beam with a specific direction.

The uplink beam with the specific direction may be a beam determined by a random access procedure most recently performed by the terminal 1h-01. Further, the uplink beam with the specific direction may be a beam having an uplink direction that coincides with a downlink beam direction of a serving beam by which the terminal 1h-01 is currently being serviced. Further, the uplink beam with the specific direction may be indicated by the network. Further, the uplink beam with the specific direction may be an uplink beam selected through a best beam pair selection process performed by the terminal 1h-01 and the base station. The best beam selection process means a process in which the base station transmits downlink beams supported by the base station in a specific time period, and the terminal 1h-01 checks all possible pairs of the downlink beams and the uplink beams using the uplink beams supported by the terminal 1h-01, and then selects a pair having the highest signal quality.

If it is necessary for the TRP 1h-02 or the CU 1h-03 to receive the aperiodic CSI from the terminal 1h-01 for a specific reason, the TRP 1h-02 allocates a PUCCH or PUSCH transmission resource for the aperiodic CSI to the terminal 1h-01 from a PDCCH to DCI, at operation 1h-25. The terminal 1h-01 reports the aperiodic CSI to the TRP 1h-02 using the PUCCH format for the aperiodic CSI configured in operation 1h-10 and the transmission resource configured in operation 1h-25, at operation 1h-30. The aperiodic CSI may be transmitted n times successively or according to a determined rule. The integer n may be included in PUCCH transmission configuration related information. When reporting the aperiodic CSI, the terminal 1h-01 may transmit it using the uplink beam with the specific direction.

The uplink beam with the specific direction may be a beam determined by a random access procedure most recently performed by the terminal 1h-01. Further, the uplink beam with the specific direction may be a beam having an uplink direction that coincides with a downlink beam direction of a serving beam by which the terminal 1h-01 is currently being serviced. Further, the uplink beam with the specific direction may be indicated by the network. Further, the uplink beam with the specific direction may be an uplink beam selected through a best beam pair selection process for selecting the optimum beam pair that is performed by the terminal 1h-01 and the base station. The best beam selection process means a process in which the base station transmits downlink beams supported by the base station in a specific time period, and the terminal 1h-01 checks all possible pairs of the downlink beams and the uplink beams using the uplink beams supported by the terminal 1h-01, and then selects a pair having the highest signal quality. As an acknowledgement for acknowledging good reception of the signal in the above-described procedures, a MAC control message (MAC control information or MAC control element) may be used.

Figure 1I:
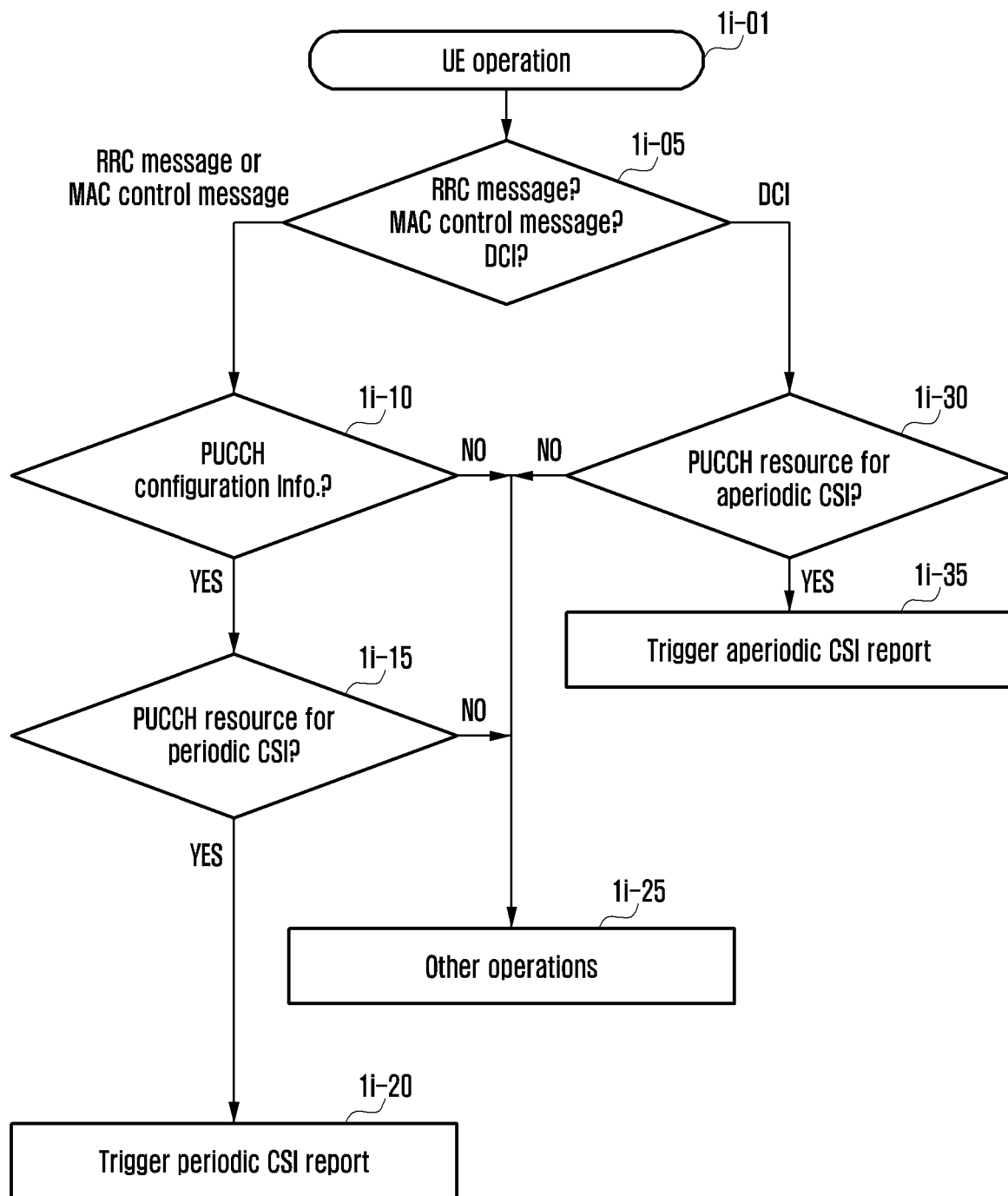
FIG. 1I is a diagram explaining an operation of a terminal according to the above-described embodiments of the present disclosure.

FIG. 1I is a diagram explaining the operation of a terminal according to the above-described embodiments of the present disclosure.

Referring to FIG. 1I, the terminal receives a control message, at operation 1i-01. The control message may be determined to be one of an RRC message, a MAC control message (MAC control information or MAC control element), or DCI of a PDCCH, at operation 1i-05.

If the control message is the RRC message or the MAC control message, the terminal first confirms transmission configuration information of a PUCCH, at operation 1i-10. That is, the terminal confirms whether transmission of the PUCCH has currently been configured or whether transmission configuration information of the PUCCH is included in the received control message. The PUCCH transmission configuration information may include a PUCCH transmission period, PUCCH formats (format for periodic CSI and format for aperiodic CSI), a transmission resource size, transmission beam information, reception beam information, and the number of transmissions of the aperiodic CSI.

If the PUCCH transmission configuration has already been made or the PUCCH transmission configuration information is included in the received control message, the terminal proceeds to operation 1i-15. At operation 1i-15, the terminal confirms whether the PUCCH transmission resource information is included in the control message. The transmission resource information (time information and frequency information) may include the number of subframes indicating the period, system frame number indicating an activation time, SFN, RB index indicating a frequency resource, and a symbol index indicating a time resource.

If the PUCCH transmission resource information for the periodic CSI is confirmed at operation 1i-15, the terminal triggers the periodic CSI, at operation 1i-20. If the PUCCH transmission configuration information and the PUCCH transmission resource configuration information of the periodic CSI are not confirmed at operation 1i-10 or operation 1i-15, the terminal performs another operation corresponding to a command of the control message, at operation 1i-25.

If the DCI is received at operation 1i-05, the terminal confirms whether information on the PUCCH transmission resource for the aperiodic CSI is included in the DCI, at operation 1i-30. If the information on the PUCCH transmission resource for the aperiodic CSI is included in the DCI, the terminal triggers the aperiodic CSI, at operation 1i-35. If the information on the PUCCH transmission resource for the aperiodic CSI is not included in the DCI, the terminal performs another operation in accordance with a control command included in the DCI, at operation 1i-25.

The operation of the terminal is not limited to the operation in FIG. 1I, but may include all the operations of the terminal as described above with reference to FIGS. 1A to 1H.

Figure 1J:
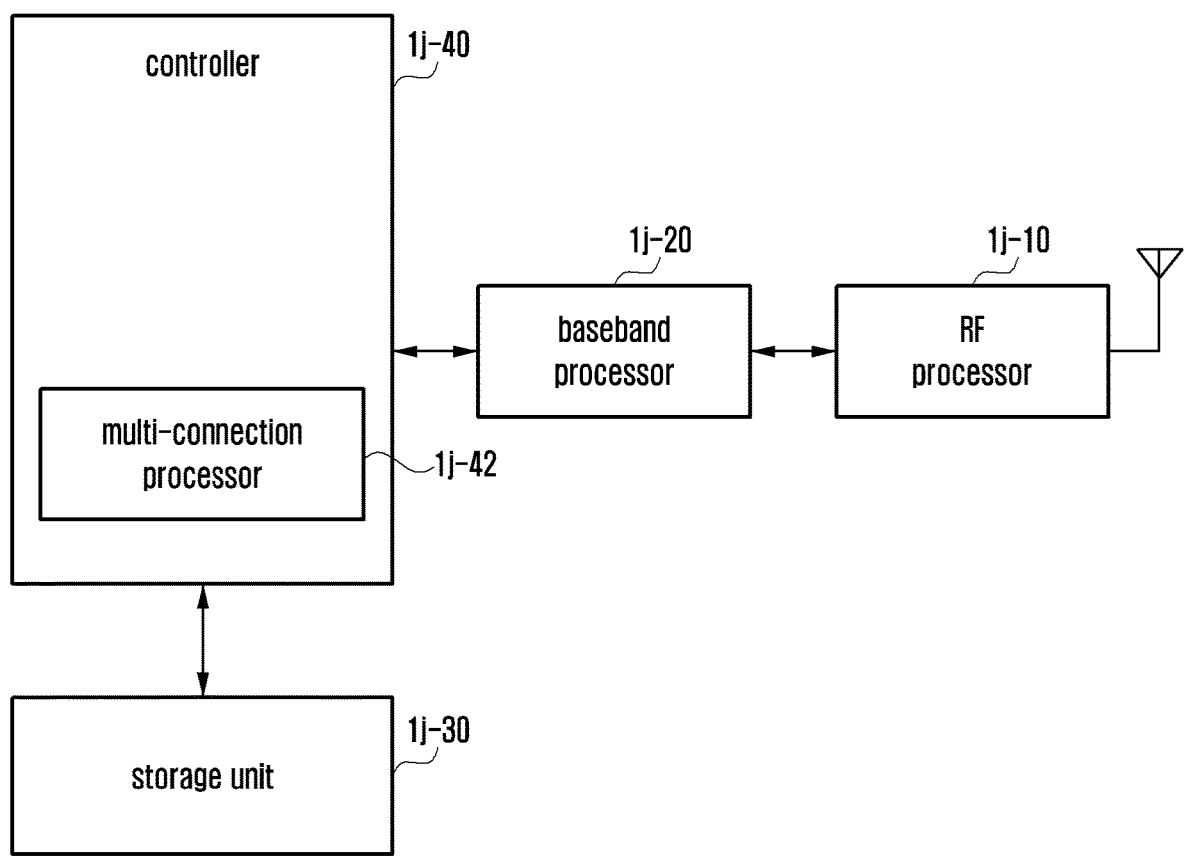
FIG. 1J is a block diagram illustrating a configuration of a terminal according to an embodiment of the present disclosure.

FIG. 1J is a diagram illustrating the configuration of a terminal according to an embodiment of the present disclosure.

Referring to FIG. 1J, the terminal includes a radio frequency (RF) processor 1j-10, a baseband processor 1j-20, a storage unit 1j-30, and a controller 1j-40.

The RF processor 1j-10 performs a function for transmitting and receiving a signal through a radio channel, such as signal band conversion and amplification. That is, the RF processor 1j-10 performs up-conversion of a baseband signal provided from the baseband processor 1j-20 into an RF-band signal to transmit the converted signal to an antenna, and performs down-conversion of the RF-band signal received through the antenna into a baseband signal. For example, the RF processor 1j-10 may include a transmission filter, a reception filter, an amplifier, a mixer, an oscillator, a digital-to-analog converter (DAC), and an analog-to-digital converter (ADC). Although only one antenna is illustrated in the drawing, the terminal may be provided with a plurality of antennas. Further, the RF processor 1j-10 may include a plurality of RF chains. Further, the RF processor 1j-10 may perform beamforming. For the beamforming, the RF processor 1j-10 may adjust phases and sizes of signals transmitted or received through the plurality of antennas or antenna elements. Further, the RF processor may perform multiple input multiple output (MIMO), and may receive several layers during performing of a MIMO operation. The RF processor 1j-10 may perform reception beam sweeping through proper configuration of the plurality of antennas or antenna elements under the control of the controller, or may control the direction and the beam width of the reception beam so that the reception beam is synchronized with the transmission beam.

The baseband processor 1j-20 performs conversion between a baseband signal and a bit string in accordance with the physical layer (PHY) standard of the system. For example, during data transmission, the baseband processor 1j-20 generates complex symbols by encoding and modulating a transmitted bit string. Further, during data reception, the baseband processor 1j-20 restores a received bit string by demodulating and decoding the baseband signal provided from the RF processor 1j-10. For example, in the case of following an OFDM method, during data transmission, the baseband processor 1j-20 generates complex symbols by encoding and modulating a transmitted bit string, performs mapping of the complex symbols on subcarriers, and then configures OFDM symbols through the inverse fast fourier transform (IFFT) operation and cyclic prefix (CP) insertion. Further, during data reception, the baseband processor 1j-20 divides the baseband signal provided from the RF processor 1j-10 in the unit of OFDM symbols, restores the signals mapped on the subcarriers through the fast fourier transform (FFT) operation, and then restores the received bit string through demodulation and decoding.

The baseband processor 1j-20 and the RF processor 1j-10 transmit and receive the signals as described above. Accordingly, the baseband processor 1j-20 and the RF processor 1j-10 may be called a transmitter, a receiver, a transceiver, or a communication unit. Further, in order to support different radio connection technologies, at least one of the baseband processor 1j-20 and the RF processor 1j-10 may include a plurality of communication modules. Further, in order to process signals of different frequency bands, at least one of the baseband processor 1j-20 and the RF processor 1j-10 may include different communication modules. For example, the different radio connection technologies may include an LTE network and an NR network. Further, the different frequency bands may include super high frequency (SHF) (e.g., 2.5 GHz or 5 GHz) band and millimeter wave (mmWave) (e.g., 60 GHz) band.

The storage unit **1*j*-30 stores therein a basic program for an operation of the terminal, application programs, and data of configuration information. The storage unit 1*j*-30 provides stored data in accordance with a request from the controller 1*j*-40**.

The controller **1*j*-40 controls the whole operation of the terminal. For example, the controller 1*j*-40 transmits and receives signals through the baseband processor 1*j*-20 and the RF processor 1*j*-10. Further, the controller 1*j*-40 records or reads data in or from the storage unit 1*j*-30. For this, the controller 1*j*-40 may include at least one processor. For example, the controller 1*j*-40 may include a communication processor (CP) performing a control for communication and an application processor (AP) controlling an upper layer, such as an application program, and may include a multi-connection processor 1*j*-42**.

Figure 1K:
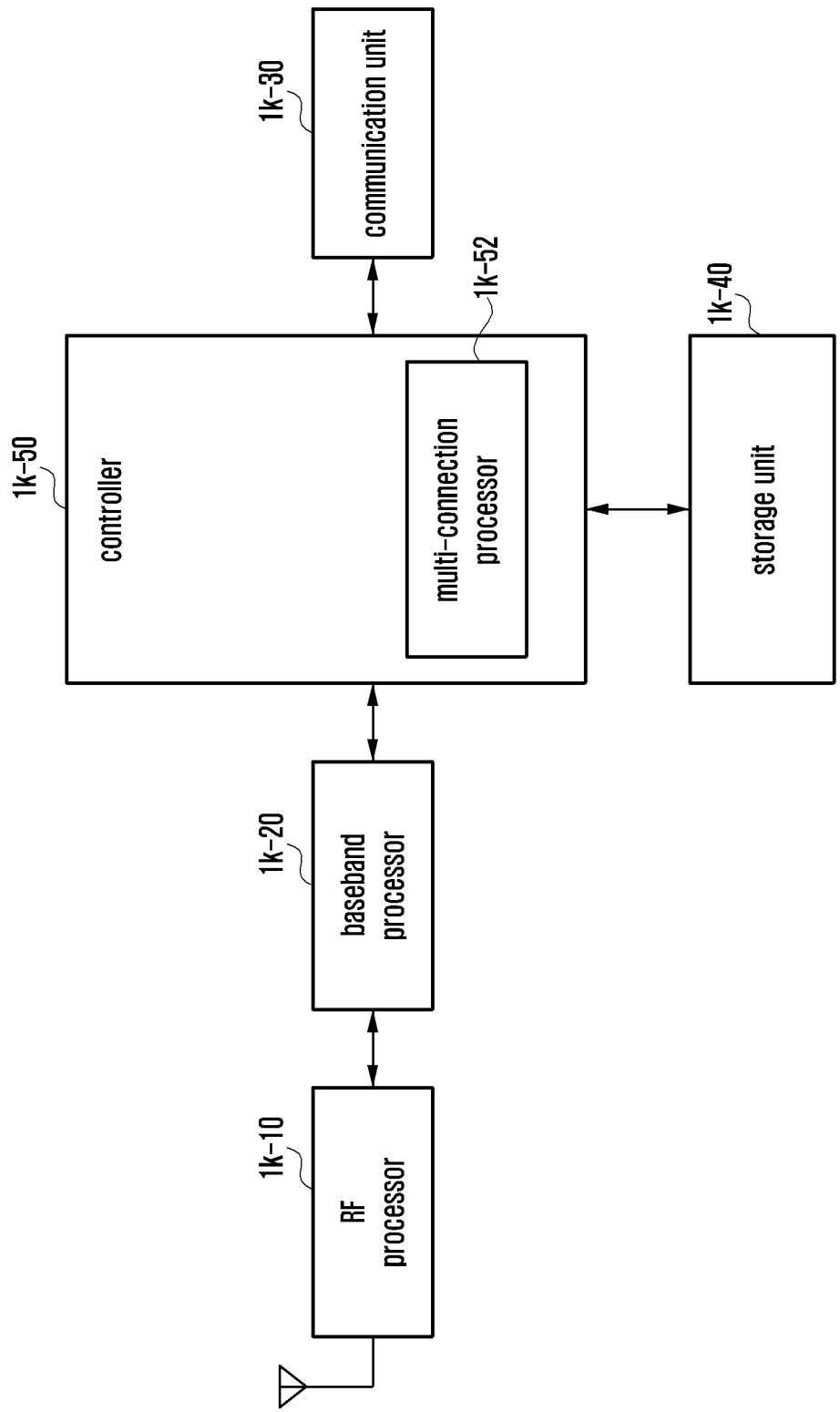
FIG. 1K is a block diagram illustrating a configuration of a base station transceiver according to an embodiment of the present disclosure.

FIG. 1K is a diagram illustrating the configuration of a base station in a wireless communication system according to an embodiment of the present disclosure.

Referring to FIG. 1K, the base station includes an RF processor **1*k*-10, a baseband processor 1*k*-20, a backhaul communication unit 1*k*-30, a storage unit 1*k*-40, and a controller 1*k*-50**.

The RF processor **1*k*-10 performs a function for transmitting and receiving a signal through a radio channel, such as signal band conversion and amplification. That is, the RF processor 1*k*-10 performs up-conversion of a baseband signal provided from the baseband processor 1*k*-20 into an RF-band signal to transmit the converted signal to an antenna, and performs down-conversion of the RF-band signal received through the antenna into a baseband signal. For example, the RF processor 1*k*-10 may include a transmission filter, a reception filter, an amplifier, a mixer, an oscillator, a DAC, and an ADC. Although only one antenna is illustrated in the drawing, the first connection node may be provided with a plurality of antennas. Further, the RF processor 1*k*-10 may include a plurality of RF chains. Further, the RF processor 1*k*-10 may perform beamforming. For the beamforming, the RF processor 1*k*-10** may adjust phases and sizes of signals transmitted or received through the plurality of antennas or antenna elements. Further, the RF processor may perform down MIMO operation through transmission of one or more layers.

The baseband processor **1*k*-20 performs conversion between a baseband signal and a bit string in accordance with the PHY standard of the first radio connection technology. For example, during data transmission, the baseband processor 1*k*-20 generates complex symbols by encoding and modulating a transmitted bit string. Further, during data reception, the baseband processor 1*k*-20 restores a received bit string by demodulating and decoding the baseband signal provided from the RF processor 1*k*-10. For example, in the case of following an OFDM method, during data transmission, the baseband processor 1*k*-20 generates complex symbols by encoding and modulating a transmitted bit string, performs mapping of the complex symbols on subcarriers, and then configures OFDM symbols through the IFFT operation and CP insertion. Further, during data reception, the baseband processor 1*k*-20 divides the baseband signal provided from the RF processor 1*k*-10 in the unit of OFDM symbols, restores the signals mapped on the subcarriers through the FFT operation, and then restores the received bit string through demodulation and decoding. The baseband processor 1*k*-20 and the RF processor 1*k*-10 transmit and receive the signals as described above. Accordingly, the baseband processor 1*k*-20 and the RF processor 1*k*-10** may be called a transmitter, a receiver, a transceiver, or a communication unit.

The backhaul communication unit **1*k*-30** provides an interface for performing communication with other nodes in the network.

The storage unit **1*k*-40 stores therein a basic program for an operation of the main base station, application programs, and data of configuration information. In particular, the storage unit 1*k*-40 may store information on a bearer allocated to the connected terminal and the measurement result reported from the connected terminal. Further, the storage unit 1*k*-40 may store information that becomes a basis of determination whether to provide or suspend a multi-connection to the terminal. Further, the storage unit 1*k*-40 provides stored data in accordance with a request from the controller 1*k*-50**.

The controller **1*k*-50 controls the whole operation of the main base station. For example, the controller 1*k*-50 transmits and receives signals through the baseband processor 1*k*-20 and the RF processor 1*k*-10 or through the backhaul communication unit 1*k*-30. Further, the controller 1*k*-50 records or reads data in or from the storage unit 1*k*-40. For this, the controller 1*k*-50 may include at least one processor. For example, the controller 1*k*-50 may include a multi-connection processor 1*k*-52**.

Second Embodiment

Figure 2A:
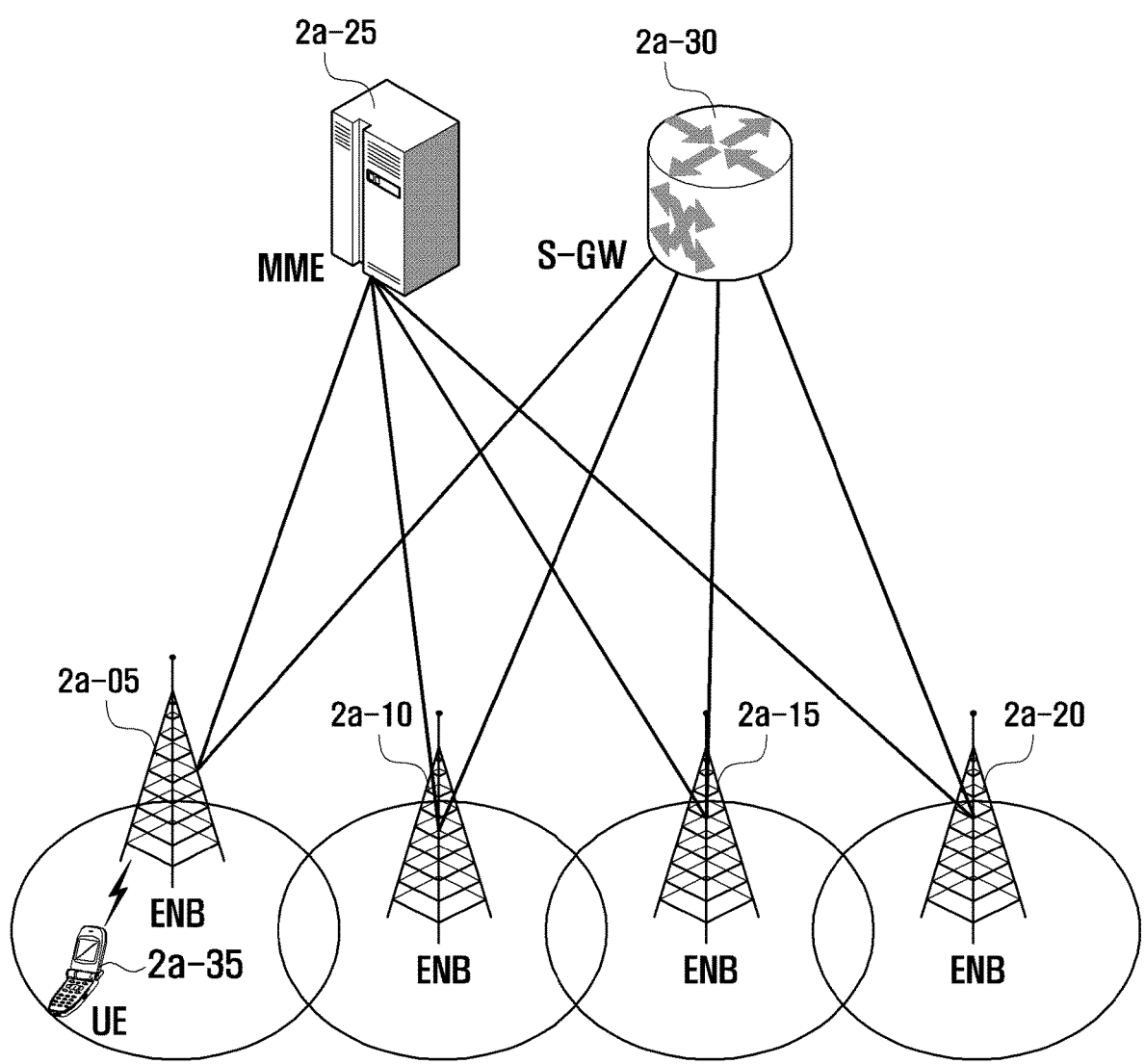
FIG. 2A is a diagram illustrating a structure of a long term evolution (LTE) system for reference according to an embodiment of the present disclosure.

FIG. 2A is a diagram illustrating the structure of an LTE system for reference according to an embodiment of the present disclosure.

Referring to FIG. 2A, a wireless communication system is composed of several base stations **2*a*-05, 2*a*-10, 2*a*-15, and 2*a*-20, an MME 2*a*-25, and a serving-gateway (S-GW) 2*a*-30. UE or "terminal" 2*a*-35 connects to an external network through the base stations 2*a*-05, 2*a*-10, 2*a*-15, and 2*a*-20 and the S-GW 2*a*-30**.

The base stations **2*a*-05, 2*a*-10, 2*a*-15, and 2*a*-20 are connection nodes in a cellular network, and provide radio connection to terminals connecting to the network. That is, in order to service users' traffics, the base stations 2*a*-05, 2*a*-10, 2*a*-15, and 2*a*-20 perform scheduling through consolidation of status information, such as a buffer state, an available transmission power state, and a channel state, of the terminals to support a connection between the terminals and a CN. The MME 2*a*-25 is a device that takes charge of not only mobility management of the terminal but also various kinds of control functions. The MME is connected to the plural base stations, and the S-GW 2*a*-30 is a device that provides data bearers. Further, the MME 2*a*-25 and the S-GW 2*a*-30 may further perform an authentication of the terminal that connects to the network and bearer management, and process packets arrived from the base stations 2*a*-05, 2*a*-10, 2*a*-15, and 2*a*-20 and packets to be transferred to the base stations 2*a*-05, 2*a*-10, 2*a*-15, and 2*a*-20**.

Figure 2B:
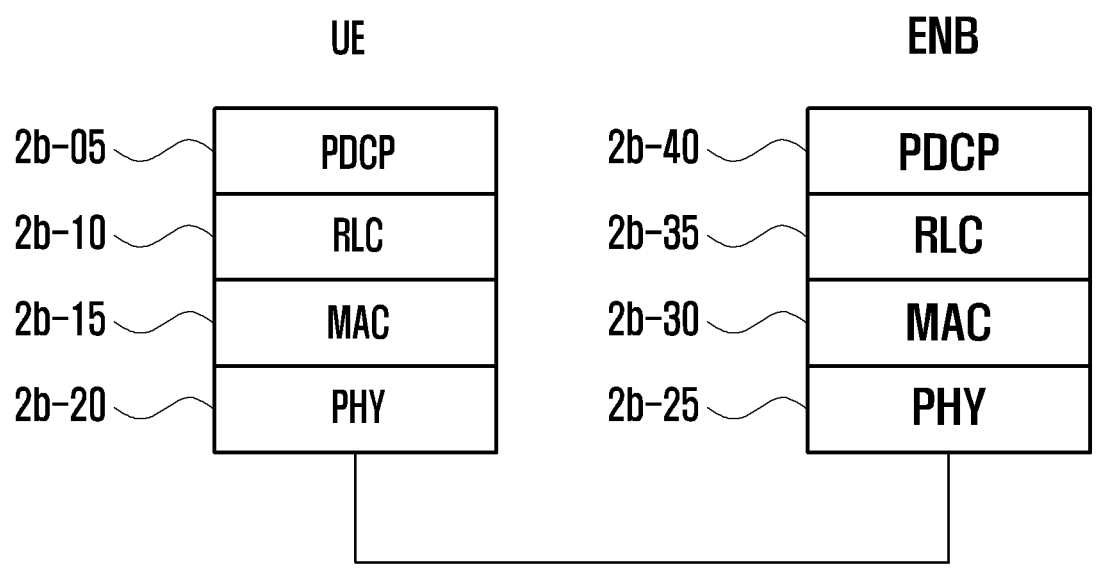
FIG. 2B is a diagram illustrating a radio protocol structure of an LTE system for reference according to an embodiment of the present disclosure.

FIG. 2B is a diagram illustrating a radio protocol structure of an LTE system according to an embodiment of the present disclosure. The radio protocol structure in the drawing may be partially different from a radio protocol structure of an NR to be defined hereafter, but the explanation thereof will be made for convenience in explaining the present disclosure.

Referring to FIG. 2B, in a terminal or an ENB, a radio protocol of an LTE system is composed of a PDCP **2*b*-05 or 2*b*-40, a radio link control (RLC) 2*b*-10 or 2*b*-35, and an MAC 2*b*-15 or 2*b*-30. The PDCP 2*b*-05 or 2*b*-40** takes charge of IP header compression/decompression operations, and the RLC 2b-10 or 2b-35 reconfigures a PDCP packet data unit (PDU) with a suitable size. The MAC 2b-15 or 2b-30 is connected to various RLC layer devices that are configured in one terminal, and performs multiplexing of RLC PDUs to a MAC PDU and demultiplexing of the RLC PDUs from the MAC PDU. Physical layer 2b-20 or 2b-25 performs channel coding and modulation of upper layer data and produces OFDM symbols to transmit the OFDM symbols through a radio channel, or performs demodulation and channel decoding of the OFDM symbols received through the radio channel to transfer the demodulated and decoded OFDM symbols to an upper layer. Further, the PHY uses hybrid automatic repeat request (ARQ) (HARQ) for additional error correction, and a receiving end transmits whether to receive the packet transmitted from a transmitting end with one bit. This is called HARQ ACK/negative acknowledgment (NACK) information.

Downlink HARQ ACK/NACK information against uplink transmission may be transmitted through a physical hybrid-ARQ indicator channel (PHICH), and uplink HARQ ACK/NACK information against downlink transmission may be transmitted through a PUCCH or a physical uplink shared channel (PUSCH).

Although not illustrated in the drawing, a radio resource control (RRC) layer may exist in an upper position of the PDCH layer of the terminal and the base station, and it may send and receive connection and measurement related configuration control messages for the RRC. For example, the base station may instruct the terminal to perform measurement using a message of the RRC layer, and the terminal may report the measurement result to the base station using the message of the RRC layer.

Figure 2C:
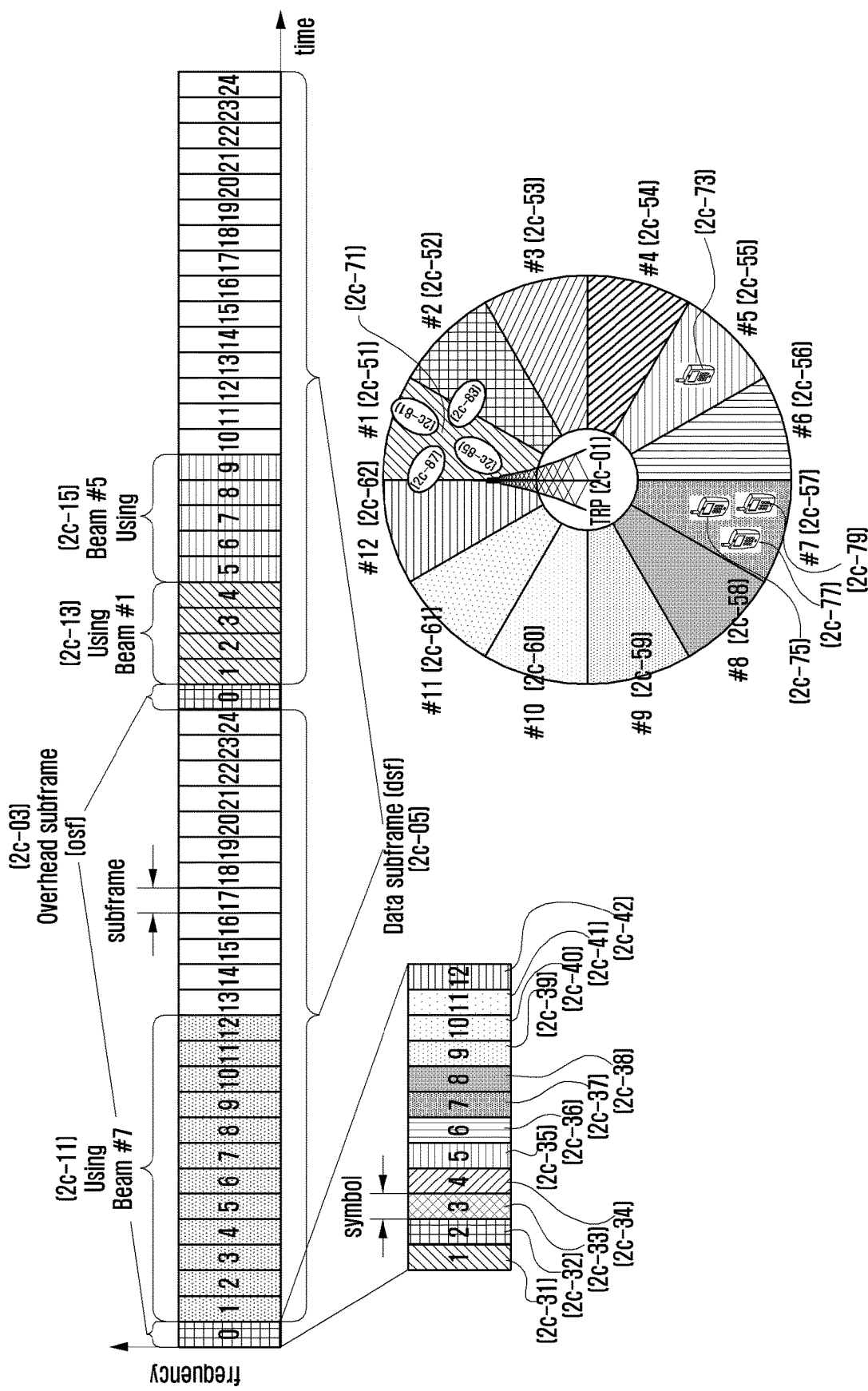
FIG. 2C is a diagram of a frame structure used in a fifth-generation (5G) system to which the present disclosure is applied according to an embodiment of the present disclosure.

FIG. 2C is a diagram of a frame structure used in a 5G system to which the present disclosure is applied according to an embodiment of the present disclosure.

Referring to FIG. 2C, a scenario in which the 5G system operates at high frequency in order to secure a wide frequency bandwidth for a high transmission speed may be considered. However, since it is difficult to transfer a signal at high frequency, a scenario in which data is transmitted through beam generation may be considered.

Accordingly, a scenario in which a base station or a TRP 2c-01 communicates with terminals 2c-71, 2c-73, 2c-75, 2c-77, and 2c-79 in a cell using different beams may be considered. That is, in FIG. 2C, it is assumed that terminal 2c-71 performs communication using beam #1 2c-51, terminal 2c-73 performs communication using beam #5 2c-55, and terminals 3, 4, and 5 perform communication through beam #7 2c-57.

In order to measure what beam the terminal communicates with the TRP through, an OSF 2c-03 exists on time, and in the OSF, the base station transmits a RS using different beams by symbols (or through several symbols). In FIG. 2C, it is assumed that the base station transmits 12 beams #1 to #12 2c-51 to 2c-62, and in the OSF, different beams are swept and transmitted for each symbol 2c-31 to 2c-42. That is, in the OSF, respective beams are transmitted by symbols (e.g., beam #1 2c-51 is transmitted at the first symbol 2c-31), and the terminal can measure what beam signal transmitted in the OSF is the strongest through measurement of the OSF. In an embodiment of the present disclosure, the beam constantly transmitted in the OSF as described above is called a common beam.

In FIG. 2C, a scenario in which the corresponding OSF is repeated for 25 subframes is assumed, and the remaining 24 subframes are DSFs 2c-05 in which general data is transmitted and received.

Accordingly, a scenario in which in accordance with the scheduling of the base station, terminals 2c-75, 2c-77, and 2c-79 perform communication commonly using beam #7 2c-11, terminal 2c-71 performs communication using beam #1 2c-13, and terminal 2c-73 performs communication using beam #5 2c-15 is assumed.

In addition, since the beam used in the DSF is a beam used for the terminal connected to the base station, data may be transmitted and received by adjusting the direction more minutely in accordance with the location of the terminal. For this, the terminal may report the strength/quality of signals transmitted from the respective beams to enable the base station to perform additional adjustment. A series of procedures for the minute adjustment as described above is called a beam refinement procedure. Through the beam refinement procedure, the base station can transmit and receive data using more optimized beam in the direction of the terminal that may differ from the direction and/or width of the beam transmitted from the OSF. In an embodiment of the present disclosure, the beam specified to the terminal through the beam refinement procedure is called a dedicated beam. It is assumed that the dedicated beam can be used only in a connected mode to be described later.

In the exemplified drawing, although the transmission beams #1 to #12 2c-51 to 2c-62 of the base station are illustrated, reception beams of the terminal for receiving the transmission beams of the base station (e.g., beams 2c-81, 2c-83, 2c-85, and 2c-87 of the terminal 2c-71) may be additionally considered. In the exemplified drawing, the terminal 1 has four beams 2c-81, 2c-83, 2c-85, and 2c-87, and it performs beam sweeping in order to determine what beam has the best reception performance. In this case, if several beams cannot be simultaneously used, the optimum transmission beam of the base station and reception beam of the terminal can be found by receiving several OSFs as many as the number of reception beams through the use of one reception beam for each OSF.

Figure 2D:
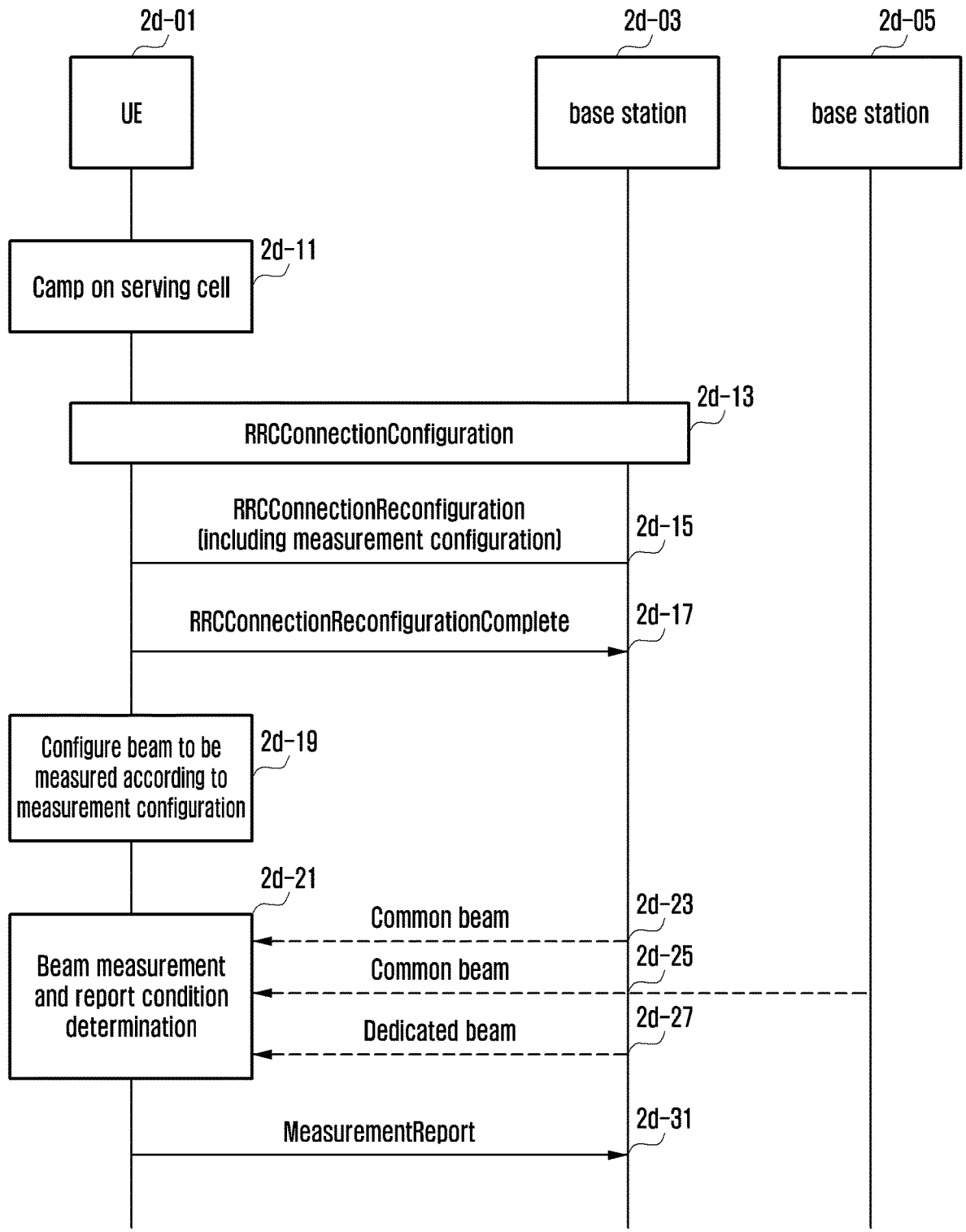
FIG. 2D is a diagram explaining a message flow between a terminal and a base station in the case of using a method for selectively determining a beam to be measured in accordance with measurement configuration according to an embodiment of the present disclosure.

FIG. 2D is a diagram explaining a message flow between a terminal and a base station in the case of using a method for selectively determining a beam to be measured in accordance with the measurement configuration proposed in an embodiment of the present disclosure.

Referring to FIG. 2D, a terminal 2d-01 that is in an idle mode RRC_IDLE camps on a corresponding base station to find a suitable cell, at operation 2d-11, and then performs connection to the base station because of generation of data to be sent, at operation 2d-13. In the idle mode, the terminal 2d-01 is not connected to the network for power saving, and thus it is unable to transmit data. For data transmission, it is necessary for the terminal 2d-01 to be shifted to a connected mode RRC_CONNECTED. Further, the term "camps" as described above means that the terminal 2d-01 stays in a corresponding cell and receives a paging message to determine whether data is sent in the downlink. If the terminal 2d-01 is successful in connecting to a base station 2d-03, the state of the terminal 2d-01 is shifted to a connected mode RRC_CONNECTED, and the terminal 2d-01 in the connected mode can transmit/receive data to/from the base station.

Thereafter, as the terminal 2d-01 in the connected mode moves into or out of the cell, it is necessary to command movement of the terminal so that the terminal performs transmission/reception through another beam or cell/base station. For this, the base station 2d-03 is configured to instruct the terminal to measure a serving beam, a neighbor beam at the same transmission & reception point (TRP) of the same cell (intra-TRP), or a neighbor beam at a different TRP of the same cell (inter-TRP) or in another cell, at operation 2d-15. The above-described measurement instruction may include one of conditions on which the terminal 2d-01 reports the measurement result to the base station 2d-03 if the following conditions are satisfied.

Event 1: A case where a serving beam becomes better than a predetermined threshold value in signal strength/quality.

Event 2: A case where a serving beam becomes worse than a predetermined threshold value in signal strength/quality.

Event 3: A case where an inter-TRP neighbor beam becomes offset better than the best intra-TRP beam in signal strength/quality.

Event 4: A case where an inter-TRP neighbor beam becomes better than a predetermined threshold value in signal strength/quality.

Event 5: A case where a serving beam becomes worse than a threshold value 1 in signal strength/quality, and an inter-TRP neighbor beam becomes better than a threshold value 2 in signal strength/quality.

The terminal 2d-01 that has received the configuration information as described above transmits a confirmation message indicating that the configuration information has been successfully received to the base station 2d-03, at operation 2d-17. For this, in the LTE, an RRC connection reconfiguration complete message may be used.

As described above with reference to FIG. 2C, if the terminal 2d-01 is in a connected mode to perform data transmission/reception, it may use a dedicated beam other than a common beam. In an embodiment of the present disclosure, if the terminal 2d-01 is configured with one of the above-described events, it determines what beam is selected to be measured, at operation 2d-19. That is, a dedicated beam may be measured in accordance with the event, or even in the case where the dedicated beam is used, the common beam may be measured. The common beam may correspond to an SS block, and the dedicated block may correspond to a CSI-RS. The measurement of the common beam may be measurement based on the SS block, and the measurement of the dedicated beam may be measurement for the CSI-RS.

More specifically, if the terminal 2d-01 measures only the signal strength/quality of a serving beam as at the events 1 and 2, it measures the common beam if it performs communication using the common beam, whereas it uses the dedicated beam if it uses the dedicated beam through a beam refinement procedure.

Further, if the terminal 2d-01 compares a serving beam with a neighbor beam in signal strength/quality as at the event 3, it may perform measurement using the common beam even in the case where the terminal 2d-01 uses the dedicated beam as the serving beam. This is to make a fair comparison between the serving beam and the neighbor beam because the neighbor beam that has no dedicated beam is measured using the common beam.

Further, even at an event where the terminal 2d-01 compares a serving beam with a predetermined threshold value 1 and compares a neighbor beam with a predetermined threshold value 2 as at the event 5, and sends a report in the case where both the conditions are all satisfied, in the same manner as at the event 3, the terminal 2d-01 performs the measurement using the common beam even in the case where the terminal 2d-01 uses the dedicated beam as the serving beam.

If the terminal 2d-01 measures only the signal strength/quality of a neighbor beam as at the event 4, it performs the measurement using the common beam of the corresponding neighbor beam because there is not dedicated beam for the corresponding neighbor beam.

For what event the terminal 2d-01 compares the serving beam with the common beam may be predetermined by the terminal 2d-01, and the base station 2d-03 may configure the same using a message, such as an RRC message or a MAC message.

As described above, the terminal 2d-01 selects a beam (i.e., common beam 2d-23, common beam 2d-25 of another base station 2d-05, or dedicated beam 2d-27 even in a serving beam) to be measure in accordance with a measurement event configured from the base station 2d-03 to measure the corresponding beam, at operation 2d-21, and if it coincides with the measurement report condition, the terminal 2d-01 reports the measurement result to the base station 2d-03, at operation 2d-31. In accordance with the measurement result, the base station 2d-03 may transmit a command to move the terminal 2d-01 to another beam in the same TRP in the same cell, to move the terminal 2d-01 to a beam in another TRP in the same cell, or to move the terminal to a beam of a TRP belonging to another cell. In an embodiment of the present disclosure, it is assumed that the terminal 2d-01 can determine a cell, a TRP in the cell, and a beam identifier from a common beam transmitted by each TRP.

Figure 2E:
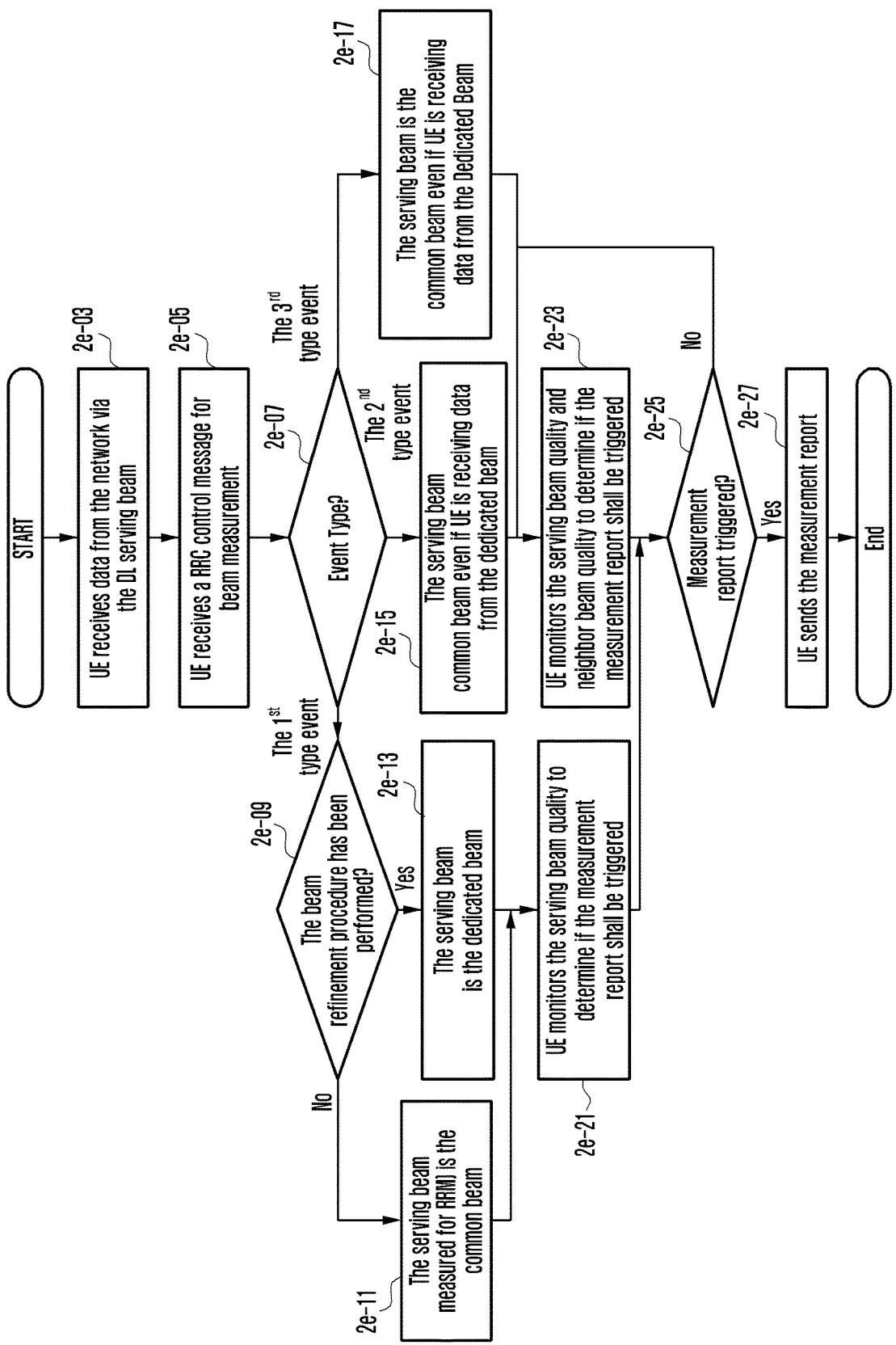
FIG. 2E is a diagram explaining an order of operations of a terminal to which the present disclosure is applied according to an embodiment of the present disclosure.

FIG. 2E is a diagram explaining the order of operations of a terminal according to an embodiment of the present disclosure.

Referring to FIG. 2E, in the drawing, it is assumed that a terminal in a connected mode connects to a base station/cell to transmit/receive data to/from a beam of the corresponding cell, at operation 2e-03.

As described above, for mobility management, the terminal in a connected mode is instructed by the base station to perform measurement configuration, at operation 2e-05. A measurement configuration instruction message may include one or more of events below, and if the following conditions are satisfied, the terminal reports the measurement result to the base station.

Event 1: A case where a serving beam becomes better than a predetermined threshold value in signal strength/quality.

Event 2: A case where a serving beam becomes worse than a predetermined threshold value in signal strength/quality.

Event 3: A case where an inter-TRP neighbor beam becomes offset better than the best intra-TRP beam in signal strength/quality.

Event 4: A case where an inter-TRP neighbor beam becomes better than a predetermined threshold value in signal strength/quality.

Event 5: A case where a serving beam becomes worse than a threshold value 1 in signal strength/quality, and an inter-TRP neighbor beam becomes better than a threshold value 2 in signal strength/quality.

The terminal that has received the measurement configuration determines what event the configured measurement event is, at operation 2e-07.

If the configured measurement event is to compare a serving beam with a predetermined threshold value in signal strength/quality like the event 1 or 2, the terminal determines whether it currently communicates with the serving cell using a common beam or a dedicated beam through a beam refinement procedure, at operation 2e-09. If the terminal currently communicates with the serving cell using the common beam, it performs the measurement using the common beam when performing the measurement in accordance with the event, at operation 2e-11. If the terminal currently communicates with the serving cell using the dedicated beam through the beam refinement procedure, it performs the measurement using the dedicated beam when performing the measurement in accordance with the event, at operation 2e-13. As described above with reference to FIG. 2C, the common beam is a beam sweeping in respective directions even in a subframe, such as the OSF. Further, the dedicated beam is featured to have a different direction and/or beam width from those of the common beam, and the terminal in a connection state is featured to transmit a dedicated message for indicating what beam is to be used through the beam refinement procedure. Accordingly, the terminal determines whether to perform a measurement report through measurement of the signal strength/quality with respect to the selected serving beam, at operation 2e-21.

If the configured measurement event is to compare a serving beam with a neighbor beam in signal strength/quality like the event 3, the terminal performs measurement using a common beam even in the case of communicating with the serving cell using a dedicate beam through a beam refinement procedure, at operation 2e-15. The neighbor beam may be a beam of another TRP of the same cell (intra-cell inter-TRP), or a beam of another TRP of another cell (inter-cell inter-TRP). Accordingly, it is assumed that each beam includes a cell identifier and a TRP identifier. Accordingly, if the neighbor beam means a beam of another TRP of the same cell (intra-cell inter-TRP), it means that the TRP identifier becomes different, whereas if the neighbor beam means a beam of another TRP of another cell (inter-cell inter-TRP), it means that the cell identifier becomes different. Accordingly, the terminal selects the common beam with respect to the serving beam, and determines whether to perform a measurement report through measurement of signal strength/quality with respect to the serving beam and the neighbor beam, at operation 2e-23.

If the configured measurement event is to compare a serving beam with a predetermined threshold value in signal strength/quality and to compare a neighbor beam with a predetermined threshold value in signal strength/quality like the event 5, the terminal performs measurement using a common beam even in the case of communicating with the serving cell using a dedicate beam through a beam refinement procedure, at operation 2e-17. The neighbor beam may be a beam of another TRP of the same cell (intra-cell inter-TRP), or a beam of another TRP of another cell (inter-cell inter-TRP). Accordingly, it is assumed that each beam includes a cell identifier and a TRP identifier. Accordingly, if the neighbor beam means a beam of another TRP of the same cell (intra-cell inter-TRP), it means that the TRP identifier becomes different, whereas if the neighbor beam means a beam of another TRP of another cell (inter-cell inter-TRP), it means that the cell identifier becomes different. Accordingly, the terminal selects the common beam with respect to the serving beam, and determines whether to perform a measurement report through measurement of signal strength/quality with respect to the serving beam and the neighbor beam, at operation 2e-23.

If it is determined to transmit the measurement result in accordance with the determination as described above, at operation 2e-25, the terminal reports the measurement result to the base station, at operation 2e-27. Through this, the base station can transmit a command to move the terminal to another beam in the same TRP in the same cell, to move the terminal to a beam in another TRP in the same cell, or to move the terminal to a beam of the TRP belonging to another cell.

Figure 2F:
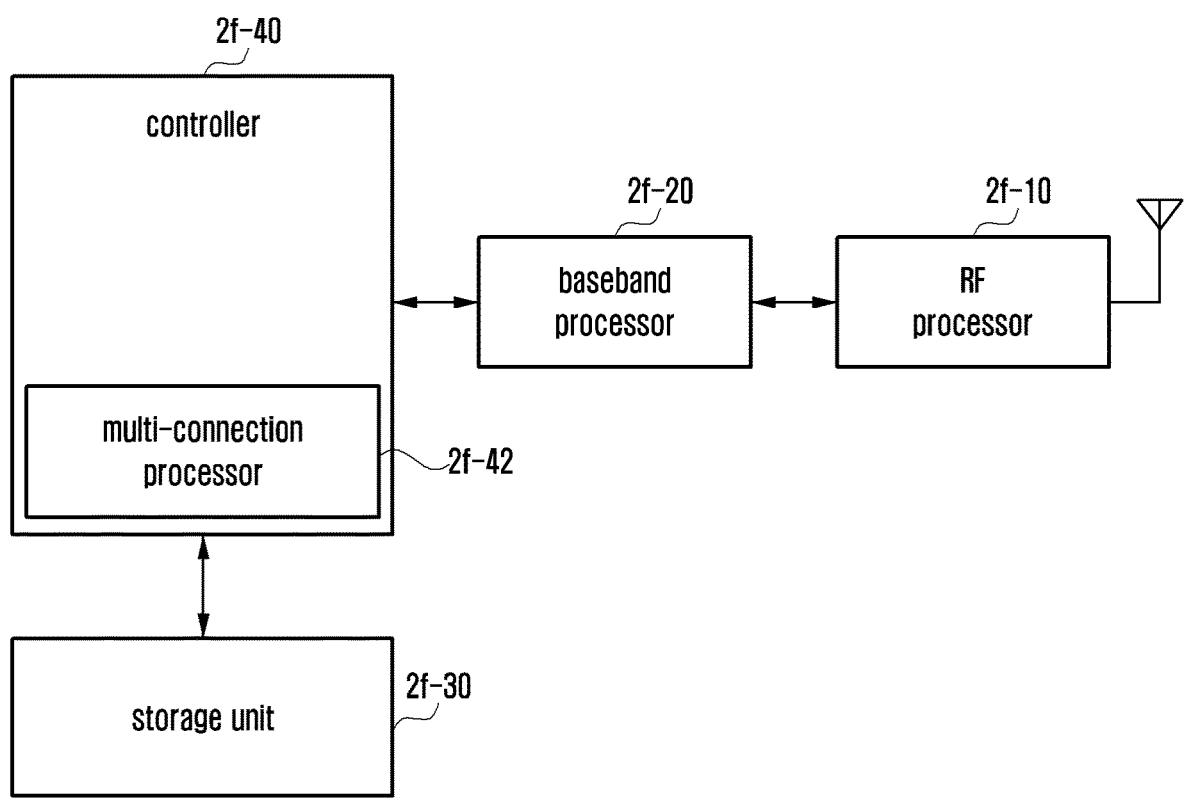
FIG. 2F is a diagram illustrating a configuration of a terminal according to an embodiment of the present disclosure.

FIG. 2F is a block diagram illustrating the configuration of a terminal according to an embodiment of the present disclosure.

Referring to FIG. 2F, the terminal includes an RF processor 2f-10, a baseband processor 2f-20, a storage unit 2f-30, and a controller 2f-40.

The RF processor 2f-10 performs a function for transmitting and receiving a signal through a radio channel, such as signal band conversion and amplification. That is, the RF processor 2f-10 performs up-conversion of a baseband signal provided from the baseband processor 2f-20 into an RF-band signal to transmit the converted signal to an antenna, and performs down-conversion of the RF-band signal received through the antenna into a baseband signal. For example, the RF processor 2f-10 may include a transmission filter, a reception filter, an amplifier, a mixer, an oscillator, a DAC, and an ADC. Although only one antenna is illustrated in FIG. 2F, the terminal may be provided with a plurality of antennas. Further, the RF processor 2f-10 may include a plurality of RF chains. Further, the RF processor 2f-10 may perform beamforming. For the beamforming, the RF processor 2f-10 may adjust phases and sizes of signals transmitted or received through the plurality of antennas or antenna elements.

The baseband processor 2f-20 performs conversion between a baseband signal and a bit string in accordance with the PHY standard of the system. For example, during data transmission, the baseband processor 2f-20 generates complex symbols by encoding and modulating a transmitted bit string. Further, during data reception, the baseband processor 2f-20 restores a received bit string by demodulating and decoding the baseband signal provided from the RF processor 2f-10. For example, in the case of following an OFDM method, during data transmission, the baseband processor 2f-20 generates complex symbols by encoding and modulating a transmitted bit string, performs mapping of the complex symbols on subcarriers, and then configures OFDM symbols through the IFFT operation and CP insertion. Further, during data reception, the baseband processor 2f-20 divides the baseband signal provided from the RF processor 2f-10 in the unit of OFDM symbols, restores the signals mapped on the subcarriers through the FFT operation, and then restores the received bit string through demodulation and decoding.

The baseband processor 2f-20 and the RF processor 2f-10 transmit and receive the signals as described above. Accordingly, the baseband processor 2f-20 and the RF processor 2f-10 may be called a transmitter, a receiver, a transceiver, or a communication unit. Further, in order to process signals of different frequency bands, at least one of the baseband processor 2f-20 and the RF processor 2f-10 may include different communication modules. Further, the different frequency bands may include SHF (e.g., 2.5 GHz or 5 GHz) band and millimeter wave (mm Wave) (e.g., 60 GHz) band.

The storage unit 2f-30 stores therein a basic program for an operation of the terminal, application programs, and data of configuration information.

The controller 2f-40 controls the whole operation of the terminal. For example, the controller 2f-40 transmits and receives signals through the baseband processor 2f-20 and the RF processor 2f-10. Further, the controller 2f-40 records or reads data in or from the storage unit 2*f*-30. For this, the controller 2*f*-40 may include at least one processor. For example, the controller 2*f*-40 may include a CP performing a control for communication and an AP controlling an upper layer, such as an application program. In an embodiment of the present disclosure, the controller 2*f*-40 includes a multi-connection processor 2*f*-42. For example, the controller 2*f*-40 may control the terminal to perform a procedure illustrated as the operation of the terminal as illustrated in FIG. 2F.

In an embodiment of the present disclosure, the terminal receives a message for commanding measurement from the base station after connecting to the base station. The controller that has received this determines whether a condition to transmit a measurement report to the base station is satisfied through measurement of the beam to be measured in accordance with the measurement event configured from the base station. If the condition is satisfied, the controller generates a message including the measurement result and transmits the generated message to the base station through the baseband processor and the RF processor.

Third Embodiment

Figure 3A:
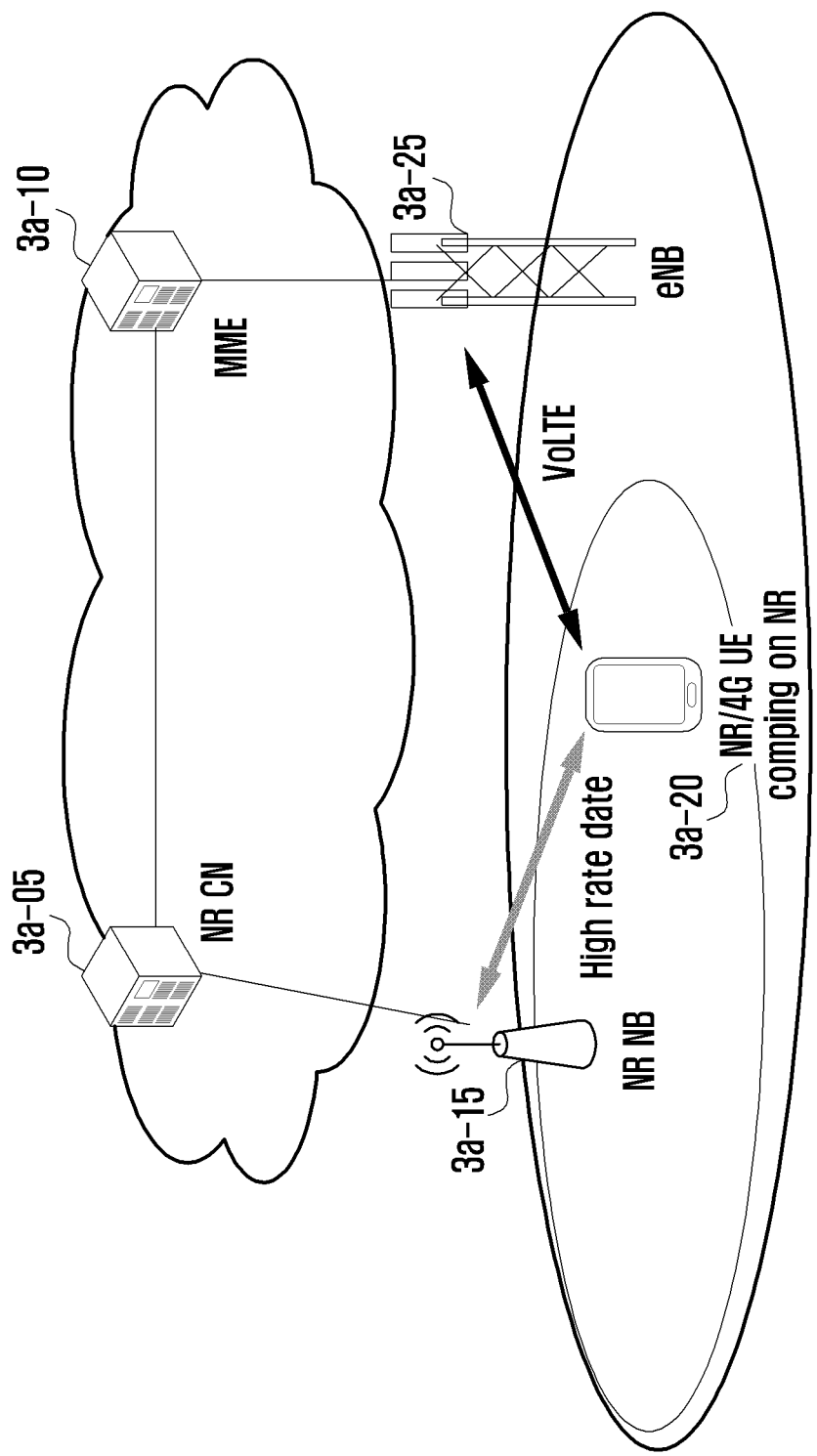
FIG. 3A is a diagram explaining a multi-connectivity operation scenario in a next-generation mobile communication system according to an embodiment of the present disclosure.

FIG. 3A is a diagram explaining a multi-connectivity operation scenario in a next-generation mobile communication system according to an embodiment of the present disclosure.

Referring to FIG. 3A, a radio access network of a next-generation mobile communication system is composed of an NR NB 3*a*-15 and an NR CN 3*a*-05. A user terminal (NR UE) 3*a*-20 connects to an external network through the NR NB 3*a*-15 and the NR CN 3*a*-05.

Referring to FIG. 3A, the NR NB 3*a*-15 corresponds to an eNB of the existing LTE system. The NR NB may be connected to the NR UE 3*a*-20 through a radio channel, and thus can provide a more superior service than the service of the existing node B. Since all user traffics are serviced through shared channels, a device that performs scheduling through consolidation of status information, such as a buffer state, an available transmission power state, and a channel state, of each UE is necessary, and the NR NB 3*a*-15 takes charge of this. One NR NB generally controls plural cells. In order to implement ultrahigh-speed data transmission as compared with the existing LTE, the NR NB may have a bandwidth that is equal to or higher than the existing maximum bandwidth, and a beamforming technology may be additionally grafted in consideration of OFDM as a radio connection technology. Further, an AMC method that determines a modulation scheme and a channel coding rate to match the channel state of the terminal is applied to the NR NB. The NR NB 3*a*-15 performs mobility support, bearer configuration, and QoS configuration. The NR CN is a device that takes charge of not only terminal mobility management but also various kinds of control functions, and is connected to a plurality of base stations. Further, the next-generation mobile communication system may interlock with the existing LTE system, and the NR CN is connected to an MME 3*a*-10 through a network interface. The MME is connected to an eNB 3*a*-25 that is the existing base station. The terminal may be simultaneously connected to the NR NB and the eNB to receive services. This is called multi-connectivity. The multi-connectivity is defined as follows.

Mode of operation whereby a multiple Rx/Tx UE in the connected mode is configured to utilize radio resources amongst E-UTRA and/or NR provided by multiple distinct schedulers connected via non-ideal backhaul.

As an example of one service scenario, a multi-connected terminal may receive a super high-speed data transmission service through the NR, and may receive a VoLTE (voice) service through the LTE.

Figure 3B:
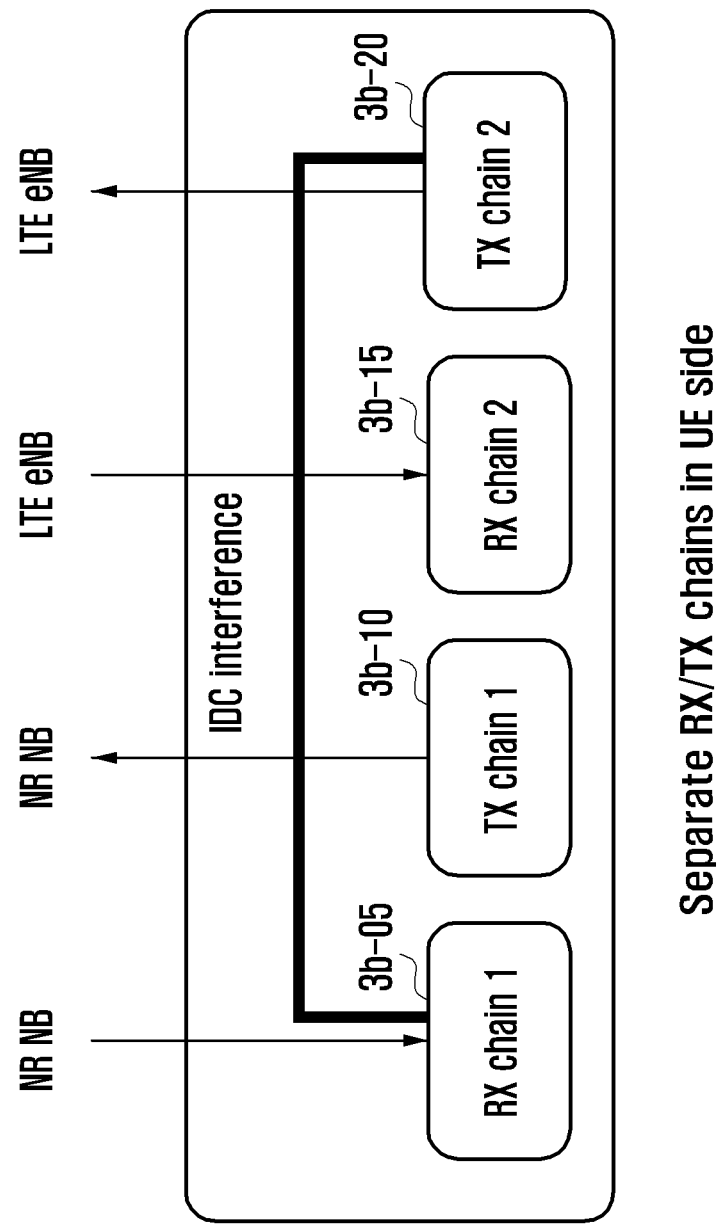
FIG. 3B is a diagram explaining a terminal having a plurality of radio frequency (RF) chains to support multi-connectivity according to an embodiment of the present disclosure.

FIG. 3B is a diagram explaining a terminal having a plurality of RF chains to support multi-connectivity according to an embodiment of the present disclosure. In order to support multi-connectivity, a plurality of RF chains are necessary.

Referring to FIG. 3B, the terminal has one RF chain composed of an RX chain 3*b*-05 and a TX chain 3*b*-10 supporting the NR and one RF chain composed of an RX chain 3*b*-15 and a TX chain 3*b*-20 supporting the LTE. The terminal having the plurality of RF chains can simultaneously perform data transmission/reception with the NR and the LTE. However, such a structure may increase power consumption of the terminal due to a large number of RF chains, and there is no room for saving in material cost. In the case of a cheap terminal, such cost increase may cause multi-connectivity support to be not possible. Further, intra-device interference may occur between RX and TX chains. This is called in-device coexistence (IDC) interference. For example, a signal that is radiated from the TX chain may be input to the RX chain of the NR to become an interference signal of the NR.

Figure 3C:
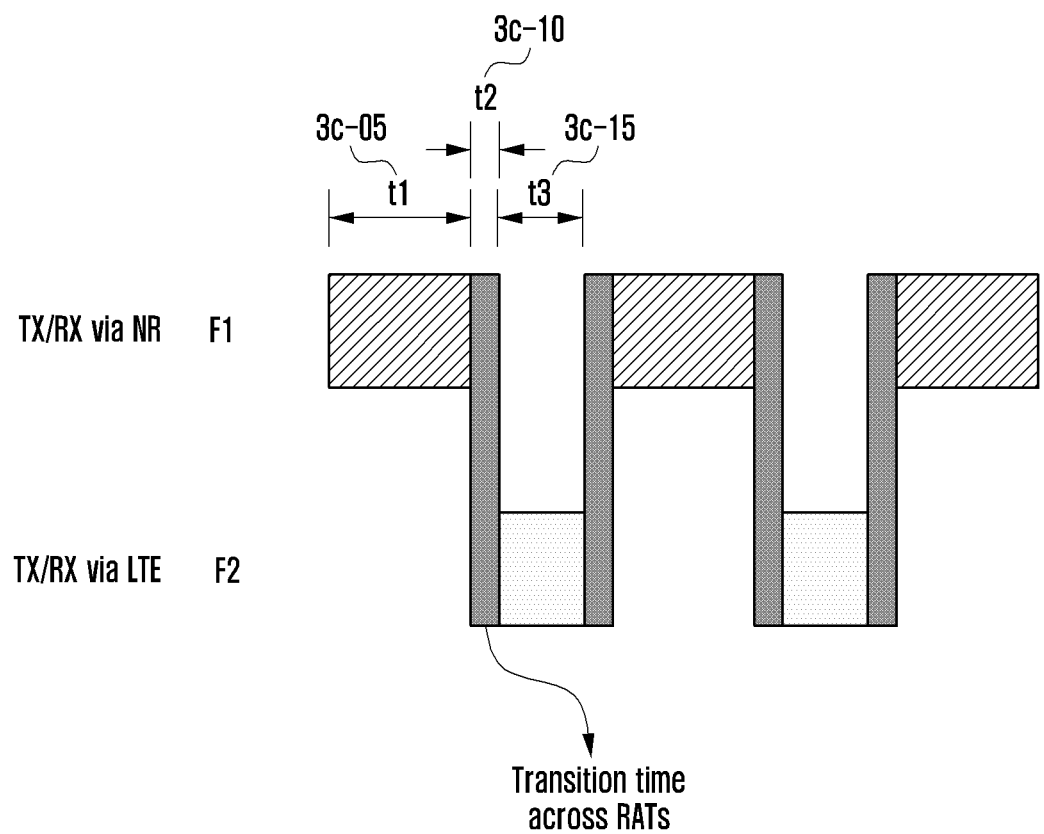
FIG. 3C is a diagram explaining application of a time domain multiplexing (TDM) method to support multi-connectivity according to an embodiment of the present disclosure.

FIG. 3C is a diagram explaining application of a TDM method to support multi-connectivity.

Referring to FIG. 3C, one method to overcome the drawback of the multi-connectivity using a plurality of RF chains as described above is to apply a TDM method to transmit/receive data only with one system at one moment in a state where a single RF chain is utilized. The single RF chain means reduction of the power consumption and the material cost in the terminal. Further, by the TDM method, IDC interference can be excluded. For example, in the case where NR is used in frequency F1 and LTE is used in frequency F2, the terminal may transmit/receive data to/from the NR at a specific time period t1 3*c*-05, and may transmit/receive data to/from the LTE at a specific time period t3 3*c*-15 after a predetermined RF conversion time t2 3*c*-10. In order for a single RF chain to control a predetermined frequency band, a predetermined time is required. Accordingly, data transmission/reception is not performed during the above-described time period.

Figure 3D:
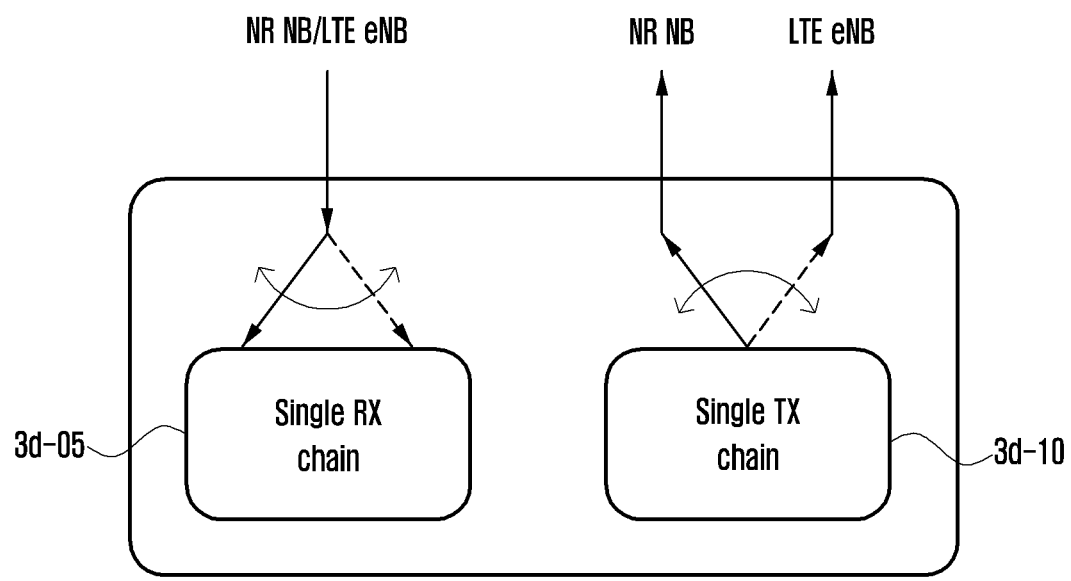
FIG. 3D is a diagram explaining a terminal having a single RF chain to apply a TDM method according to an embodiment of the present disclosure.

FIG. 3D is a diagram explaining a terminal having a single RF chain to apply a TDM method according to an embodiment of the present disclosure.

Referring to FIG. 3D, a terminal has a single RF chain composed of one RX chain 3*d*-05 and one TX chain 3*d*-10. For a specific time period, the RF chain of the terminal is configured as a frequency being used by the NR or LTE. Further, for a specific time period, the RX chain may be configured as an NR frequency (LTE frequency), and the TX chain may be configured as an LTE frequency (NR frequency).

Figure 3E:
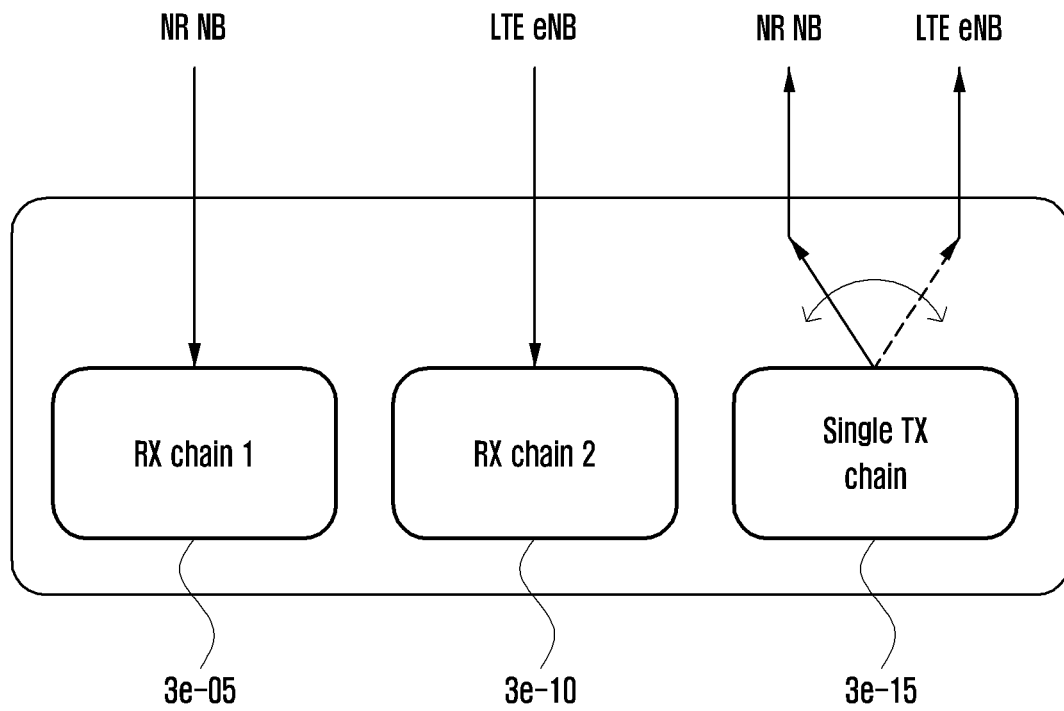
FIG. 3E is a diagram explaining a terminal having a single TX chain and plural RX chains to apply a TDM method according to an embodiment of the present disclosure.

FIG. 3E is a diagram explaining a terminal having a single TX chain and plural RX chains to apply a TDM method according to an embodiment of the present disclosure.

Referring to FIG. 3E, the terminal has a plurality of RX chains 3*e*-05 and 3*e*-10 and one TX chain 3*e*-15. The terminal can simultaneously receive data from the NR and the LTE, but can transmit data to the NR or the LTE only for a specific time period. The above-described structure has low efficiency from the viewpoint of power consumption and cost, but may have an advantage from the viewpoint of complexity.

Figure 3F:
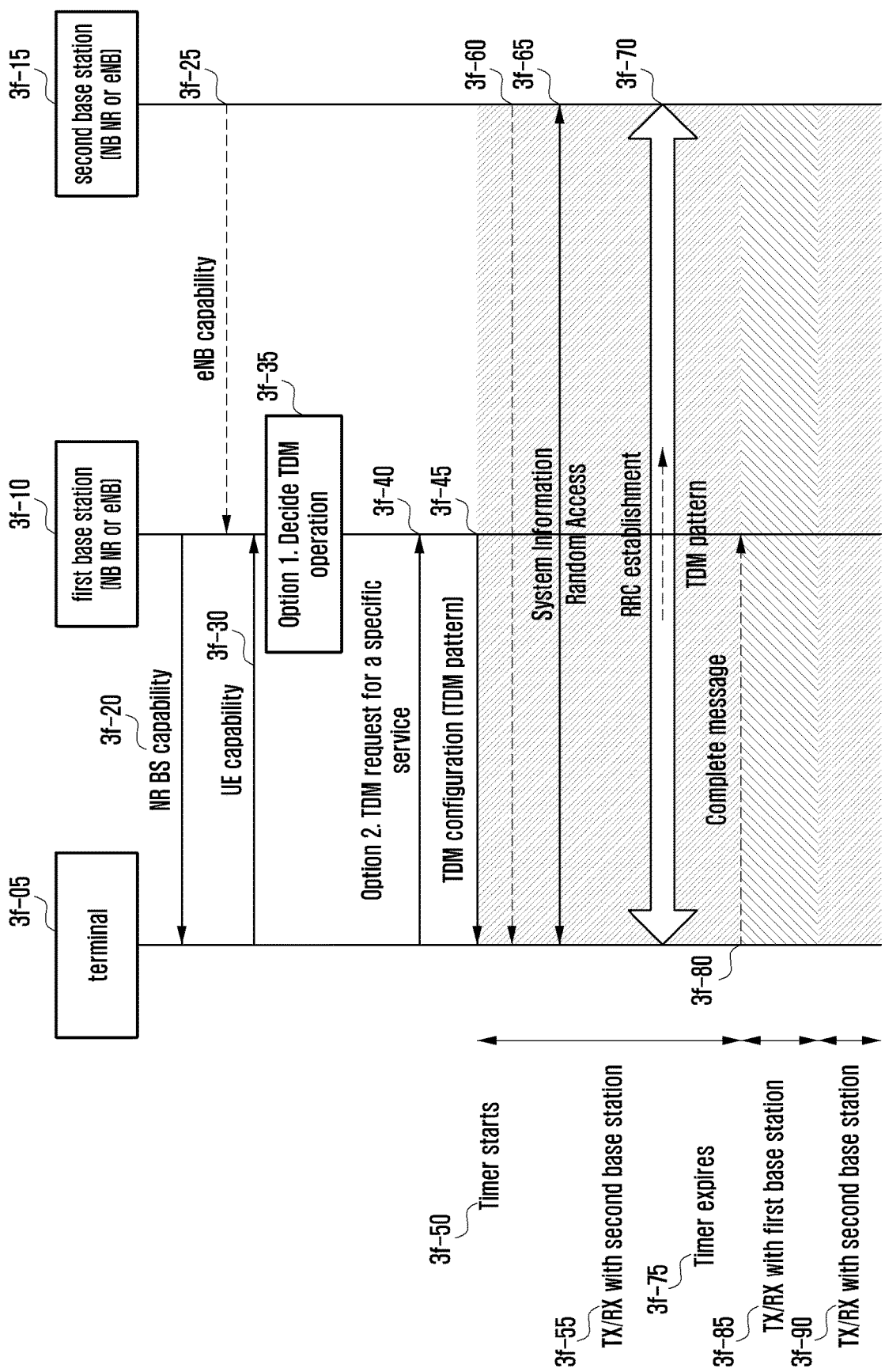
FIG. 3F is a diagram explaining a (3-1)-th embodiment to configure TDM type multi-connectivity according to an embodiment of the present disclosure.

FIG. 3F is a diagram explaining a (3-1)-th embodiment to configure TDM type multi-connectivity according to an embodiment of the present disclosure.

Referring to FIG. 3F, a terminal 3*f*-05 camps on a first base station 3*f*-10. In this case, the first base station 3*f*-10 serves as a master that triggers a TDM operation. The first base station 3*f*-10 may be either an NR NB or an eNB. The first base station 3*f*-10 notifies the terminal 3*f*-05 whether the first base station 3*f*-10 itself supports the TDM operation, at operation 3*f*-20. The terminal 3*f*-05 notifies the first base station 3*f*-10 whether the terminal 3*f*-05 itself supports the TDM operation, at operation 3*f*-30. A second base station 3*f*-15 notifies the first base station 3*f*-10 whether the second base station 3*f*-15 itself supports the TDM operation, at operation 3*f*-25. The first base station 3*f*-10 determines whether to configure the TDM operation in accordance with a service or QoS being provided to the terminal 3*f*-05, at operation 3*f*-35. Further, the terminal 3*f*-05 determines whether the TDM operation is necessary in accordance with the service or QoS to be provided to the terminal 3*f*-05 itself, and may request the first base station to provide the TDM operation, at operation 3*f*-40.

If it is determined to configure the TDM operation in accordance with the determination of the first base station 3*f*-10 or the terminal request, the first base station 3*f*-10 provides configuration information related to the TDM operation to the terminal 3*f*-05, at operation 3*f*-45. The configuration information includes at least information on a TDM pattern. The TDM pattern is time information in which the terminal 3*f*-05 can transmit/receive data at an NR or LTE frequency. The information may be provided in the form of a bit map or may be provided as time period information for staying at a specific frequency, period, and offset information. If the information is provided in the form of a bit map, each bit is used to indicate a frequency at which the terminal 3*f*-05 transmits/receives data for a specific unit time. The specific unit time may be configured. If the information is provided as the time period information for staying at a specific frequency, period, and offset information, a time point when data is to be transmitted or received at a specific frequency is calculated using the offset information, and data is transmitted or received for the indicated time period at the frequency using the time period information for staying at the specific frequency. The time period arrives with a specific period. The terminal 3*f*-05 that has received the TDM configuration information operates a specific timer, at operation 3*f*-50. Until the specific timer expires, the terminal should complete RRC connection establishment with the second base station 3*f*-15.

During the time when the specific timer operates, the RF chain of the terminal should be configured as the frequency used by the second base station 3*f*-15, at operation 3*f*-55. During the time period, the terminal 3*f*-05 receives system information from the second base station 3*f*-15, at operation 3*f*-60, and performs random access, at operation 3*f*-65. Further, during the time period, the terminal provides the TDM configuration information provided from the first base station 3*f*-10 to the second base station 3*f*-15. If the RRC connection establishment with the second base station 3*f*-15 is completed, the terminal 3*f*-05 starts the TDM operation at the specific time, at operation 3*f*-70. If the RRC connection establishment is not successfully completed until the timer expires, at operation 3*f*-75, the terminal 3*f*-05 cannot start the TDM operation, and in this case, the terminal 3*f*-05 notifies the first base station 3*f*-10 of such a failure using a specific message, at operation 3*f*-80. The specific time when the TDM operation starts should be known to the terminal 3*f*-05, the first base station 3*f*-10, and the second base station 3*f*-15 in all. Accordingly, a method for specifying this is necessary.

Method 1: A method in which the terminal 3*f*-05 notifies the NR or LTE of the time to start the TDM operation using the specific message of operation 3*f*-80. If the RRC connection establishment with the second base station 3*f*-15 is completed, the terminal 3*f*-05 notifies the first base station of this using L1 signaling, MAC CE, or RRC message. The second base station 3*f*-15 can implicitly grasp the TDM operation time based on the random access performance completion. Further, like the first base station 3*f*-10, the terminal 3*f*-05 may notify the second base station 3*f*-15 of this using the L1 signaling, MAC CE, or RRC message.

Method 2: A method in which the first base station 3*f*-10 implicitly starts the TDM operation. The first base station 3*f*-10 starts the TDM operation using a self-timer without receiving any message from the terminal 3*f*-05. The timer will start after the TDM configuration information is provided to the terminal 3*f*-05, and may have the configuration value that is the same as or is similar to the configuration value of the timer. The second base station 3*f*-15 can also implicitly grasp the TDM operation time based on the random access performance completion.

If the TDM operation starts, the terminal 3*f*-05 performs data transmission/reception through conversion of the NR and LTE frequencies using the TDM pattern information, at operations 3*f*-85 and 3*f*-90.

Figure 3G:
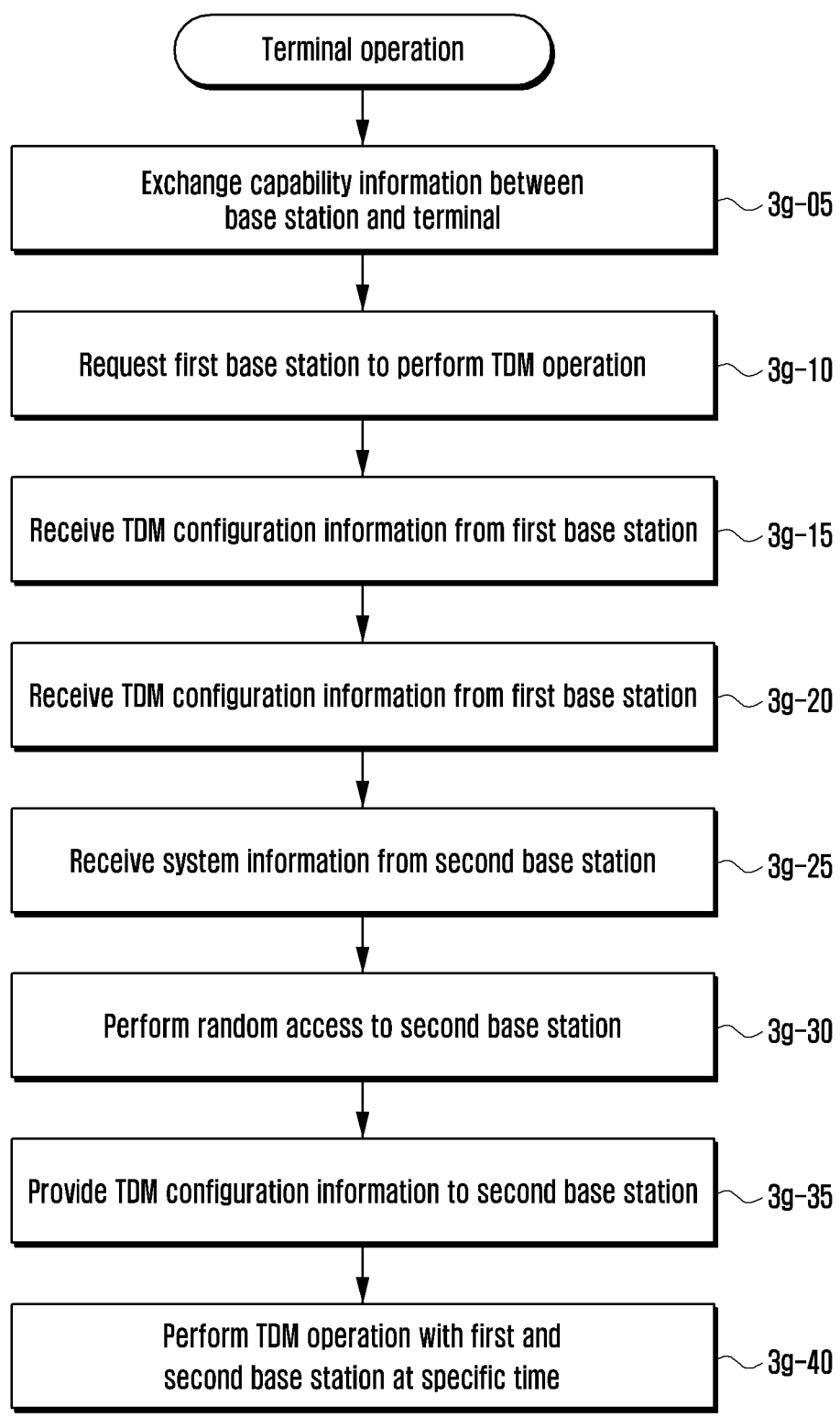
FIG. 3G is a diagram explaining an operation of a terminal according to the (3-1)-th embodiment of the present disclosure.

FIG. 3G is a diagram explaining the operation of a terminal according to the first embodiment of the present disclosure.

Referring to FIG. 3G, at operation 3*g*-05, the terminal exchanges TDM support capability with the first base station on which the terminal camps. At operation 3*g*-10, the terminal requests the TDM operation from the first base station in accordance with the kind of service to be provided to the terminal itself or QoS. At operation 3*g*-15, the terminal receives the TDM configuration information from the first base station. The configuration information includes TDM pattern information. At operation 3*g*-20, the terminal receives system information from the second base station at operation 3*g*-25, and at operation 3*g*-30, the terminal performs a random access process. At operation 3*g*-35, the terminal transmits the whole or a part of the TDM configuration information provided from the first base station to the second base station. The transmitted configuration information includes at least the TDM pattern information. At operation 3*g*-40, the terminal performs TDM operation with the first and second base stations at a specific time.

Figure 3H:
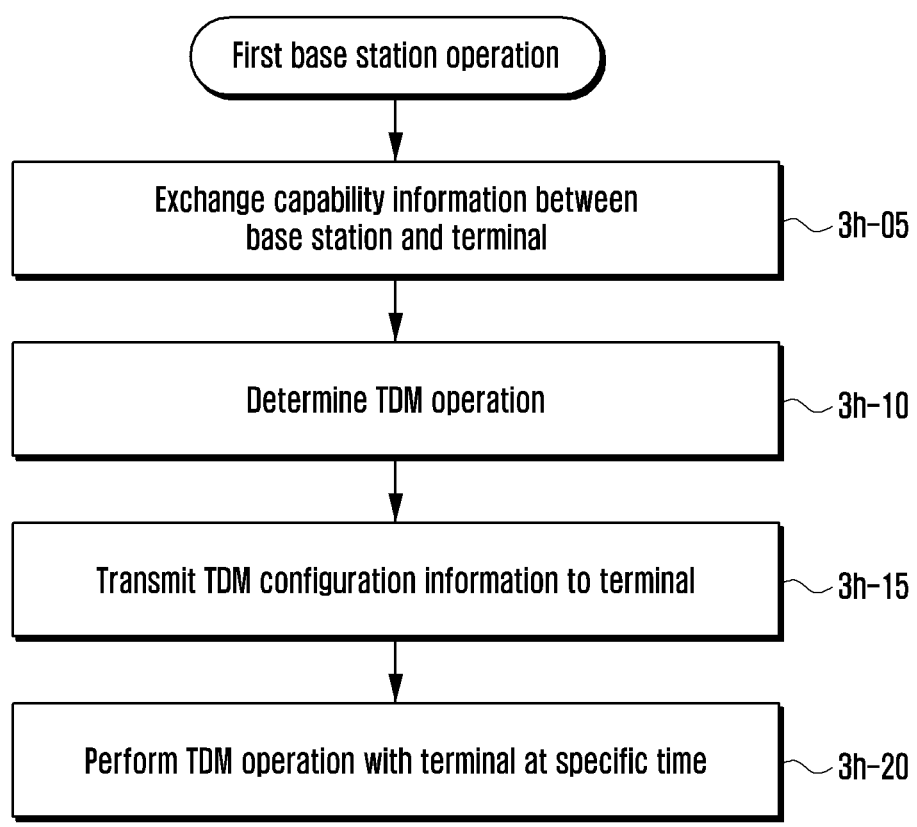
FIG. 3H is a diagram explaining an operation of a first base station according to the (3-1)-th embodiment of the present disclosure.

FIG. 3H is a diagram explaining the operation of a first base station according to the first embodiment of the present disclosure.

Referring to FIG. 3H, at operation 3*h*-05, the first base station exchanges TDM support capability with the terminal. At operation 3*h*-10, the first base station determines the TDM operation in accordance with the kind of service to be provided to the terminal or QoS and the service provider/network policy. At operation 3*h*-15, the first base station transmits the TDM configuration information to the terminal. At operation 3*h*-20, the first base station performs the TDM operation with the terminal at a specific time.

Figure 3I:
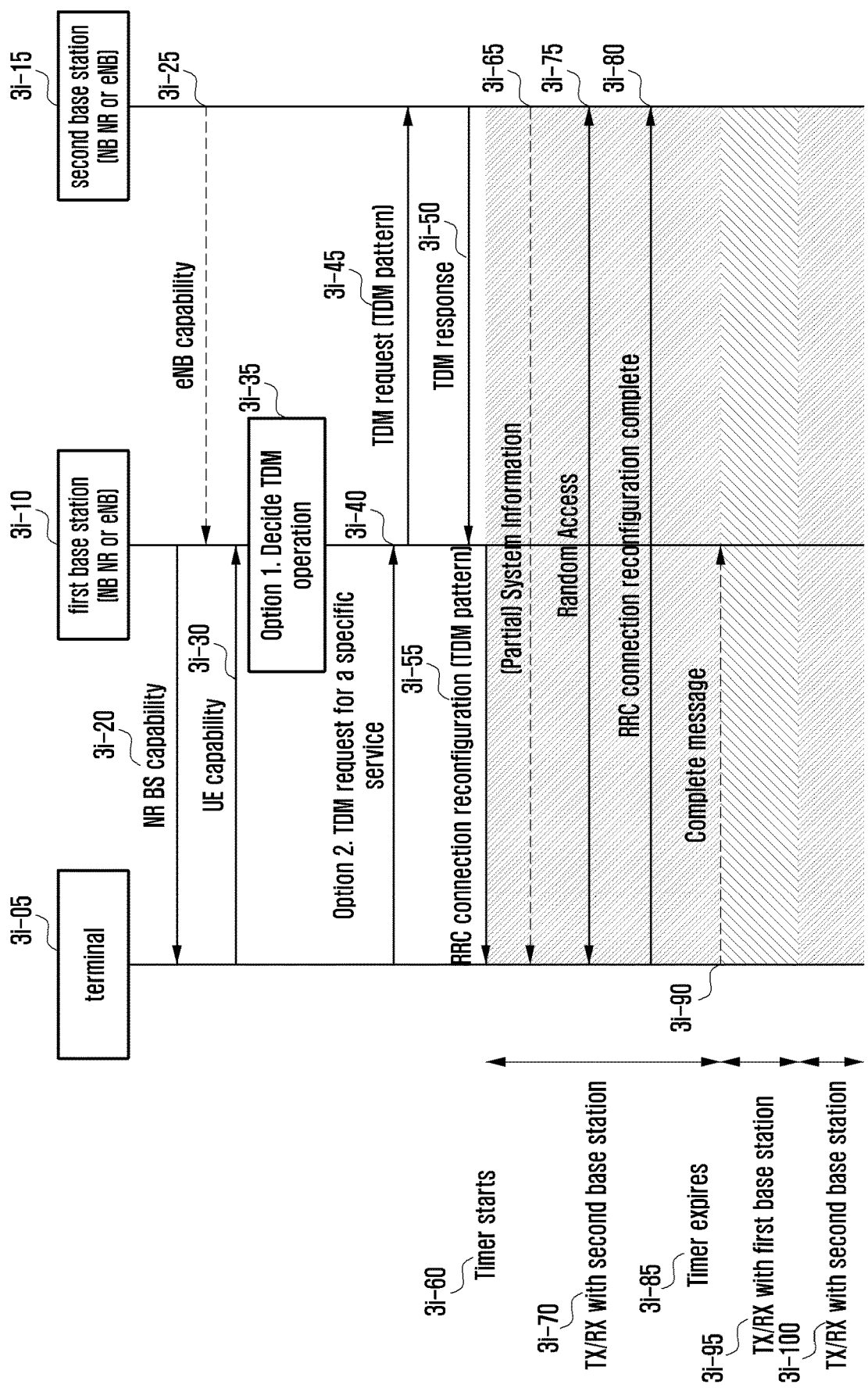
FIG. 3I is a diagram explaining a (3-2)-th embodiment to configure TDM type multi-connectivity according to an embodiment of the present disclosure.

FIG. 3I is a diagram explaining a second embodiment to configure TDM type multi-connectivity according to an embodiment of the present disclosure.

Referring to FIG. 3I, a terminal 3i-05 camps on a first base station 3i-10. In this case, the first base station serves as a master that triggers a TDM operation. The first base station may be either an NR NB or an eNB. The first base station 3i-10 notifies the terminal 3i-05 whether the first base station 3i-10 itself supports the TDM operation, at operation 3i-20. The terminal 3i-05 notifies the first base station 3i-10 whether the terminal 3i-05 itself supports the TDM operation, at operation 3i-30. A second base station 3i-15 notifies the first base station 3i-10 whether the second base station 3i-15 itself supports the TDM operation, at operation 3i-25. The first base station ei-10 determines whether to configure the TDM operation in accordance with a service or QoS being provided to the terminal 3i-05, at operation 3i-35. Further, the terminal determines whether the TDM operation is necessary in accordance with the service or QoS to be provided to the terminal 3i-05 itself, and may request the first base station 3i-10 to provide the TDM operation, at operation 3i-40. If it is determined to configure the TDM operation in accordance with the determination of the first base station 3i-10 or the terminal request, the first base station 3i-10 requests the second base station 3i-15 to provide the TDM operation using a message including configuration information related to the TDM operation, at operation 3i-45. The second base station 3i-15 transmits a response message to the first base station 3i-10, at operation 3i-50. The first base station 3i-10 that has received an acceptance response message from the second base station 3i-15 provides the configuration information related to the TDM operation to the terminal 3i-05, at operation 3i-55. The configuration information includes at least TDM pattern information. The TDM pattern is time information in which the terminal 3i-05 can transmit/receive data at an NR or LTE frequency. The information may be provided in the form of a bit map or may be provided as time period information for staying at a specific frequency, period, and offset information. If the information is provided in the form of a bit map, each bit is used to indicate a frequency at which the terminal 3i-05 transmits/receives data for a specific unit time. The specific unit time may be configured. If the information is provided as the time period information for staying at a specific frequency, period, and offset information, a time point when data is to be transmitted or received at a specific frequency is calculated using the offset information, and data is transmitted or received for the indicated time period at the frequency using the time period information for staying at the specific frequency. The time period arrives with a specific period. The terminal 3i-05 that has received the TDM configuration information operates a specific timer, at operation 3i-60. Until the specific timer expires, the terminal 3i-05 should complete a connection with the second base station. During the time when the specific timer operates, the RF chain of the terminal 3i-05 should be configured as the frequency used by the second base station 3i-15, at operation 3i-70. During the time period, the terminal 3i-05 receives system information from the second base station 3i-15, at operation 3i-65, and performs a random access process, at operation 3i-75. The system information of the second base station 3i-15 may be transferred to the terminal 3i-05 through an RRC connection reconfiguration message at operation 3i-55. When receiving a TDM response at operation 3i-50 from the second base station 3i-15, the first base station 3i-10 may be provided with the system information of the second base station 3i-15 together. Further, during the time period, the terminal 3i-05 provides the TDM configuration information provided from the first base station 3i-10 to the second base station 3i-15, at operation 3i-80. If the second base station 3i-15 successfully receives an RRC connection reconfiguration complete message from the terminal 3i-05, a connection to the second base station 3i-15 is completed, and the TDM operation starts at a specific time. If the connection is not successfully completed until the timer expires, at operation 3i-85, the terminal 3i-05 cannot start the TDM operation, and in this case, the terminal 3i-05 notifies the first base station 3i-10 of a failure using a specific message, at operation 3i-90. The specific time when the TDM operation starts should be known to the terminal 3i-05, the first base station 3i-10, and the second base station 3i-15 in all. A method for specifying has been described.

If the TDM operation starts, the terminal 3i-05 performs data transmission/reception through conversion of the NR and LTE frequencies using the TDM pattern information, at operations 3i-95 and 3i-100.

In the case of the structure illustrated in FIG. 3D, the terminal 3i-05 may perform the TDM operation with respect to the downlink and the uplink. In the case of the structure illustrated in FIG. 3E, the terminal 3i-05 may perform the TDM operation when transmitting the uplink signal and data with respect to the downlink.

The terminal 3i-05 can be doubly linked to the first base station 3i-10 and the second base station 3i-15, and in the case where the first base station 3i-10 is an LTE base station and the second base station 3i-15 is an NR base station, it may correspond to an EN-DC.

Figure 3J:
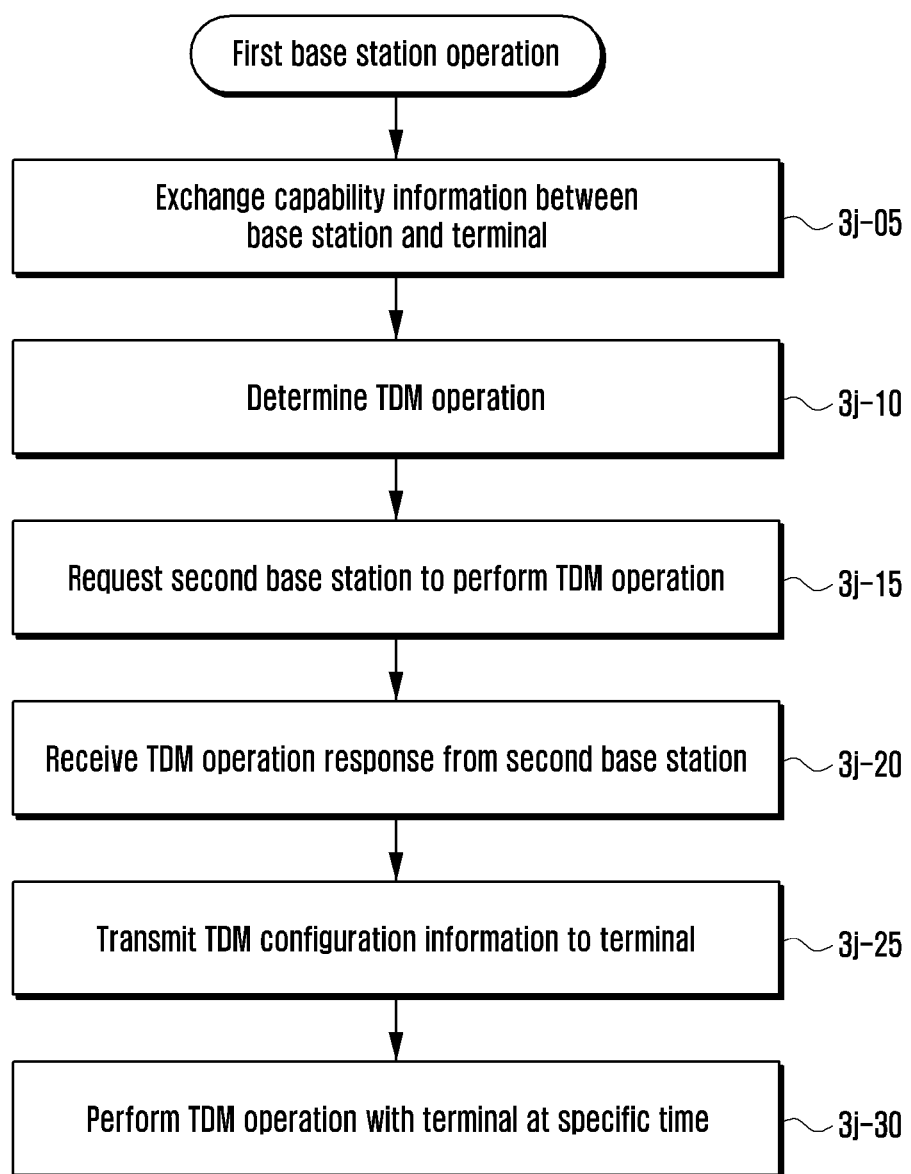
FIG. 3J is a diagram explaining an operation of a first base station according to the (3-2)-th embodiment of the present disclosure.

FIG. 3J is a diagram explaining the operation of a first base station according to the (3-2)-th embodiment of the present disclosure.

Referring to FIG. 3J, at operation 3j-05, the first base station exchanges TDM support capability with the terminal. At operation 3j-10, the first base station determines the TDM operation in accordance with the kind of service to be provided to the terminal or QoS and the service provider/network policy. At operation 3j-15, the first base station requests the second base station to provide the TDM operation. At operation 3j-20, the first base station receives an acceptance response message from the second base station. At operation 3j-25, the first base station transmits the TDM configuration information to the terminal. At operation 3j-30, the first base station performs the TDM operation with the terminal at a specific time.

FIG. 3K is a diagram explaining a scenario of releasing a TDM method according to an embodiment of the present disclosure.

Referring to FIG. 3K, if a specific event occurs, a terminal that performs a TDM operation may suspend this. In an embodiment of the present disclosure, if emergency disaster information, such as earthquake and tsunami warning system (ETWS)/commercial mobile alert system (CMAS), is transmitted, the TDM operation being performed is suspended or released, at 3k-15, and the emergency disaster information is preferentially received from a system that provides the ETWS/CMAS. Generally, considering the importance of the matter, the terminal should complete the reception of the emergency disaster information as soon as possible. However, in the case of maintaining the TDM operation, it may take time to complete the reception of the emergency disaster information. For example, in the case where the emergency disaster information is provided only in an NR system, switching to an LTE system means that it takes time that much until the reception of the emergency disaster information is completed. Even in the case where both the NR and LTE systems provide the emergency disaster information, emergency disaster messages transmitted from the respective systems have different formats, and thus it is advantageous to receive the emergency disaster information only in a specific system from the viewpoint of time delay. The terminal receives a paging message indicating that an emergency disaster message is being transmitted from the NR or LTE system. The terminal that has received the paging message disregards the configured TDM operation, and receives system information including the emergency disaster message being broadcast by the system that has transmitted the paging message. The configured TDM operation is not performed until the emergency disaster message has been successfully received.

Further, in an embodiment of the present disclosure, the terminal may suspend or release the configured TDM operation with respect to a specific system if it performs reestablishment, or handover, or if an RLF occurs.

If the RLF occurs, the terminal operation differs depending on whether the base station in which the RLF has occurred is a mater or a slave. If the RLF occurs in the master base station, the terminal suspends or releases the TDM operation, and performs a reestablishment operation. If the RLF occurs in the slave base station, the terminal may perform the reestablishment operation or may release the connection at all. In the case of performing the reestablishment operation, the operation is performed at the frequency of the system in which the RLF has occurred, and during performing the operation, the TDM operation is not performed. This is to maximize the success rate of the reestablishment.

Even in the case where the handover is performed, the RF chain is fixed to the frequency of the system in which the handover is performed. That is, the TDM operation is suspended or is released. This is also to maximize the success rate of the handover.

In an embodiment of the present disclosure, if the above-described reason occurs in the terminal that performs the TDM operation, the terminal may release or suspend the TDM operation, and such an operation may be applied to all of the TDM operation for uplink transmission of the terminal and the TDM operation for downlink reception of the terminal.

Figure 3L:
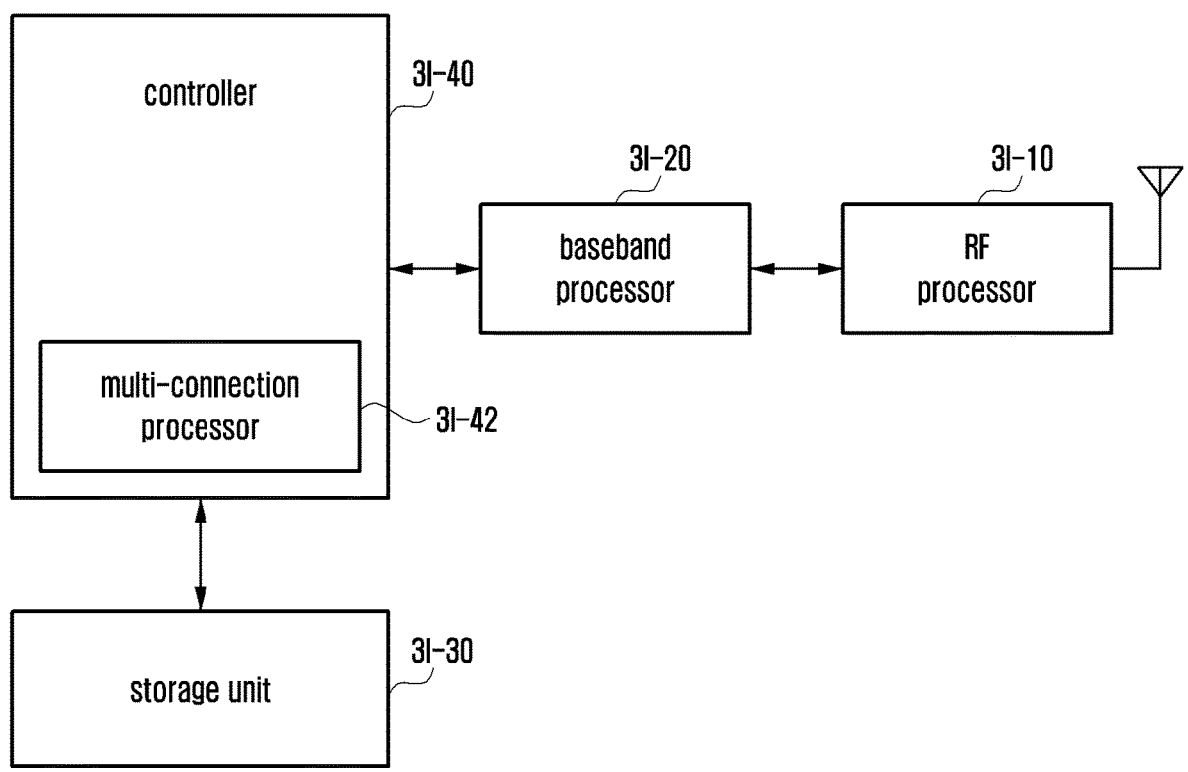
FIG. 3L is a diagram illustrating a configuration of a terminal according to an embodiment of the present disclosure.

FIG. 3L is a block diagram illustrating the internal structure of a terminal according to an embodiment of the present disclosure.

Referring to FIG. 3L, the terminal includes an RF processor 3*l*-10, a baseband processor 3*l*-20, a storage unit 3*l*-30, and a controller 3*l*-40.

The RF processor 3*l*-10 performs a function for transmitting and receiving a signal through a radio channel, such as signal band conversion and amplification. That is, the RF processor 3*l*-10 performs up-conversion of a baseband signal provided from the baseband processor 3*l*-20 into an RF-band signal to transmit the converted signal to an antenna, and performs down-conversion of the RF-band signal received through the antenna into a baseband signal. For example, the RF processor 3*l*-10 may include a transmission filter, a reception filter, an amplifier, a mixer, an oscillator, a DAC, and an ADC. Although only one antenna is illustrated in the drawing, the terminal may be provided with a plurality of antennas. Further, the RF processor 3*l*-10 may include a plurality of RF chains. Further, the RF processor 3*l*-10 may perform beamforming. For the beamforming, the RF processor 3*l*-10 may adjust phases and sizes of signals transmitted or received through the plurality of antennas or antenna elements. Further, the RF processor may perform MIMO, and may receive several layers during performing of a MIMO operation.

The baseband processor 3*l*-20 performs conversion between a baseband signal and a bit string in accordance with the PHY standard of the system. For example, during data transmission, the baseband processor 3*l*-20 generates complex symbols by encoding and modulating a transmitted bit string. Further, during data reception, the baseband processor 3*l*-20 restores a received bit string by demodulating and decoding the baseband signal provided from the RF processor 3*l*-10. For example, in the case of following an OFDM method, during data transmission, the baseband processor 3*l*-20 generates complex symbols by encoding and modulating a transmitted bit string, performs mapping of the complex symbols on subcarriers, and then configures OFDM symbols through IFFT operation and CP insertion. Further, during data reception, the baseband processor 3*l*-20 divides the baseband signal provided from the RF processor 3*l*-20 in the unit of OFDM symbols, restores the signals mapped on the subcarriers through the FFT operation, and then restores the received bit string through demodulation and decoding.

The baseband processor 3*l*-20 and the RF processor 3*l*-10 transmit and receive the signals as described above. Accordingly, the baseband processor 3*l*-20 and the RF processor 3*l*-10 may be called a transmitter, a receiver, a transceiver, or a communication unit. Further, in order to support different radio connection technologies, at least one of the baseband processor 3*l*-20 and the RF processor 3*l*-10 may include a plurality of communication modules. Further, in order to process signals of different frequency bands, at least one of the baseband processor 3*l*-20 and the RF processor 3*l*-10 may include different communication modules. For example, the different radio connection technologies may include an LTE network and an NR network. Further, the different frequency bands may include SHF (e.g., 2·NR Hz or NR Hz) band and millimeter wave (mmWave) (e.g., 60 GHz) band.

The storage unit 3*l*-30 stores therein a basic program for an operation of the terminal, application programs, and data of configuration information. In particular, the storage unit 3*l*-30 may store information related to a second connection node that performs wireless communication using the second radio connection technology. Further, the storage unit 3*l*-30 provides stored data in accordance with a request from the controller 3*l*-40.

The controller 3*l*-40 controls the whole operation of the terminal. For example, the controller 3*l*-40 transmits and receives signals through the baseband processor 3*l*-20 and the RF processor 3*l*-10. Further, the controller 3*l*-40 records or reads data in or from the storage unit 3*l*-30. For this, the controller 3*l*-40 may include at least one processor. For example, the controller 3*l*-40 may include a CP performing a control for communication and an AP controlling an upper layer, such as an application program. The controller 3*l*-40 may include a multi-connection processor 3*l*-42.

Figure 3M:
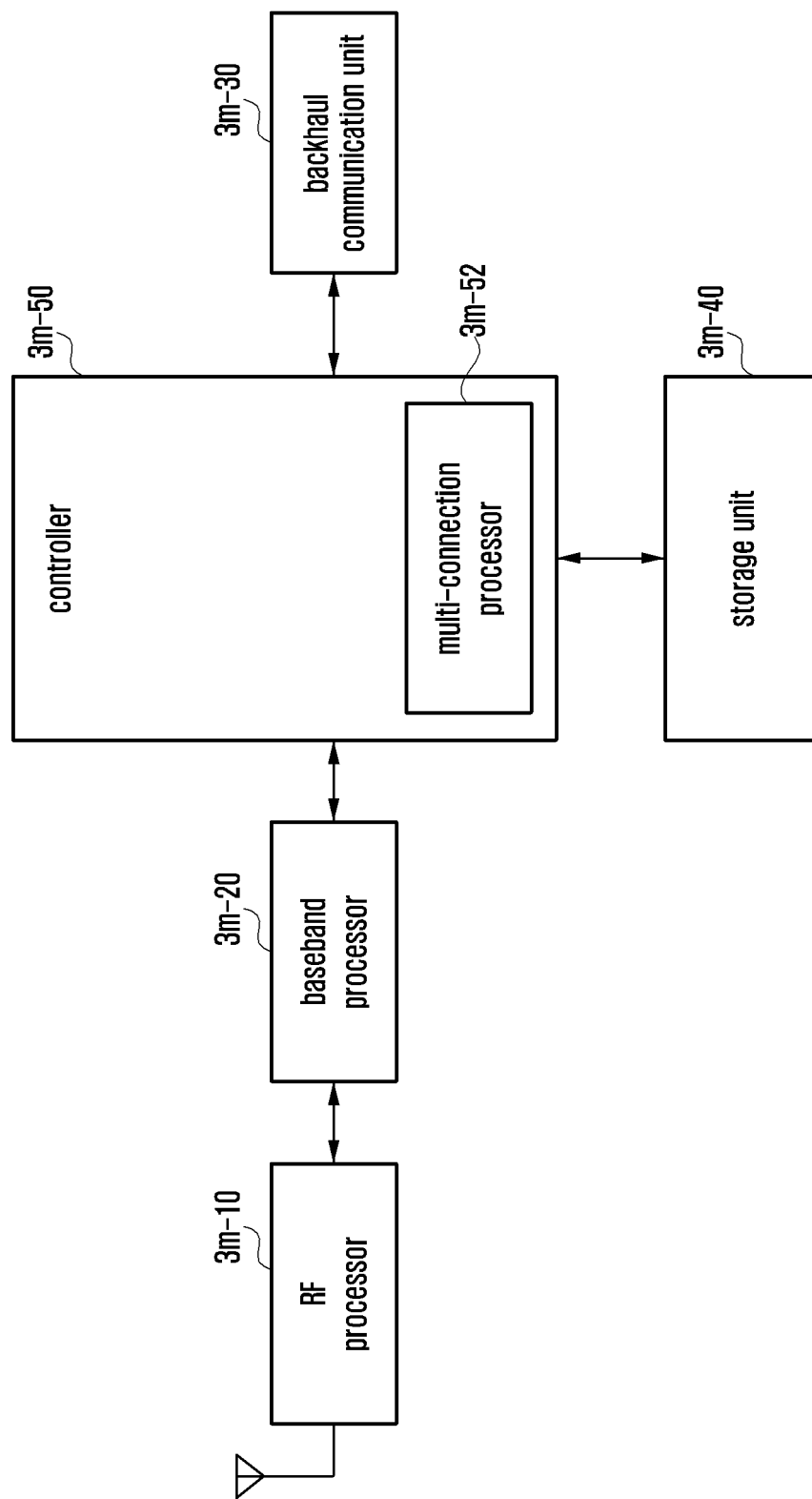
FIG. 3M is a diagram illustrating a configuration of a base station according to an embodiment of the present disclosure.

FIG. 3M is a block diagram illustrating the configuration of a base station according to an embodiment of the present disclosure.

Referring to FIG. 3M, the base station includes an RF processor 3*m*-10, a baseband processor 3*m*-20, a backhaul communication unit 3*m*-30, a storage unit 3*m*-40, and a controller 3*m*-50.

The RF processor 3*m*-10 performs a function for transmitting and receiving a signal through a radio channel, such as signal band conversion and amplification. That is, the RF processor 3m-10 performs up-conversion of a baseband signal provided from the baseband processor 3m-20 into an RF-band signal to transmit the converted signal to an antenna, and performs down-conversion of the RF-band signal received through the antenna into a baseband signal. For example, the RF processor 3m-10 may include a transmission filter, a reception filter, an amplifier, a mixer, an oscillator, a DAC, and an ADC. Although only one antenna is illustrated in the drawing, the first connection node may be provided with a plurality of antennas. Further, the RF processor 3m-10 may include a plurality of RF chains. Further, the RF processor 3m-10 may perform beamforming. For the beamforming, the RF processor 3m-10 may adjust phases and sizes of signals transmitted or received through the plurality of antennas or antenna elements. Further, the RF processor may perform down MIMO operation through transmission of one or more layers.

The baseband processor 3m-20 performs conversion between a baseband signal and a bit string in accordance with the PHY standard of the first radio connection technology. For example, during data transmission, the baseband processor 3m-20 generates complex symbols by encoding and modulating a transmitted bit string. Further, during data reception, the baseband processor 3m-20 restores a received bit string by demodulating and decoding the baseband signal provided from the RF processor 3m-10. For example, in the case of following an OFDM method, during data transmission, the baseband processor 3m-20 generates complex symbols by encoding and modulating a transmitted bit string, performs mapping of the complex symbols on subcarriers, and then configures OFDM symbols through the IFFT operation and CP insertion. Further, during data reception, the baseband processor 3m-20 divides the baseband signal provided from the RF processor 3m-10 in the unit of OFDM symbols, restores the signals mapped on the subcarriers through the FFT operation, and then restores the received bit string through demodulation and decoding. The baseband processor 3m-20 and the RF processor 3m-10 transmit and receive the signals as described above. Accordingly, the baseband processor 3m-20 and the RF processor 3m-10 may be called a transmitter, a receiver, a transceiver, or a communication unit.

The backhaul communication unit 3m-30 provides an interface for performing communication with other nodes in the network. That is, the backhaul communication unit 3m-30 converts a bit string that is transmitted from the master base station to another node, for example, an auxiliary base station or a CN, into a physical signal, and converts a physical signal that is received from the other node into a bit string.

The storage unit 3m-40 stores therein a basic program for an operation of the master base station, application programs, and data of configuration information. In particular, the storage unit 3m-40 may store information on a bearer allocated to the connected terminal and the measurement result reported from the connected terminal. Further, the storage unit 3m-40 may store information that becomes a basis of determination whether to provide or suspend a multi-connection to the terminal. Further, the storage unit 3m-40 provides stored data in accordance with a request from the controller 3m-50.

The controller 3m-50 controls the whole operation of the master base station. For example, the controller 3m-50 transmits and receives signals through the baseband processor 3m-20 and the RF processor 3m-10 or through the backhaul communication unit 3m-30. Further, the controller 3m-50 records or reads data in or from the storage unit 3m-40. For this, the controller 3m-50 may include at least one processor. The controller 3m-50 may include a multi-connection processor 3m-52.

Fourth Embodiment

Figure 4A:
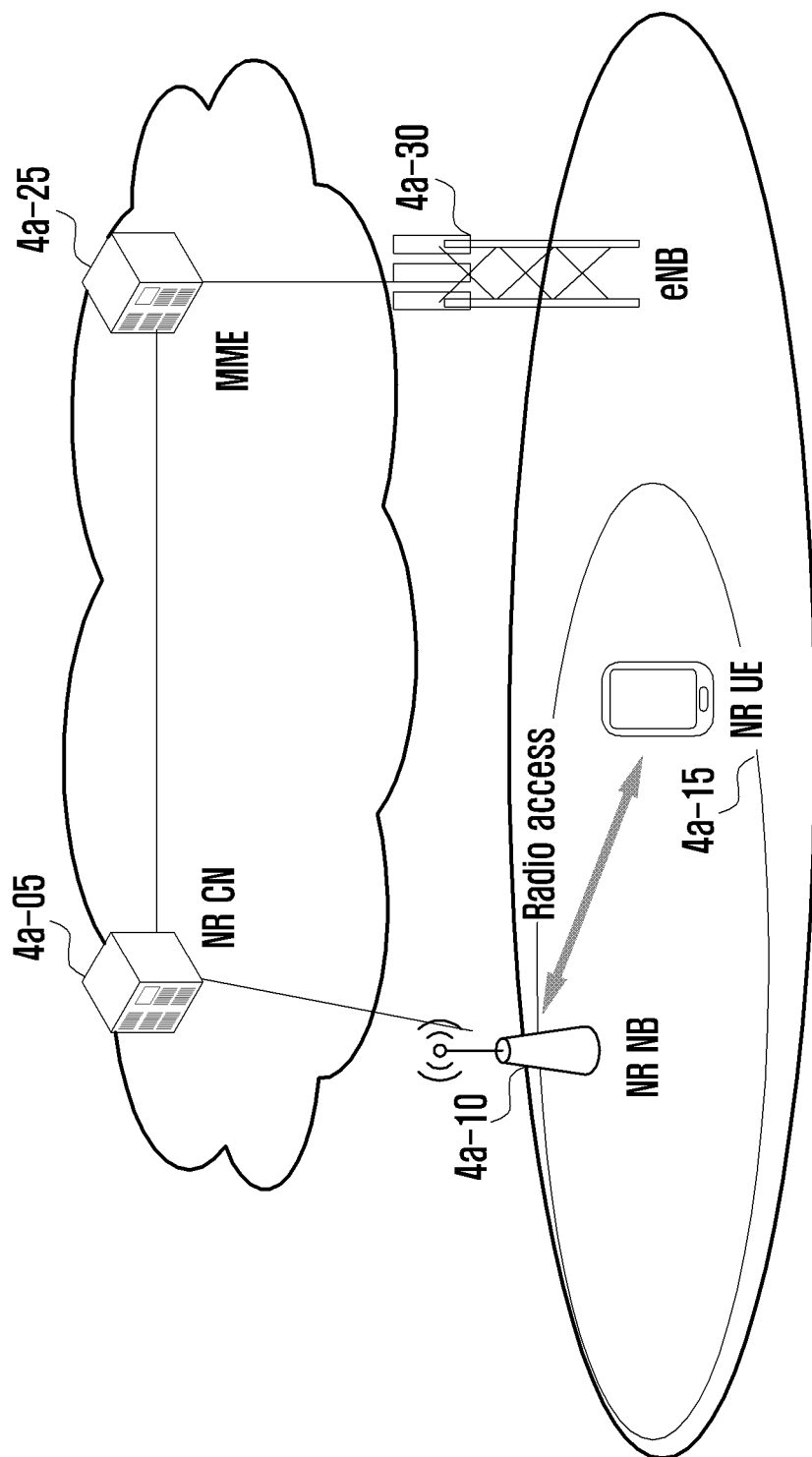
FIG. 4A is a diagram illustrating a structure of a next-generation mobile communication system according to an embodiment of the present disclosure.

FIG. 4A is a diagram illustrating the structure of a next-generation mobile communication system according to an embodiment of the present disclosure.

Referring to FIG. 4A, a radio access network of a next-generation mobile communication system is composed of a new radio node B (hereinafter referred to as "NR NB") 4a-10 and an NR CN 4a-05. A user terminal ("NR UE" or "terminal") 4a-15 connects to an external network through the NR NB 4a-10 and the NR CN 4a-05.

In FIG. 4A, the NR NB 4a-10 corresponds to an eNB of the existing LTE system. The NR NB may be connected to the NR UE 4a-15 through a radio channel, and thus can provide a more superior service than the service of the existing node B. Since all user traffics are serviced through shared channels, a device that performs scheduling through consolidation of status information, such as a buffer state, an available transmission power state, and a channel state, of each UE is necessary, and the NR NB 4a-10 takes charge of this. One NR NB generally controls plural cells. In order to implement ultrahigh-speed data transmission as compared with the existing LTE, the NR NB may have a bandwidth that is equal to or higher than the existing maximum bandwidth, and a beamforming technology may be additionally grafted in consideration of OFDM as a radio connection technology. Further, an AMC method that determines a modulation scheme and a channel coding rate to match the channel state of the terminal is applied to the NR NB. The NR CN 4a-05 performs mobility support, bearer configuration, and QoS configuration. The NR CN is a device that takes charge of not only terminal mobility management but also various kinds of control functions, and is connected to a plurality of base stations. Further, the next-generation mobile communication system may interlock with the existing LTE system, and the NR CN is connected to an MME 4a-25 through a network interface. The MME is connected to an eNB 4a-30 that is the existing base station.

Figure 4B:
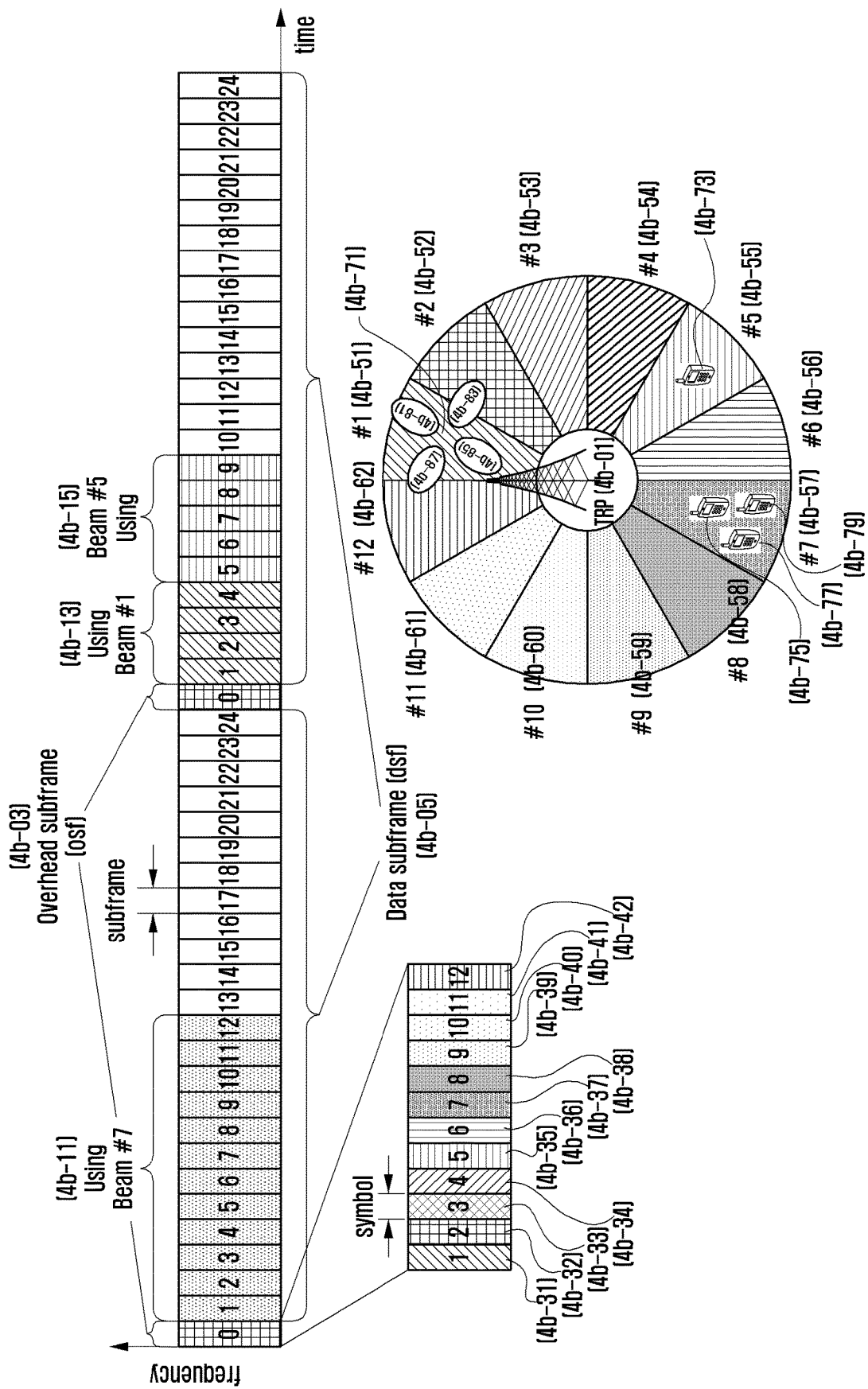
FIG. 4B is a diagram of a frame structure used by an NR system to which the present disclosure is applied according to an embodiment of the present disclosure.

FIG. 4B is a diagram of a frame structure used by an NR system to which the present disclosure is applied according to an embodiment of the present disclosure.

Referring to FIG. 4B, a scenario in which the NR system operates at high frequency in order to secure a wide frequency bandwidth for a high transmission speed may be considered. However, since it is difficult to transfer a signal at high frequency, a scenario in which data is transmitted through beam generation may be considered.

Accordingly, a scenario in which a base station or a TRP 4b-01 communicates with terminals 4b-71, 4b-73, 4b-75, 4b-77, and 4b-79 in a cell using different beams may be considered. That is, in FIG. 4B, it is assumed that terminal 4b-71 performs communication using beam #1 4b-51, terminal 4b-73 performs communication using beam #5 4b-55, and terminals 3, 4, and 5 perform communication through beam #7 4b-57.

In order to measure what beam the terminal communicates with the TRP through, an OSF 4b-03 exists on time, and in the OSF, the base station transmits a RS using different beams by symbols (or through several symbols). Beam index values for discriminating the respective beams from the RS may be derived. In FIG. 4B, it is assumed that the base station transmits 12 beams #1 to #12 4b-51 to 4b-62, and in the OSF, different beams are swept and transmitted for each symbol 4b-31 to 4b-42. That is, in the OSF, respective beams are transmitted by symbols (e.g., beam #1 4b-51 is transmitted at the first symbol 4b-31), and the terminal can measure what beam signal transmitted in the OSF is the strongest through measurement of the OSF.

In FIG. 4B, a scenario in which the corresponding OSF is repeated for 25 subframes is assumed, and the remaining 24 subframes are DSFs 4b-05 in which general data is transmitted and received.

Accordingly, a scenario, in which in accordance with the scheduling of the base station, terminals 4b-75, 4b-77, and 4b-79 perform communication commonly using beam #7 4b-11, terminal 4b-71 performs communication using beam #1 4b-13, and terminal 4b-73 performs communication using beam #5 4b-15 is assumed.

In the exemplified drawing, although the transmission beams #1 to #12 4b-51 to 4b-62 of the base station are illustrated, reception beams of the terminal for receiving the transmission beams of the base station (e.g., beams 4b-81, 4b-83, 4b-85, and 4b-87 of the terminal 4b-71) may be additionally considered. In the exemplified drawing, the terminal 1 has four beams 4b-81, 4b-83, 4b-85, and 4b-87, and it performs beam sweeping in order to determine what beam has the best reception performance. In this case, if several beams cannot be simultaneously used, the optimum transmission beam of the base station and reception beam of the terminal can be found by receiving several OSFs as many as the number of reception beams through the use of one reception beam for each OSF.

Figure 4C:
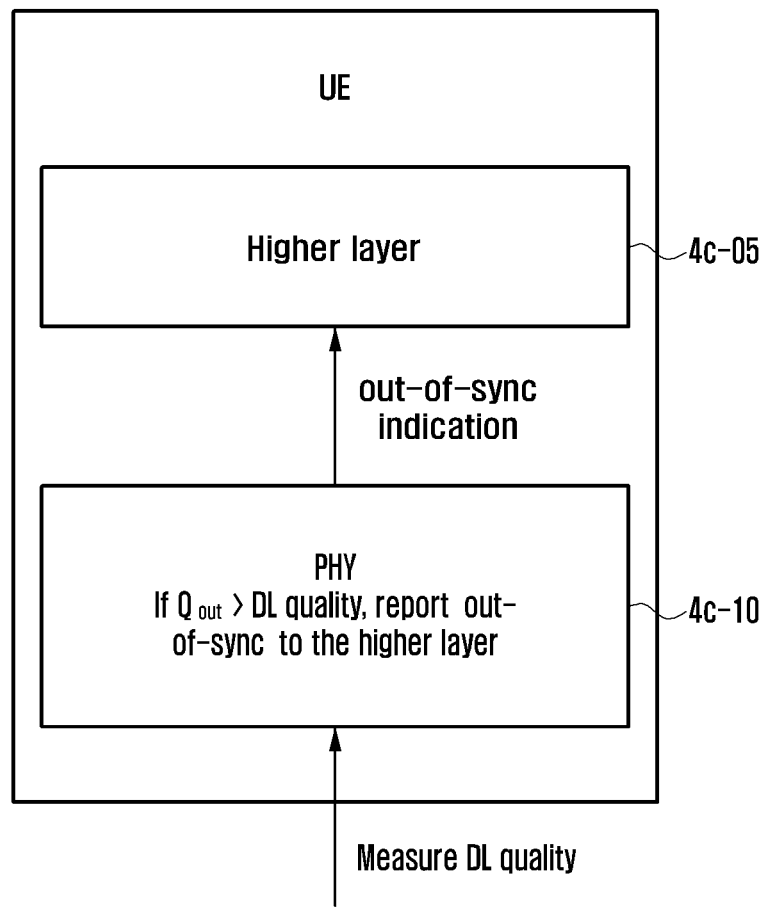
FIG. 4C is a diagram explaining a radio link monitoring (RLM) operation in an existing LTE system according to an embodiment of the present disclosure.

FIG. 4C is a diagram explaining a radio link monitoring (RLM) operation in an LTE system according to an embodiment of the present disclosure.

Referring to FIG. 4C, a PHY 4c-10 measures downlink signal quality based on a cell specific reference signal (CRS). The signal quality means reference signal received power (RSRP) or reference signal received quality (RSRQ). The measured value is compared with a specific threshold value Qout. The threshold value is a signal quality value that satisfies a specific block error rate (BLER) of a PDCCH. If the measured value is not higher than the threshold value, the PHY transmits an "out-of-sync" indicator to an upper ("higher") layer 4c-05. The relationship between the threshold value and the BLER is influenced by the terminal performance, and thus it is derived through terminal implementation.

Figure 4D:
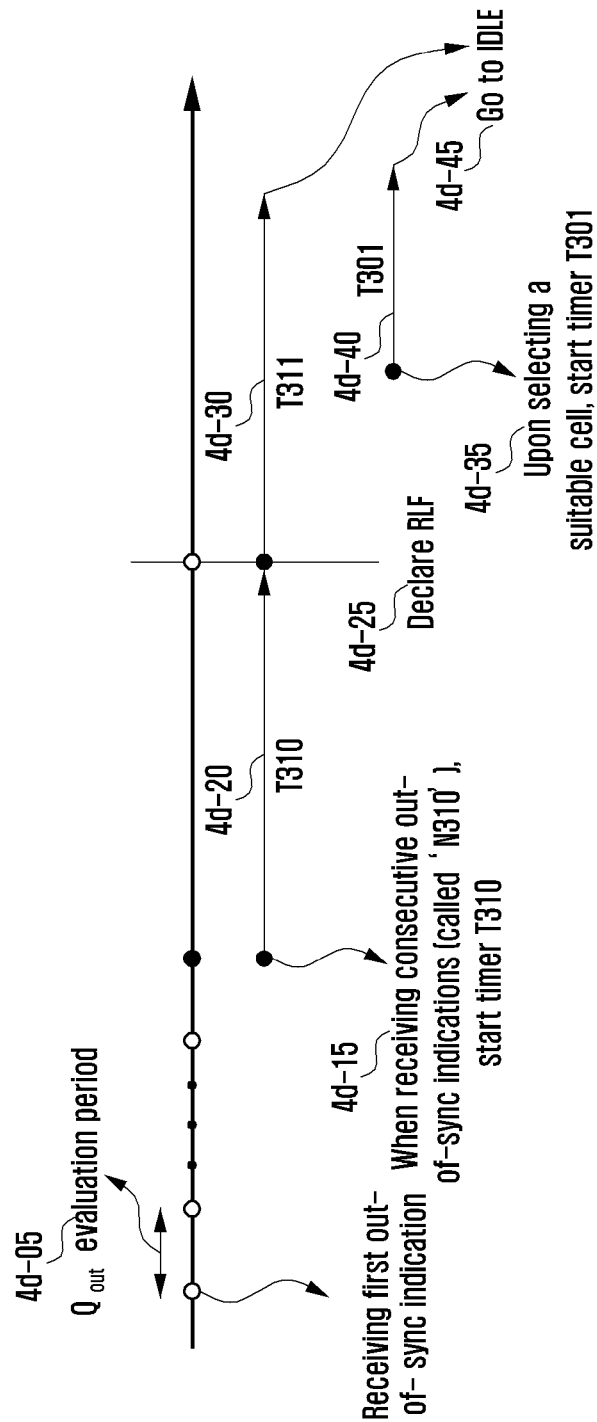
FIG. 4D is a diagram explaining a radio link failure (RLF) operation in an existing LTE system according to an embodiment of the present disclosure.

FIG. 4D is a diagram explaining a radio link failure (RLF) operation in an LTE system according to an embodiment of the present disclosure.

Referring to FIG. 4D, a PHY of a terminal compares a measured CRS signal quality with Qout in a specific period 4d-05. If an upper layer receives an "out-of-sync" indicator N310 times from the physical layer, a T310 timer 4d-20 operates, at 4d-15. If an "in-sync" indicator is reported by the PHY N311 times before the T310 timer expires, the T310 timer is suspended. In contrast, if the T310 timer expires, an RLF is declared, at 4d-25. Thereafter, the terminal initializes a reestablishment process, and operates a T311 timer 4d-30. If the terminal finds a suitable cell, it suspends the T311 timer, and operates the T301 timer 4d-40, at 4d-35. The T301 timer is suspended if the terminal receives an RRC connection reestablishment message from a base station. If the T311 or T301 timer expires, the terminal is shifted to a standby mode, at 4d-45. The values of N310, N311, T310, T311, and T301 are provided from a network.

Figure 4E:
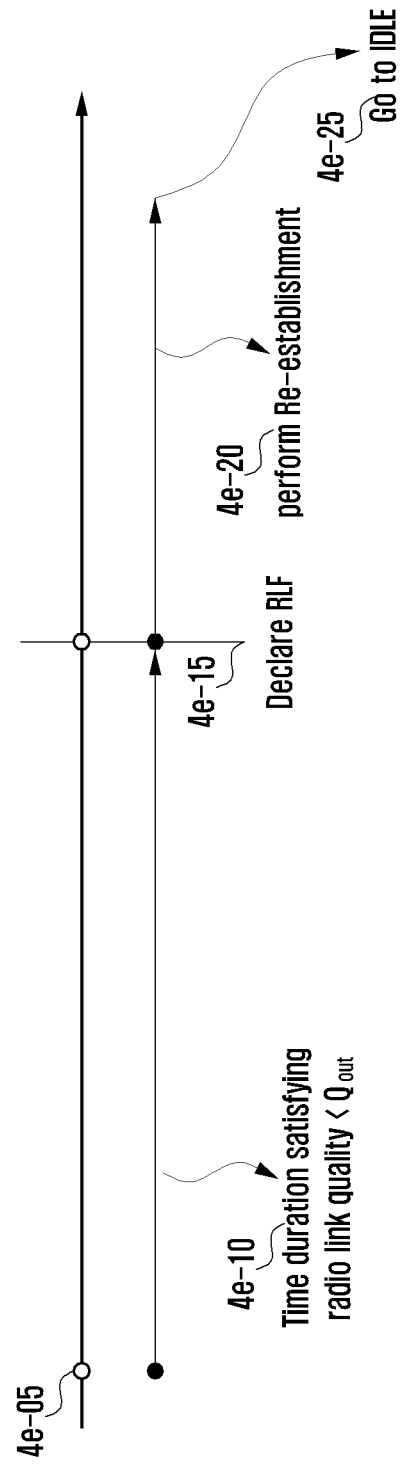
FIG. 4E is a diagram conceptually explaining an RLF operation in a next-generation mobile communication system according to an embodiment of the present disclosure.

FIG. 4E is a diagram conceptually explaining an RLF operation in a next-generation mobile communication system according to an embodiment of the present disclosure.

Referring to FIG. 4E, even the next-generation mobile communication system may have an RLF process that is similar to that of the existing LTE. Conceptually, if a state where the downlink signal quality measured by the terminal is worse than the specific threshold value, at 4e-05, Qout continues for a specific time 4e-10, the RFL is declared, at 4e-15. After the RLF is declared, a reestablishment process for connection recovery is performed, at 4e-20. If the reestablishment process is not successfully performed, the terminal is shifted to a standby mode, at 4e-25.

Figure 4F:
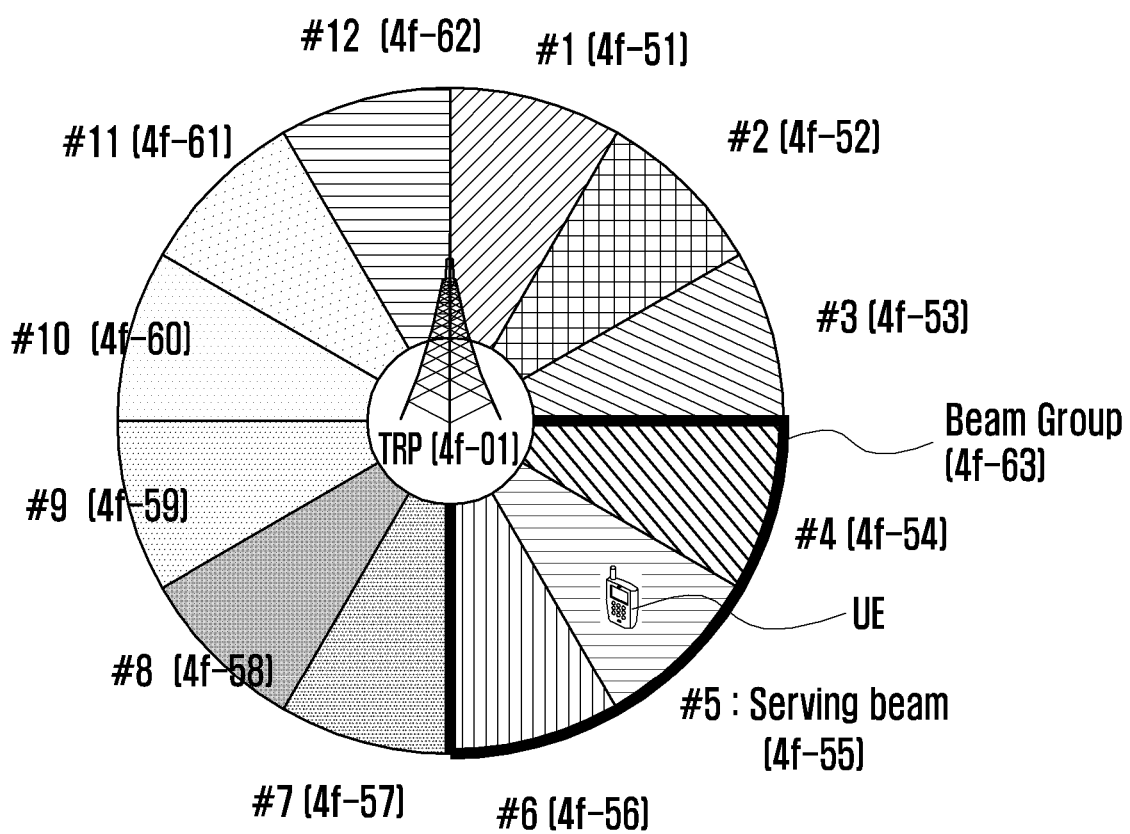
FIG. 4F is a diagram explaining a serving beam and a beam group in RLM/RLF in a next-generation mobile communication system according to an embodiment of the present disclosure.

FIG. 4F is a diagram explaining a serving beam and a beam group in RLM/RLF in a next-generation mobile communication system according to an embodiment of the present disclosure.

Referring to FIG. 4F, one TRP 4f-01 is composed of one or more beams 4f-51 to 4f-62. A downlink serving beam 4f-55 is a downlink beam of a TRP that is used when the TRP transmits/receives data to/from a terminal. In general, the width of a beam antenna is very narrow, and in the case of a moving terminal, the measured signal quality of a serving beam is abruptly changed. In contrast, the serving beam can be easily changed to a neighbor beam in the same TRP. For an RLM operation, only a RS provided by the serving beam may be measured and compared with a specific threshold value Qout, but it is insufficient to declare an RLF based on this. This is because the terminal can recover the radio connection relatively easily through sufficient change of the serving beam to another beam in the same TRP. Accordingly, in the case of performing the RLM operation, it is necessary to consider not only the signal quality of the serving beam but also the signal quality of the neighbor beam in the same TRP.

In an embodiment of the present disclosure, it is featured that the signal quality of a specific beam group 4f-63 in the same TRP is additionally considered during the RLM operation. The beam group is composed of the whole or partial beams in the same TRP, and various composing method may be used. For example, a beam that belongs to the beam group may be defined as, a beam capable of providing the constant signal quality to the terminal in the same TRP, a beam that is adjacent to the current serving beam of the terminal in the same TRP, or all beams in the same TRP.

In an embodiment of the present disclosure, it is featured that during performing of the RLM operation, the terminal considers not only the signal quality of the serving beam but also the collective signal quality of a specific beam group in the same TRP (intra-TRP). The collective signal quality of the beam group may be, the best signal quality among signal qualities of beams that belong to the group, an average of signal qualities of n upper beams in the group, total sum of signal qualities of beams that belong to the group, an average value of signal qualities of beams that belong to the group, or a weighted sum of signal qualities of beams after giving predetermined weights to the signal qualities.

If the collective signal quality of the beam group is higher than a specific threshold value although the signal quality of the serving beam is not good, it is preferable to perform a radio link recovery operation for changing the serving beam as another beam in the same TRP (one beam that belongs to the beam group) other than declaring the RLF.

Figure 4G:
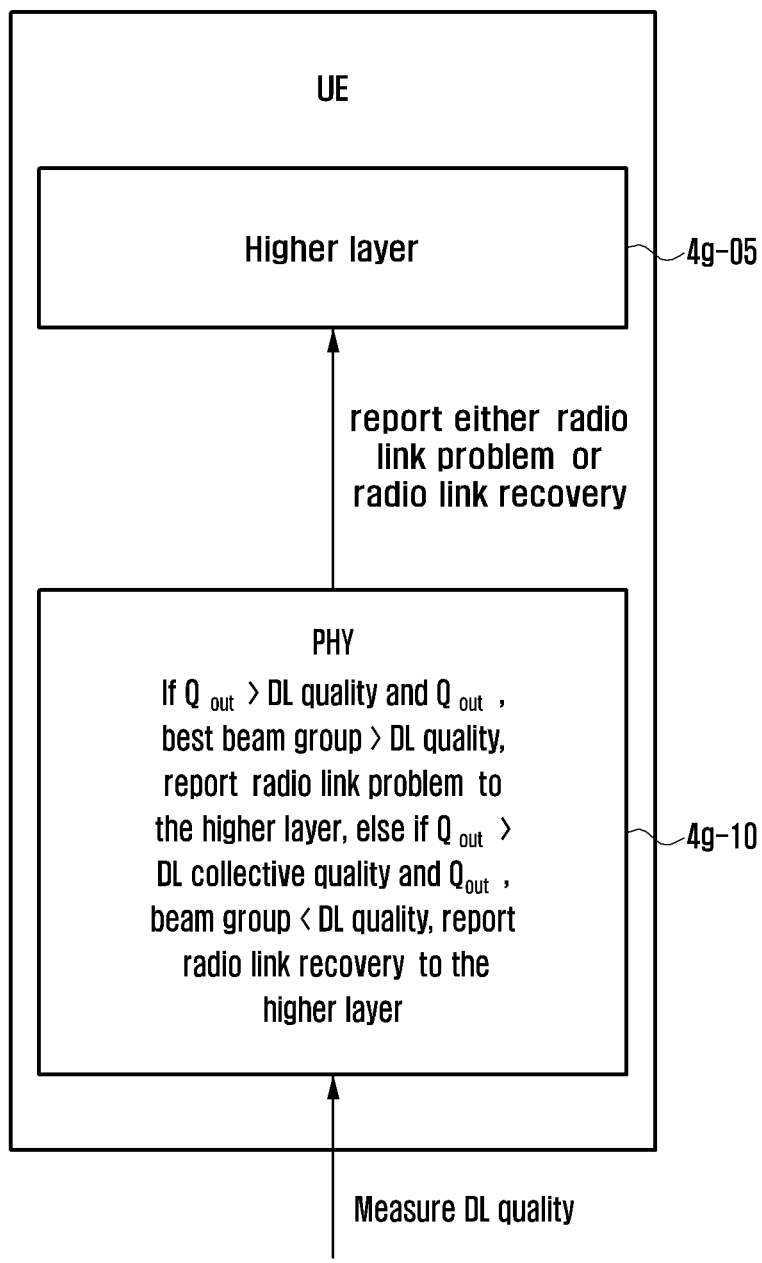
FIG. 4G is a diagram explaining an RLM operation according to an embodiment of the present disclosure.

FIG. 4G is a diagram explaining an RLM operation according to an embodiment of the present disclosure.

Referring to FIG. 4G, a PHY 4g-10 checks whether the signal quality of a serving beam and the collective signal quality of a specific beam group are better than different threshold values, respectively. The PHY periodically reports the results to an upper ("higher") layer 4g-05. If the signal quality of the serving beam is lower than a first threshold value Qout, and the collective signal quality of the specific beam group is higher than a second threshold value Qout (beam group), the PHY reports a "radio link recovery" indicator to the upper layer. If the upper layer firstly receives the "radio link recovery" indicator as a report, a first timer operates, and if the first timer expires, the terminal performs a first process. During the first process, the terminal performs an operation to change the serving beam to another beam in the same TRP. If the signal quality of the serving beam becomes better than the first threshold value, or the signal quality of the specific beam group becomes lower than the second threshold value while the first timer operates, the first timer is suspended. If the signal quality of the serving beam is lower than the first threshold value, and the collective signal quality of the specific beam group is lower than the second threshold value, the PHY reports a "radio link problem" indicator to the upper layer. The "radio link problem" indicator corresponds to the "out-of-sync" indicator in the LTE. If the upper layer firstly receives the "radio link problem" indicator as a report, a second timer operates, and if the second timer expires, the terminal declares the RLF. The terminal that has declared the RLF performs a second process. The second process means a process of reporting the RLF to the network after establishing a connection to a reestablishment process. If the signal quality of the serving beam becomes better than the first threshold value, or the signal quality of the specific beam group becomes better than the second threshold value while the second timer operates, the second timer is suspended. The first threshold value and the second threshold value may be determined through terminal implementation, or may be configured by the network. The first timer and the second timer may use fixed values or may be configured by the network.

Figure 4H:
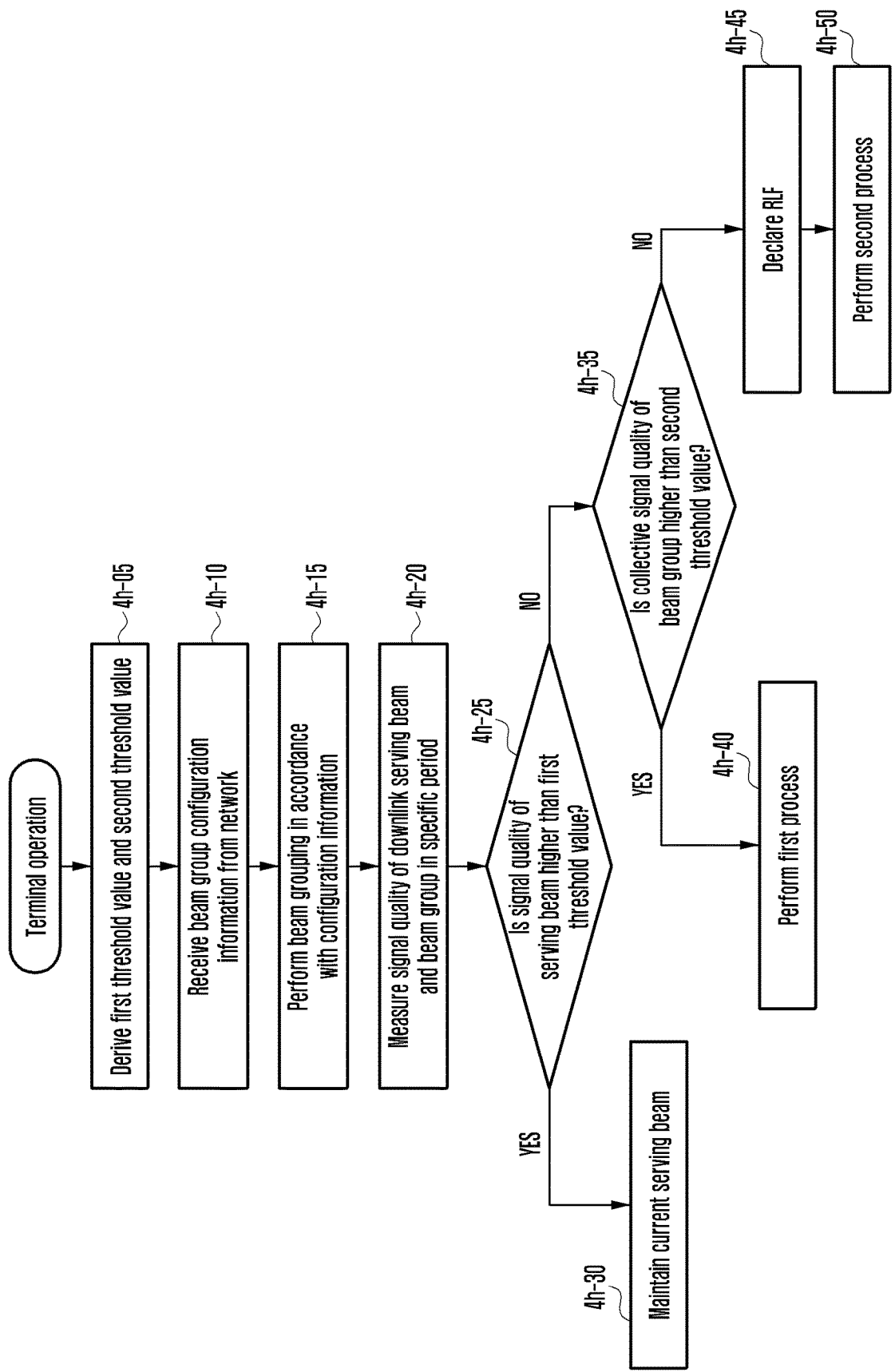
FIG. 4H is a diagram explaining an operation of a terminal in RLM/RLF according to an embodiment of the present disclosure.

FIG. 4H is a diagram explaining the operation of a terminal in RLM/RLF according to an embodiment of the present disclosure.

Referring to FIG. 4H, at operation 4h-05, a terminal derives a first threshold value and a second threshold value. As an example of a derivation method, the first threshold value is a signal quality value that satisfies a specific BLER of a PDCCH of a serving beam. Since the relationship between the first threshold value and the BLER is influenced by the terminal performance, it is derived through terminal implementation. The second threshold value is a signal quality value that satisfies a specific BLER of a PDCCH of a specific beam. Since the relationship between the second threshold value and the BLER is influenced by the terminal performance, it is derived through terminal implementation. Further, the first threshold value and the second threshold value may be provided from a network. At operation 4h-10, the terminal receives beam group configuration information provided from the network. The configuration information is used to configure a beam group. The information is provided to the terminal through system information being broadcast or dedicated RRC signaling. At operation 4h-15, the terminal configures one group composed of specific beams in a TRP which the serving belongs to. At operation 4h-20, the terminal measures the signal qualities of the downlink serving beam and the beam group for a specific period. At operation 4h-25, the terminal determines whether the signal quality of the serving beam is better than the first threshold value. If the signal quality of the serving beam is better than the first threshold value, the terminal, at operation 4h-30, maintains data transmission/reception through the serving beam. Otherwise, at operation 4h-35, the terminal also determines whether the collective signal quality of the beam group is better than the second threshold value. If the signal quality of the serving beam is lower than the first threshold value, and the collective signal quality of the specific beam group is higher than the second threshold value for a specific time, the terminal proceeds to operation 4h-40. If the signal quality of the serving beam is lower than the first threshold value, and the collective signal quality of the specific beam group is lower than the second threshold value for a specific time, the terminal proceeds to operation 4h-45. At operation 4h-40, the terminal performs a first process. The first process is a process in which the serving beam is changed in the same TRP (radio link recovery). At operation 4h-45, the terminal declares the RLF. At operation 4h-50, the terminal performs a second process. In the second process, the terminal performs a reestablishment process, and after the connection establishment, the terminal reports the RLF to the network.

Figure 4I:
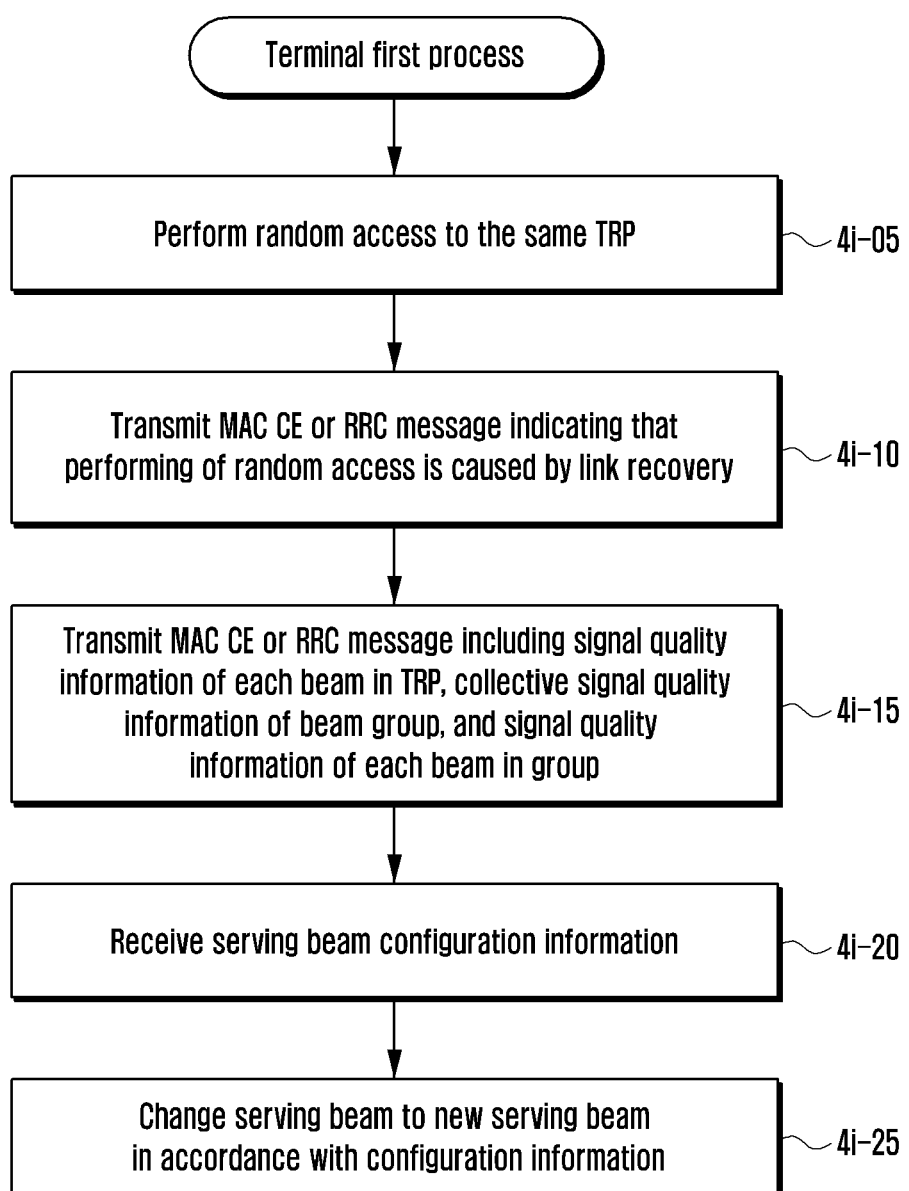
FIG. 4I is a diagram explaining a first process according to an embodiment of the present disclosure.

FIG. 4I is a diagram explaining a first process according to an embodiment of the present disclosure.

Referring to FIG. 4I, at operation 4i-05, a terminal performs a random access process to the same TRP. The terminal transmits a preamble to all beams or a specific beam in the TRP. The terminal receives a random access response (RAR) from a specific beam in response to the preamble, and considers the beam that has transmitted the RAR as a beam having the best signal quality in the TRP or a beam that provides the specific signal quality. The RAR includes UL grant. At operation 4i-10, the terminal transmits a MAC CE or RRC message indicating that the reason to perform the random access is link recovery using the UL grant. The link recovery means to change the serving beam to another beam in the same TRP. At operation 4i-15, the terminal transmits the MAC CE or RRC message including signal quality information of each beam in the TRP, collective signal quality information of a beam group, or signal quality information of each beam in the group using the UL grant.

A base station that has received this will use this message to configure the serving beam for the terminal. At operation 4i-20, the terminal receives serving beam configuration information. At operation 4i-25, the terminal configures a new serving beam using the configuration information. As another option, the terminal may implicitly consider a specific beam that provides the RAR as a new serving beam.

Figure 4J:
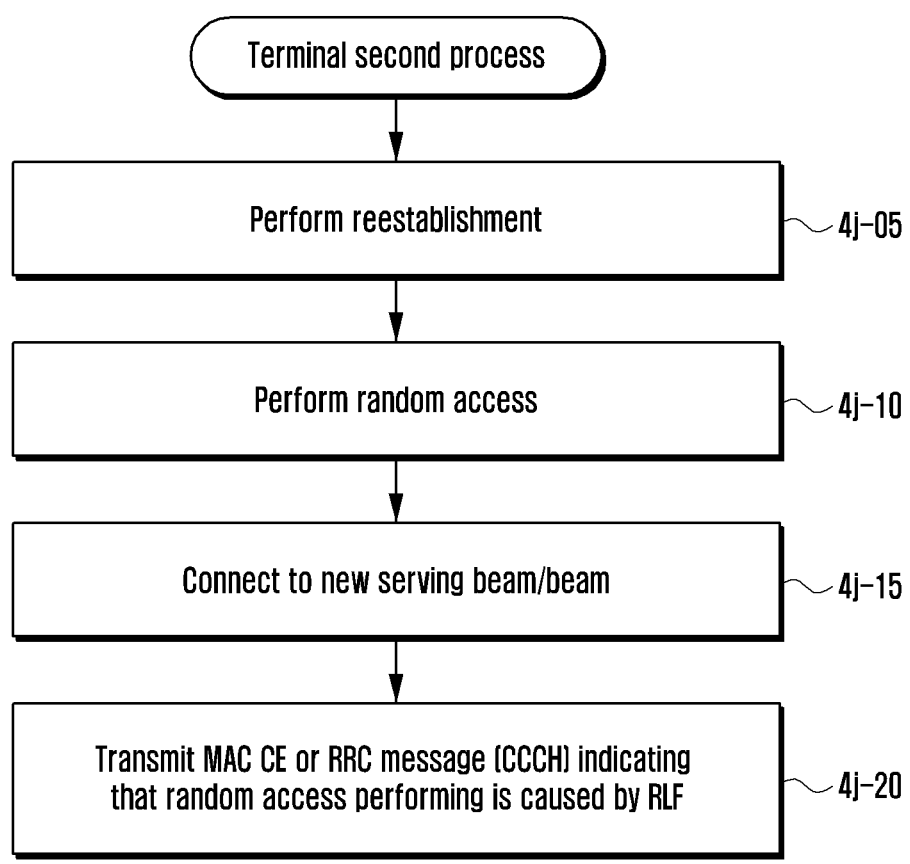
FIG. 4J is a diagram explaining a first process according to an embodiment of the present disclosure.

FIG. 4J is a diagram explaining a second process according to an embodiment of the present disclosure.

Referring to FIG. 4J, the terminal measures all beams or a specific beam provided from the same TRP or an adjacent TRP in the reestablishment process, at operation 4j-05, and searches for a TRP/beam providing the best signal quality or a TRP/beam providing a specific signal quality. At operation 4j-10, the terminal performs a random access process. The terminal transmits a preamble to all beams or a specific beam in the same or an adjacent TRP. The terminal receives a RAR from a specific beam in response to the preamble, and considers the beam that has transmitted the RAR as a beam having the best signal quality in the TRP or a beam that provides the specific signal quality. At operation 4j-15, the terminal connects to a new serving cell or beam. At operation 4j-20, the terminal transmits a MAC CE or RRC message indicating that the reason to perform the random access is RLF. A common control channel (CCCH) is a kind of the RRC message.

Figure 4K:
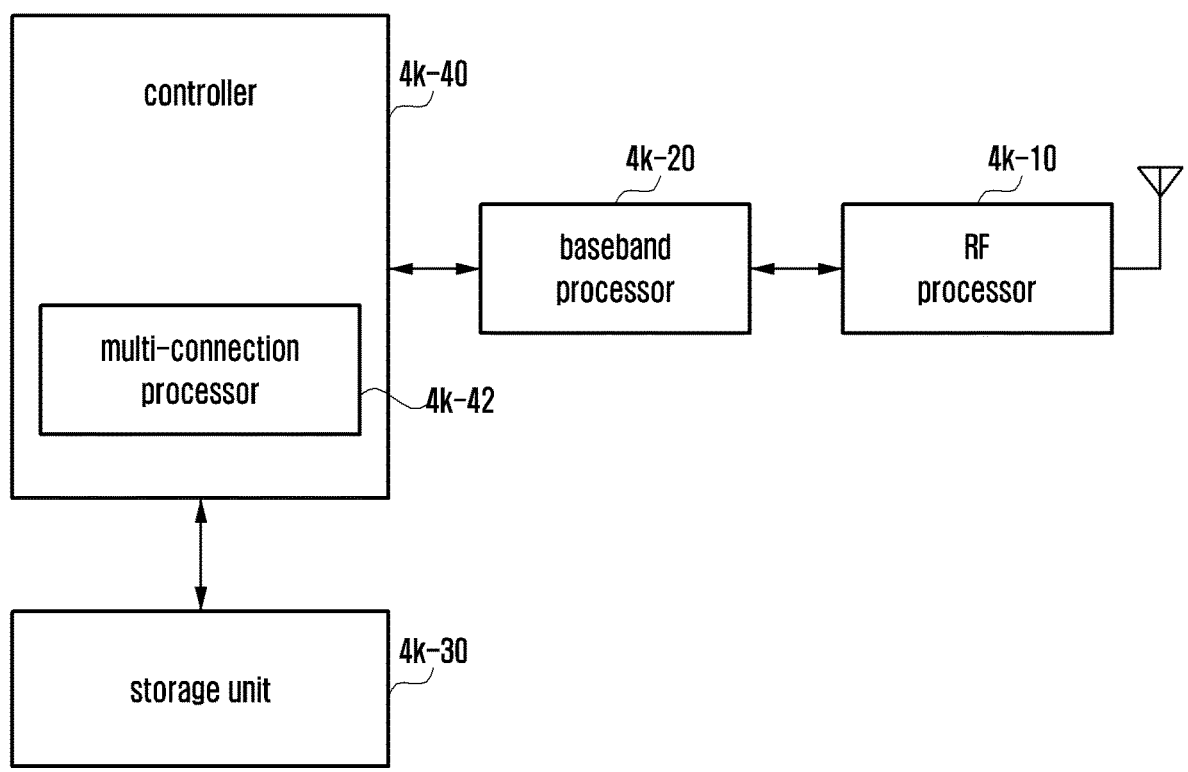
FIG. 4K is a diagram illustrating a configuration of a terminal according to an embodiment of the present disclosure.

FIG. 4K is a diagram illustrating the configuration of a terminal according to an embodiment of the present disclosure.

Referring to FIG. 4K, the terminal includes an RF processor 4k-10, a baseband processor 4k-20, a storage unit 4k-30, and a controller 4k-40.

The RF processor 4k-10 performs a function for transmitting and receiving a signal through a radio channel, such as signal band conversion and amplification. That is, the RF processor 4k-10 performs up-conversion of a baseband signal provided from the baseband processor 4k-20 into an RF-band signal to transmit the converted signal to an antenna, and performs down-conversion of the RF-band signal received through the antenna into a baseband signal. For example, the RF processor 4k-10 may include a transmission filter, a reception filter, an amplifier, a mixer, an oscillator, a DAC, and an ADC. Although only one antenna is illustrated in the drawing, the terminal may be provided with a plurality of antennas. Further, the RF processor 4k-10 may include a plurality of RF chains. Further, the RF processor 4k-10 may perform beamforming. For the beamforming, the RF processor 4l-10 may adjust phases and sizes of signals transmitted or received through the plurality of antennas or antenna elements. Further, the RF processor may perform MIMO, and may receive several layers during performing of a MIMO operation.

The baseband processor 4k-20 performs conversion between a baseband signal and a bit string in accordance with the PHY standard of the system. For example, during data transmission, the baseband processor 4k-20 generates complex symbols by encoding and modulating a transmitted bit string. Further, during data reception, the baseband processor 4k-20 restores a received bit string by demodulating and decoding the baseband signal provided from the RF processor 4k-10. For example, in the case of following an OFDM method, during data transmission, the baseband processor 4k-20 generates complex symbols by encoding and modulating a transmitted bit string, performs mapping of the complex symbols on subcarriers, and then configures OFDM symbols through the IFFT operation and CP insertion. Further, during data reception, the baseband processor 4k-20 divides the baseband signal provided from the RF processor 4k-10 in the unit of OFDM symbols, restores the signals mapped on the subcarriers through the FFT operation, and then restores the received bit string through demodulation and decoding.

The baseband processor 4k-20 and the RF processor 4k-10 transmit and receive the signals as described above. Accordingly, the baseband processor 4k-20 and the RF processor 4k-10 may be called a transmitter, a receiver, a transceiver, or a communication unit. Further, in order to support different radio connection technologies, at least one of the baseband processor 4k-20 and the RF processor 4k-10 may include a plurality of communication modules. Further, in order to process signals of different frequency bands, at least one of the baseband processor 4k-20 and the RF processor 4k-10 may include different communication modules. For example, the different radio connection technologies may include an LTE network and an NR network. Further, the different frequency bands may include SHF (e.g., 2·NR Hz or NR Hz) band and millimeter wave (mm Wave) (e.g., 60 GHz) band.

The storage unit 4k-30 stores therein a basic program for an operation of the terminal, application programs, and data of configuration information. In particular, the storage unit 4k-30 may store information related to a second connection node that performs wireless communication using the second radio connection technology. Further, the storage unit 4k-30 provides stored data in accordance with a request from the controller 4k-40.

The controller 4k-40 controls the whole operation of the terminal. For example, the controller 4k-40 transmits and receives signals through the baseband processor 4k-20 and the RF processor 4k-10. Further, the controller 4k-40 records or reads data in or from the storage unit 4k-30. For this, the controller 4k-40 may include at least one processor. For example, the controller 4k-40 may include a CP performing a control for communication and an AP controlling an upper layer, such as an application program. The controller 4k-40 may include a multi-connection processor 4k-42.

Figure 4L:
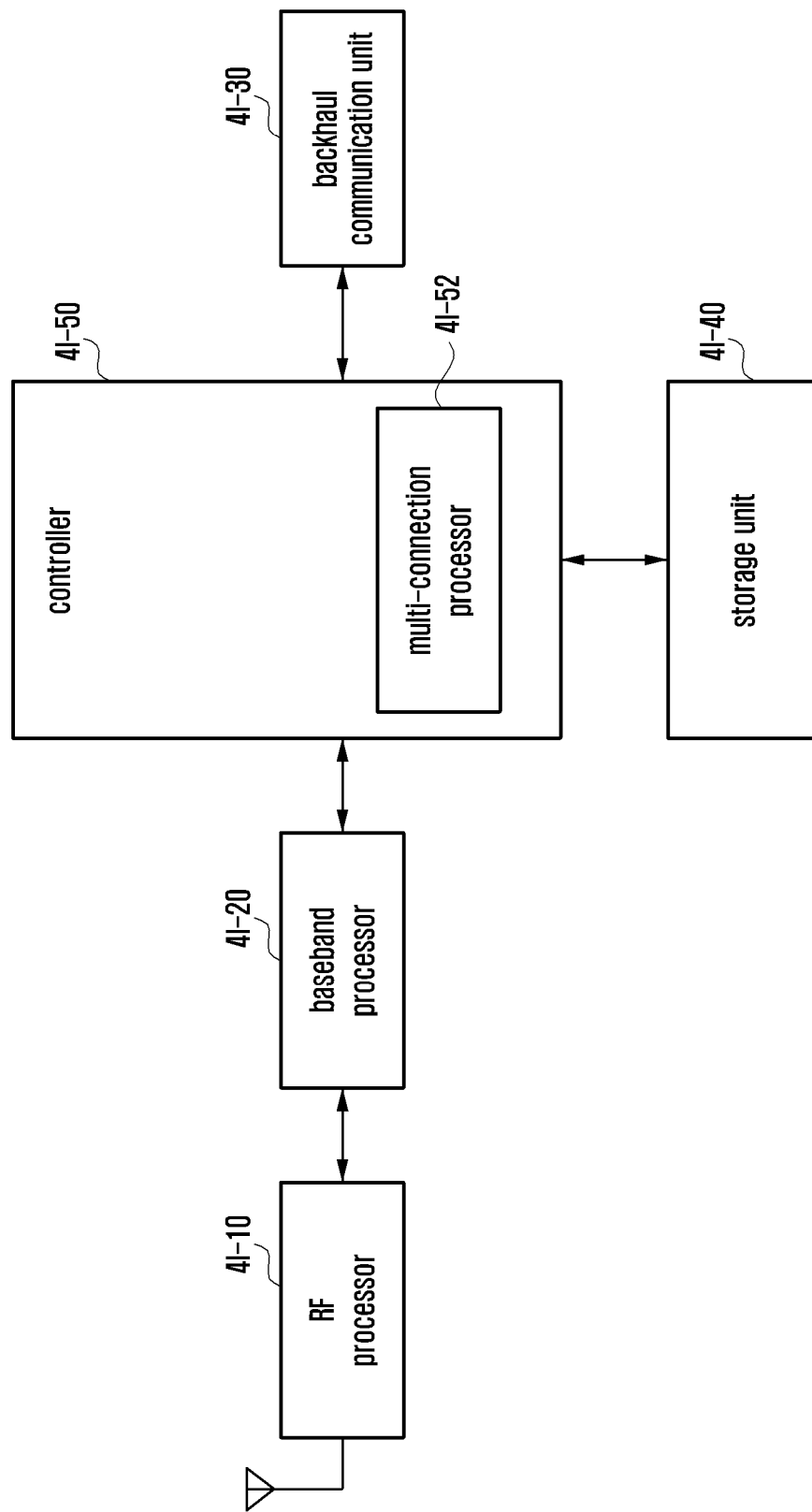
FIG. 4L is a diagram illustrating a configuration of a base station according to an embodiment of the present disclosure.

FIG. 4L is a diagram illustrating the configuration of a base station in a wireless communication system according to an embodiment of the present disclosure.

Referring to FIG. 4L, the base station includes an RF processor 4l-10, a baseband processor 4l-20, a backhaul communication unit 4l-30, a storage unit 4l-40, and a controller 4l-50.

The RF processor 4l-10 performs a function for transmitting and receiving a signal through a radio channel, such as signal band conversion and amplification. That is, the RF processor 4l-10 performs up-conversion of a baseband signal provided from the baseband processor 4l-20 into an RF-band signal to transmit the converted signal to an antenna, and performs down-conversion of the RF-band signal received through the antenna into a baseband signal. For example, the RF processor 4l-10 may include a transmission filter, a reception filter, an amplifier, a mixer, an oscillator, a DAC, and an ADC. Although only one antenna is illustrated in the drawing, the first connection node may be provided with a plurality of antennas. Further, the RF processor 4l-10 may include a plurality of RF chains. Further, the RF processor 4l-10 may perform beamforming. For the beamforming, the RF processor 4l-10 may adjust phases and sizes of signals transmitted or received through the plurality of antennas or antenna elements. Further, the RF processor may perform down MIMO operation through transmission of one or more layers.

The baseband processor 4l-20 performs conversion between a baseband signal and a bit string in accordance with the PHY standard of the first radio connection technology. For example, during data transmission, the baseband processor 4l-20 generates complex symbols by encoding and modulating a transmitted bit string. Further, during data reception, the baseband processor 4l-20 restores a received bit string by demodulating and decoding the baseband signal provided from the RF processor 4l-10. For example, in the case of following an OFDM method, during data transmission, the baseband processor 4l-20 generates complex symbols by encoding and modulating a transmitted bit string, performs mapping of the complex symbols on subcarriers, and then configures OFDM symbols through the IFFT operation and CP insertion. Further, during data reception, the baseband processor 4l-20 divides the baseband signal provided from the RF processor 4l-20 in the unit of OFDM symbols, restores the signals mapped on the subcarriers through the FFT operation, and then restores the received bit string through demodulation and decoding. The baseband processor 4l-20 and the RF processor 4l-10 transmit and receive the signals as described above. Accordingly, the baseband processor 4*l*-20 and the RF processor 4*l*-10 may be called a transmitter, a receiver, a transceiver, or a communication unit.

The backhaul communication unit 4*l*-30 provides an interface for performing communication with other nodes in the network. That is, the backhaul communication unit 4*l*-30 converts a bit string that is transmitted from the master base station to another node, for example, an auxiliary base station or a CN, into a physical signal, and converts a physical signal that is received from the other node into a bit string.

The storage unit 4*l*-40 stores therein a basic program for an operation of the master base station, application programs, and data of configuration information. In particular, the storage unit 4*l*-40 may store information on a bearer allocated to the connected terminal and the measurement result reported from the connected terminal. Further, the storage unit 4*l*-40 may store information that becomes a basis of determination whether to provide or suspend a multi-connection to the terminal. Further, the storage unit 4*l*-40 provides stored data in accordance with a request from the controller 4*l*-50.

The controller 4*l*-50 controls the whole operation of the master base station. For example, the controller 4*l*-50 transmits and receives signals through the baseband processor 4*l*-20 and the RF processor 4*l*-10 or through the backhaul communication unit 4*l*-30. Further, the controller 4*l*-50 records or reads data in or from the storage unit 4*l*-40. For this, the controller 4*l*-50 may include at least one processor. The controller 4*l*-50 may include a multi-connection processor 4*l*-52.

Fifth Embodiment

In a wireless mobile communication system, it may be necessary to suspend the use of a radio link between a terminal and a network. If data transmission/reception is performed through the radio link of which the use is suspended, a malfunction may occur between the terminal and the network. For example, a serial number that is used for data transmission/reception may be erroneously updated to cause a normal operation not to be performed hereafter, or uplink transmission may be performed in an extremely inferior situation to cause the occurrence of unnecessary interference.

In order to prevent such a problem, if a specific event occurs to suspend the use of the radio link, the terminal suspends not only the operation of a physical channel but also the use of a signaling radio bearer (SRB) and a data radio bearer (DRB). In this case, through sensing of the kind of the event occurring, the terminal suspends the use of all SRBs or partial SRBs.

The event may be, for example, a start of a RLF or RRC connection suspension procedure.

If the RLF is sensed, the terminal starts a cell selection process to search for a cell in which a radio connection can be resumed, and starts an RRC connection reestablishment procedure in the newly selected cell. The RRC connection reestablishment procedure is a process in which the terminal transmits a specific RRC control message to a base station, and the base station transmits another specific control message to the terminal in response to the RRC control message. In this case, the uplink RRC control message and the downlink RRC control message are transmitted and received through a bearer that is called SRB0. The SRB0 is a radio bearer of which the security is not supported, and thus integrity is not secured with respect to the downlink control message transmitted through the SRB0.

The RRC connection suspension procedure may start as the base station transmits a specific control message to the terminal. The RRC connection suspension procedure is a procedure in which the terminal and the base station store therein currently used configuration information (it may be called context, and includes, for example, radio bearer configuration information, security key information, and radio measurement configuration information), and during the next RRC connection, the RRC connection is resumed more quickly using the stored configuration information. Since the terminal and the base station already share the security configuration information, integrity protection is applied with respect to the first downlink control message, and for this, the first downlink control message is transmitted using SRB1.

In the case where an event occurs to suspend the radio bearer, and the event is the RLF, the terminal suspends the operations of all SRBs excluding the SRB0, whereas if the event is caused by the RRC connection suspension procedure, the terminal suspends the operations of all SRBs excluding the SRB0 and SRB1, so that the following communication suspension procedure can be properly performed.

Figure 5A:
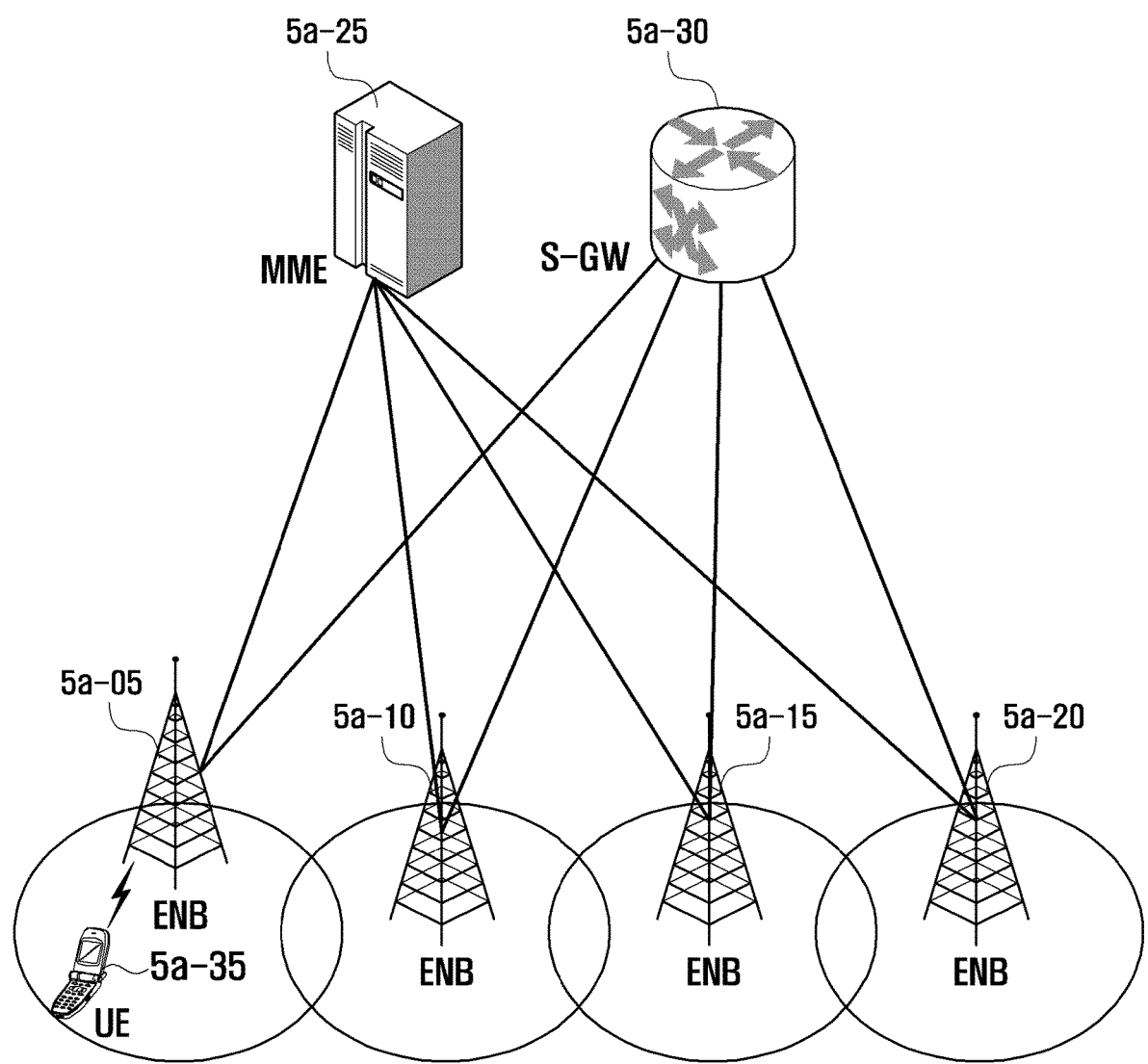
FIG. 5A is a diagram illustrating a structure of an LTE system according to an embodiment of the present disclosure.

FIG. 5A is a diagram illustrating the structure of an LTE system to which partial embodiments of the present disclosure are applied according to an embodiment of the present disclosure.

Referring to FIG. 5A, a radio access network of an LTE system includes ENBs, "node Bs", or "base stations" 5*a*-05, 5*a*-10, 5*a*-15, and 5*a*-20, an MME 5*a*-25, and an S-GW 5*a*-30. UE or "terminal" 5*a*-35 connects to an external network through the ENBs 5*a*-05, 5*a*-10, 5*a*-15, and 5*a*-20 and the S-GW 5*a*-30. In FIG. 5A, the ENBs 5*a*-05, 5*a*-10, 5*a*-15, and 5*a*-20 correspond to existing node Bs of a universal mobile telecommunications system (UMTS). The ENB is connected to the UE 5*a*-35 through a radio channel, and plays a role that is more complicate than the role of the existing node B. In the LTE system, since all user traffics including real-time services, such as a voice over Internet protocol (VoIP), through the Internet protocol are serviced through shared channels, devices that perform scheduling through consolidation of status information, such as a buffer state, an available transmission power state, and a channel state, of UEs, and the ENBs 5*a*-05, 5*a*-10, 5*a*-15, and 5*a*-20 take charge of this. In general, one ENB controls a plurality of cells. In order to implement a transmission speed of several hundred Mbps, the LTE system uses OFDM as a radio connection technology in a 20 MHz bandwidth. Further, an AMC method that determines a modulation scheme and a channel coding rate to match the channel state of the terminal is applied. The S-GW 5*a*-30 is a device that provides data bearers, and generates or removes the data bearers under the control of the MME 5*a*-25. The MME is a device that takes charge of not only a mobility management function for the terminal but also various kinds of control functions, and is connected to a plurality of base stations.

Figure 5B:
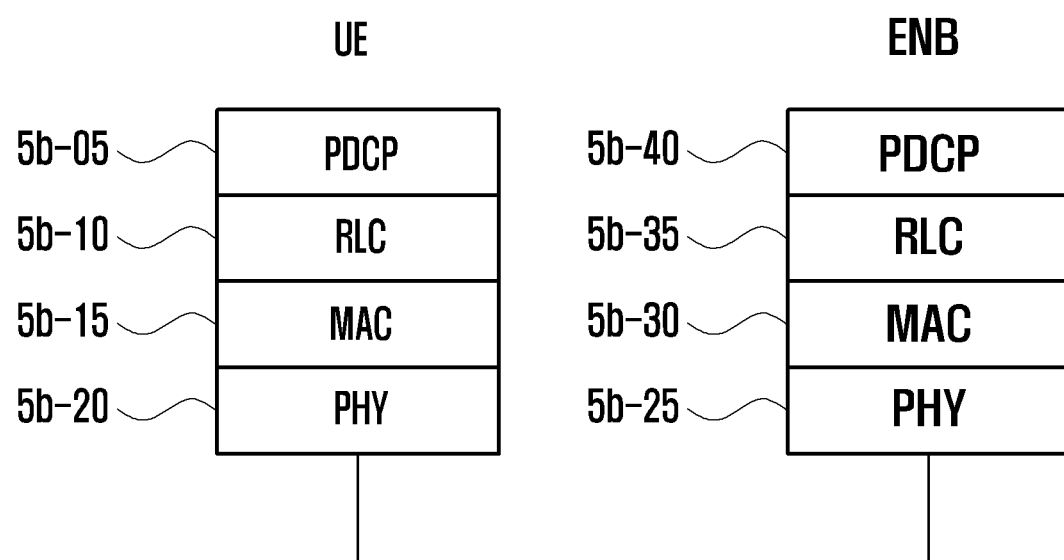
FIG. 5B is a diagram illustrating a radio protocol structure of an LTE system according to an embodiment of the present disclosure.

FIG. 5B is a diagram illustrating a radio protocol structure of an LTE system to which an embodiment of the present disclosure is applied.

Referring to FIG. 5B, in a terminal or an ENB, a radio protocol of an LTE system is composed of a PDCP 5*b*-05 or 5*b*-40, an RLC 5*b*-10 or 5*b*-35, and an MAC 5*b*-15 or 5*b*-30. The PDCP 5*b*-05 or 5*b*-40 takes charge of IP header compression/decompression operations, ciphering/deciphering, and integrity security, and performs an ARQ operation through reconfiguration of a PDCP PDU with a proper size. The MAC 5b-15 or 5b-30 is connected to various RLC layer devices configured in one terminal, and performs multiplexing of RLC PDUs/MAC SDUs to a MAC PDU and demultiplexing of the RLC PDUs from the MAC PDU. A PHY 5b-20 or 5b-25 performs channel coding and modulation of upper layer data and produces OFDM symbols to transmit the OFDM symbols through a radio channel, or performs demodulation and channel decoding of the OFDM symbols received through the radio channel to transfer the demodulated and decoded OFDM symbols to an upper layer.

A radio bearer is a logical path formed to provide a proper QoS, and is composed of one PDCP device and one or two RLC devices. The radio bearer that processes data generated on an upper layer, for example, an IP layer, of a user plane is called a DRB. A radio bearer connected to an RRC to process data generated on the RRC is called an SRB. Maximally 3 SRBs may be configured in one terminal.

SRB0: This is a radio bearer that processes a CCCH control message, and security is not applied thereto. Only packets of a specific size are transmitted to an upper link. A PDCP header and an RLC header are not added to an RRC control message transmitted/received to/from the SRB0. In other words, the RRC control message is directly transferred to the MAC without separately processed through the PDCP and the RLC. Further, a message authentication code for integrity (MAC-I) for integrity protection is not added to a downlink RRC control message that is transmitted/received to/from the SRB0.

SRB1: This is a radio bearer that processes a dedicate control channel (DCCH) control message. The MAC-I is attached to data that is transmitted/received through the SRB1, and a PDCP layer is added to the MAC-I.

SRB2: This is a radio bearer that processes a dedicated control channel (DCCH) control message. Through the SRB2, a control message having a low priority, as compared with the control message that is transmitted/received through the SRB1, is transmitted/received.

The SRB0 is usable without any separate configuration procedure, whereas the SRB1 is configured in an RRC connection establishment process, and the SRB2 is configured in an RRC connection reconfiguration process.

FIG. 5C is a diagram explaining the operations of an RLF-related terminal and a network according to an embodiment of the present disclosure.

Referring to FIG. 5C, in a mobile communication system composed of a terminal 5c-05 and a base station 5c-10, the terminal 5c-05 recognizes occurrence of an RLF, at operation 5c-15. A case where the RLF has occurred means a case where a situation that a normal communication is unable to be performed between the terminal 5c-05 and the base station 5c-10 has occurred. For example, a situation that the quality of a downlink channel of a serving cell is currently lower than a specific reference is maintained over a predetermined time may occur. The terminal 5c-05 that has recognized the occurrence of the RLF suspends the remaining SRBs and DRBs excluding the SRB0, at operation 5c-20.

The terminal 5c-05 starts a cell selection process to search for a cell in which the downlink channel quality that is higher than the specific reference is provided, at operation 5c-25, and starts a random access process in one of the searched cells.

If an uplink transmission resource is allocated through the random access process, the terminal 5c-05 transmits an RRC connection reestablishment request (RRCConnectionReestablishmentRequest) message through the SRB0 using the allocated uplink transmission resource, at operation 5c-30. The control message includes terminal identifier information, specific code information/security token information generated by a security key of the terminal, and connection reestablishment cause information.

The base station 5c-10 has information related to an RRC connection of the terminal 5c-05 that has transmitted the control message, and if the security token is correct, it accepts the connection reestablishment request, and transmits an RRC connection reestablishment message to the terminal through the SRB0, at operation 5c-35. The control message may include information necessary for security activation, for example, information related to a security key, and the terminal that has received the control message generates the security key, activates integrity protection and ciphering/deciphering, and resumes the operation of the SRB1, at operation 5c-40. The information related to the security key may be NextHopChainingCount (NCC) (see 36.331). Thereafter, the terminal performs an RRC connection reconfiguration process through applying of the resumed SRB1 and the activated security, at operation 5c-45, and the SRB2 and DRBs resume their operations through that above-described process.

Figure 5D:
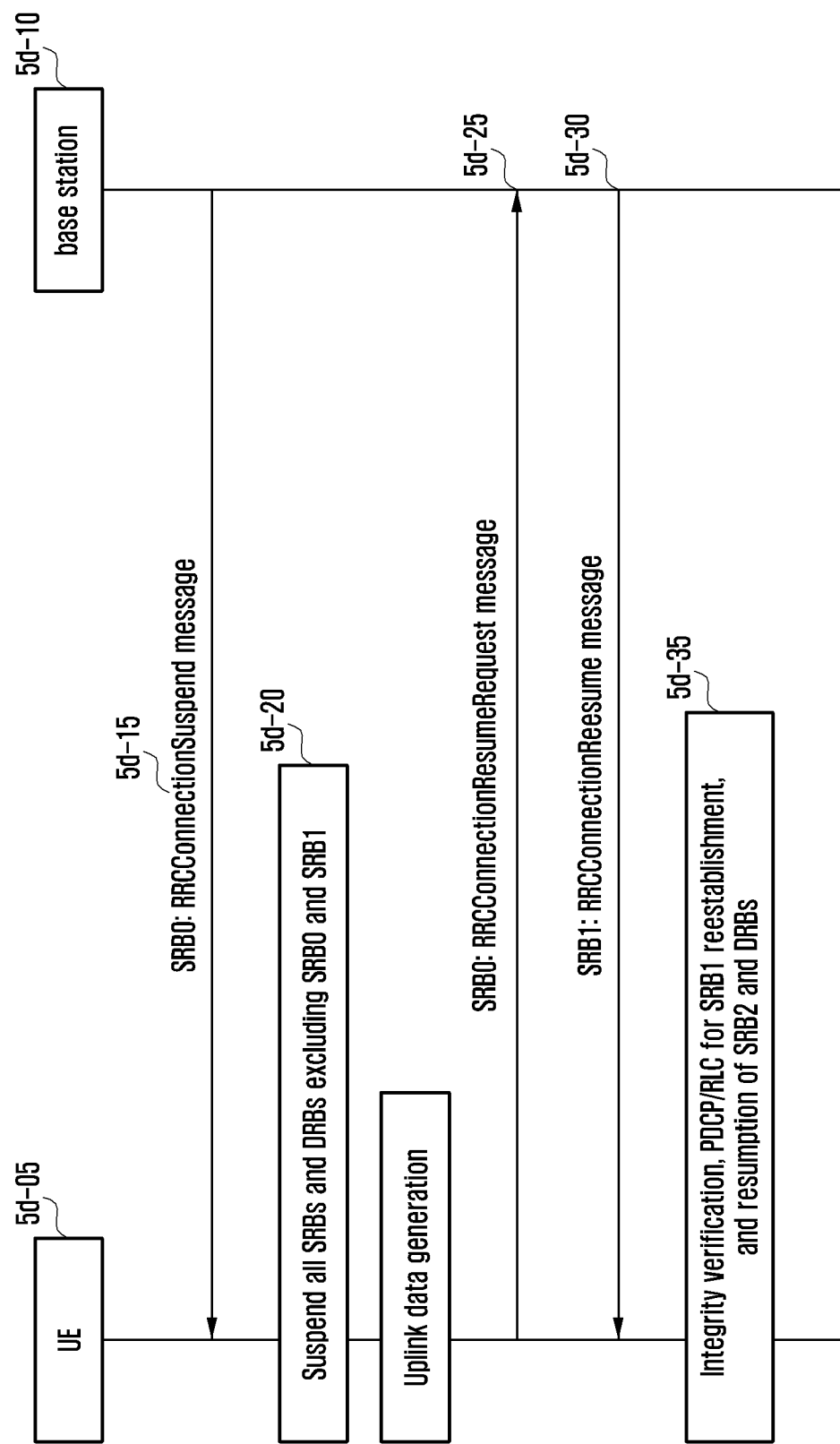
FIG. 5D is a diagram explaining operations of a terminal and a network related to an RRC connection suspending/resuming procedure according to an embodiment of the present disclosure.

FIG. 5D is a diagram explaining the operations of a terminal and a network that are related to an RRC connection suspension/release according to an embodiment of the present disclosure.

Referring to FIG. 5D, in a mobile communication system composed of a terminal 5d-05 and a base station 5d-10, the base station 5d-10 determines to suspend an RRC connection of the terminal 5d-05, and transmits an RRC control message including specific control information to the terminal 5d-05, at operation 5d-15. For example, if it is expected to resume communication with the terminal 5d-05 in time although there exists no data to be transmitted to or received from the terminal 5d-05, the base station 5d-10 may suspend the RRC connection rather than releasing the RRC connection of the terminal 5d-05. The specific information may be, for example, a resume identity to be used when the terminal 5d-05 resumes the RRC connection and paging region information. The paging region information may be, for example, a list of cells, and the terminal 5d-05 may reselect a cell that belongs to the paging region without any separate notification. In the case of reselecting a cell that does not belong to the paging region, the terminal 5d-05 in the new cell notifies the base station 5d-10 that the terminal has moved to the new paging region through transmission of an RRC control message to the base station 5d-10.

The terminal 5d-05 that has received the RRC control message including the specific control information suspends all SRBs and DRBs excluding the SRB0 and SRB1, at operation 5d-20, and performs an operation of determining whether to stay in the current cell or to move to a new cell, that is, a cell reselection operation, in consideration of the downlink channel quality of the current serving cell and the downlink channel quality of a neighbor cell.

Thereafter, if new uplink data is generated in the terminal 5d-05 at a certain time, the terminal starts a random access process in the current serving cell to resume the RRC connection. During the random access process, the terminal 5d-05 is allocated with an uplink transmission resource from the terminal 5d-05, and transmits a specific RRC control message, at operation 5d-25. The RRC control message is a control message for requesting RRC connection resumption, and includes the resume identity information allocated at operation 5d-15. The control message is transmitted through the uplink SRB0.

The base station 5d-10 that has received the control message identifies a base station storing the context of the terminal 5d-05 through checking of the control identity, and then receives the context of the terminal 5d-05 from the base station 5d-10. Further, the base station 5d-10 recognizes SRB1 configuration of the terminal 5d-05, SRB2 configuration, a security key currently used by the terminal 5d-05, and DRB configuration using the received context, and transmits a control message for instructing the terminal 5d-05 to resume the RRC connection through applying of the existing configuration of the terminal 5d-05, at operation 5d-30. The control message is transmitted through the SRB1, and the PDCP generates a MAC-I using the current security key, and transmits the MAC-I in a state where the MAC-I is appended at the back of the RRC control message.

The terminal 5d-05 that has received the control message performs integrity verification through checking of the MAC-I, and resumes the RRC connection using the information in the control message, at operation 5d-35. More specifically, the terminal 5d-05 resumes the operations of the SRB2 and DRBs, calculates a new security key by applying the security information included in the control message, for example, NCC, and then uses the new security key during data transmission/reception. In order to apply the new security key, the terminal 5d-05 reestablishes RLC devices and PDCP devices of the SRB1 of which the operation has already been resumed and the SRB2 of which the operation is resumed. The reestablishment of the RLC device means initialization of an RLC serial number and various kinds of variables, and the reestablishment of the PDCP device means initialization of a PDCP serial number and HFN to "0."

Figure 5E:
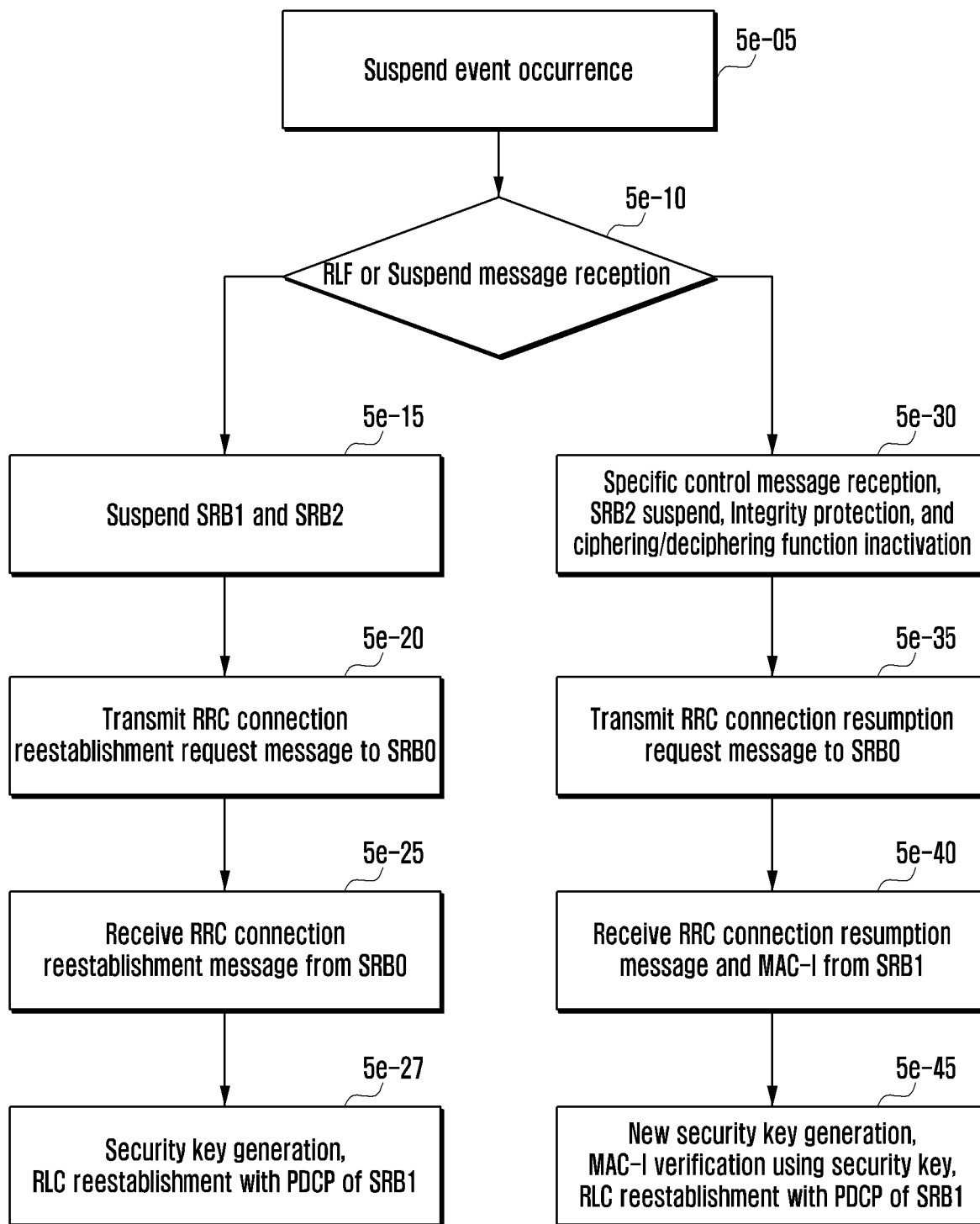
FIG. 5E is a diagram explaining an operation of a terminal according to an embodiment of the present disclosure.

FIG. 5E is a diagram explaining the operation of a terminal according to an embodiment of the present disclosure.

Referring to FIG. 5E, at operation 5e-05, the terminal senses that an event in which at least one DRB should be suspended has occurred. Further, the terminal senses an event that makes the current RRC connection not used any more has occurred.

At operation 5e-10, the terminal checks the kind of the event, and if the event is caused by a RLF, it proceeds to operation 5e-15, whereas if the event is caused by reception of a specific RRC control message, it proceeds to operation 5e-30. The specific RRC control message may be a control message including resume identity and paging region information.

At operation 5e-15, the terminal suspends the remaining SRBs excluding the SRB0, that is, the SRB1 and SRB2, and performs a cell selection process until an RRC connection resumption condition is triggered. At operation 5e-20, if the RRC connection resumption condition is triggered, for example, if a cell in which RRC connection reestablishment can be attempted is searched for, the terminal transmits a specific RRC control message (RRC connection reestablishment request message) through the SRB0. The RRC control message includes a terminal identifier and terminal security token information.

At operation 5e-25, the terminal receives the specific RRC control message (RRC connection reestablishment message) through the SRB0. The terminal generates a new security key by applying an NCC included in the control message, and reestablishes the PDCP and RLC of the SRB1, at operation 5e-27. Further, the terminal resumes the RRC connection operation in the cell.

At operation 5e-30, the terminal receives the specific RRC control message, and suspends SRBs excluding the SRB0 and SRB1, that is, SRB2. The terminal inactivates integrity protection and ciphering/deciphering to process the downlink control message without checking the integrity through the SRB1 hereafter. The RRC control message includes information on resume identity or the like. Thereafter, the terminal performs a cell reselection process until the RRC connection resumption condition is triggered.

At operation 5e-35, if the RRC connection resumption condition is triggered, for example, if uplink data is generated or a paging message is received, the terminal transmits a specific RRC control message (RRC connection resumption request message) through the SRB0. The control message includes the resume identity of the terminal. The resume identity of the RRC connection resumption request message and the terminal identifier of the RRC connection reestablishment request message are different from each other. The resume identity is a combination of the terminal identifier and the identifier of the old base station, whereas the terminal identifier is a terminal identifier used by the terminal with respect to the old base station, and does not include information related to the base station.

At operation 5e-40, the terminal receives the specific RRC control message and the MAC-I for the RRC control message through the SRB1. The terminal generates a new security key using the NCC included in the RRC control message, activates integrity protection, and then verifies the MAC-I through applying of the new security key, at operation 5e-45. If the integrity verification is successful, the terminal performs an operation indicated by the RRC control message, for example, resumption of the operations of the SRB2 and DRBs and ciphering/deciphering activation. In this case, the terminal initializes the serial number of the protocol, count, and various kinds of variables through reestablishment of the PDCP and RLC of the SRB1.

Figure 5F:
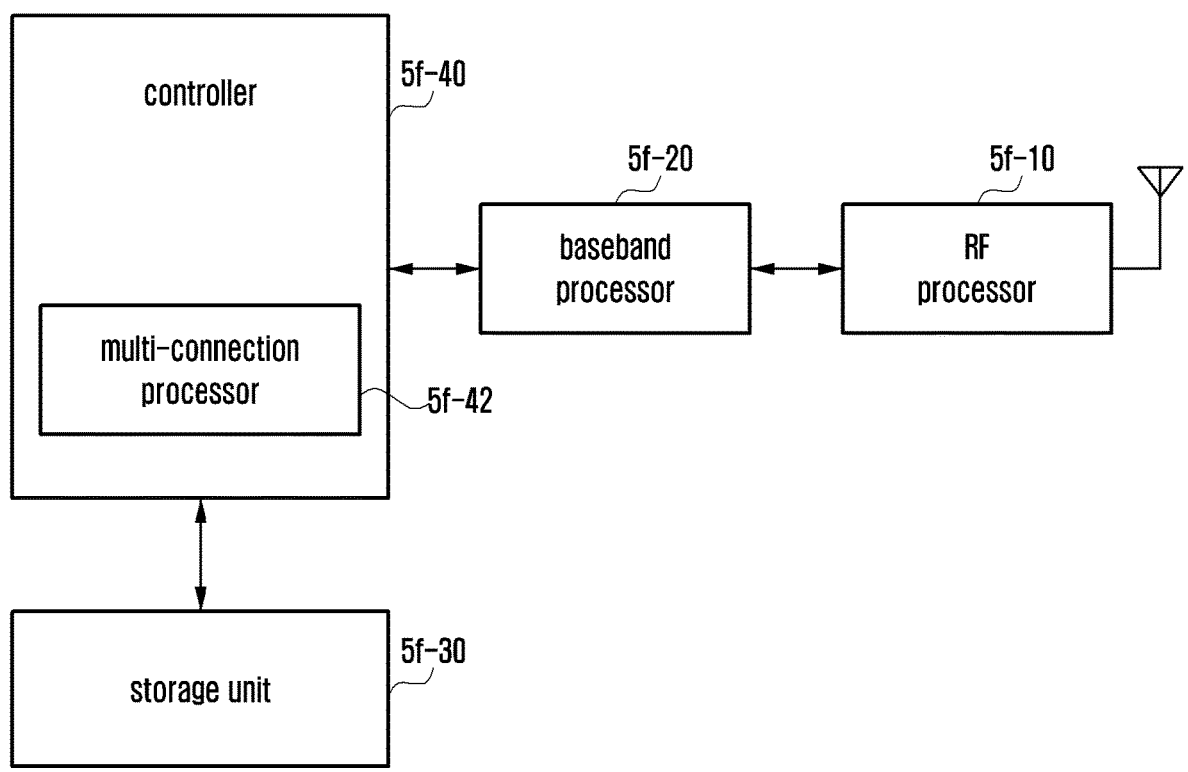
FIG. 5F is a diagram illustrating a configuration of a terminal according to an embodiment of the present disclosure.

FIG. 5F is a diagram illustrating the configuration of a terminal according to an embodiment of the present disclosure.

Referring to FIG. 5F, the terminal includes an RF processor 5f-10, a baseband processor 5f-20, a storage unit 5f-30, and a controller 5f-40.

The RF processor 5f-10 performs a function for transmitting and receiving a signal through a radio channel, such as signal band conversion and amplification. That is, the RF processor 5f-10 performs up-conversion of a baseband signal provided from the baseband processor 5f-20 into an RF-band signal to transmit the converted signal to an antenna, and performs down-conversion of the RF-band signal received through the antenna into a baseband signal. For example, the RF processor 5f-10 may include a transmission filter, a reception filter, an amplifier, a mixer, an oscillator, a DAC, and an ADC. Although only one antenna is illustrated in the drawing, the terminal may be provided with a plurality of antennas. Further, the RF processor 5f-10 may include a plurality of RF chains.

The baseband processor 5f-20 performs conversion between a baseband signal and a bit string in accordance with the PHY standard of the system. For example, during data transmission, the baseband processor 5f-20 generates complex symbols by encoding and modulating a transmitted bit string. Further, during data reception, the baseband processor 5f-20 restores a received bit string by demodulating and decoding the baseband signal provided from the RF processor 5f-10. For example, in the case of following an OFDM method, during data transmission, the baseband processor 5f-20 generates complex symbols by encoding and modulating a transmitted bit string, performs mapping of the complex symbols on subcarriers, and then configures OFDM symbols through the IFFT operation and CP insertion. Further, during data reception, the baseband processor 5f-20 divides the baseband signal provided from the RF processor 5f-10 in the unit of OFDM symbols, restores the signals mapped on the subcarriers through the FFT operation, and then restores the received bit string through demodulation and decoding.

The baseband processor 5f-20 and the RF processor 5f-10 transmit and receive the signals as described above. Accordingly, the baseband processor 5f-20 and the RF processor 5f-10 may be called a transmitter, a receiver, a transceiver, or a communication unit. Further, in order to support different radio connection technologies, at least one of the baseband processor 5f-20 and the RF processor 5f-10 may include a plurality of communication modules. Further, in order to process signals of different frequency bands, at least one of the baseband processor 5f-20 and the RF processor 5f-10 may include different communication modules.

The storage unit 5f-30 stores therein a basic program for an operation of the terminal, application programs, and data of configuration information. The storage unit 5f-30 provides stored data in accordance with a request from the controller 5f-40.

The controller 5f-40 controls the whole operation of the terminal. For example, the controller 5f-40 transmits and receives signals through the baseband processor 5f-20 and the RF processor 5f-10. Further, the controller 5f-40 records or reads data in or from the storage unit 5f-30. Further, the controller 5f-40 controls suspension and operation resumption of the SRB and DRB. For this, the controller 5f-40 may include at least one processor. For example, the controller 5f-40 may include a CP performing a control for communication and an AP controlling an upper layer, such as an application program. The controller 5f-40 may include a multi-connection processor 5f-42.

Figure 5G:
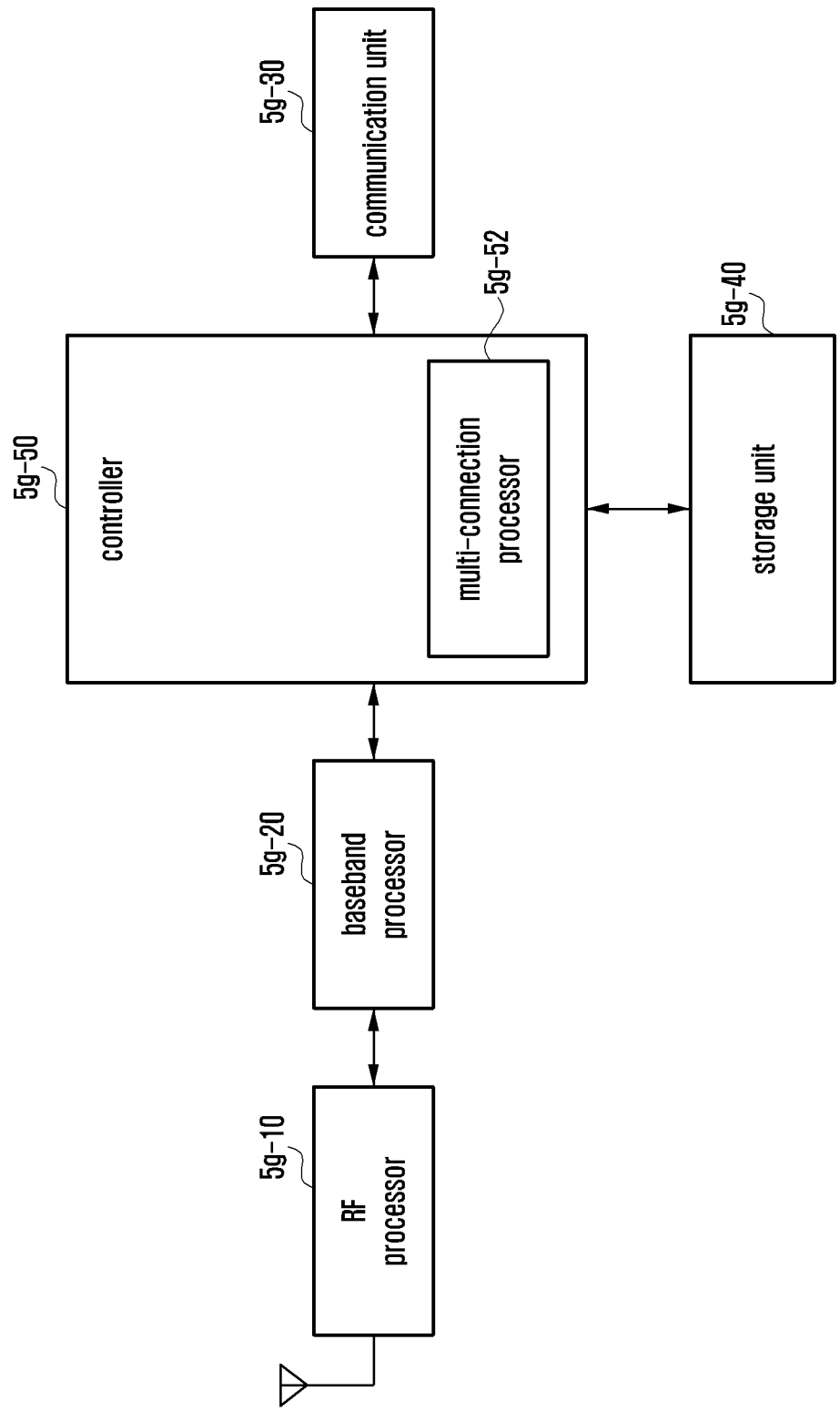
FIG. 5G is a diagram illustrating a configuration of a base station according to an embodiment of the present disclosure.

FIG. 5G is a diagram illustrating the configuration of a base station in a wireless communication system according to an embodiment of the present disclosure.

Referring to FIG. 5G, the base station includes an RF processor 5g-10, a baseband processor 5g-20, a backhaul communication unit 5g-30, a storage unit 5g-40, and a controller 5g-50.

The RF processor 5g-10 performs a function for transmitting and receiving a signal through a radio channel, such as signal band conversion and amplification. That is, the RF processor 5g-10 performs up-conversion of a baseband signal provided from the baseband processor 5g-20 into an RF-band signal to transmit the converted signal to an antenna, and performs down-conversion of the RF-band signal received through the antenna into a baseband signal. For example, the RF processor 5g-10 may include a transmission filter, a reception filter, an amplifier, a mixer, an oscillator, a DAC, and an ADC. Although only one antenna is illustrated in the drawing, the first connection node may be provided with a plurality of antennas. Further, the RF processor 5g-10 may include a plurality of RF chains.

The baseband processor 5g-20 performs conversion between a baseband signal and a bit string in accordance with the PHY standard of the first radio connection technology. For example, during data transmission, the baseband processor 5g-20 generates complex symbols by encoding and modulating a transmitted bit string. Further, during data reception, the baseband processor 5g-20 restores a received bit string by demodulating and decoding the baseband signal provided from the RF processor 5g-10. For example, in the case of following an OFDM method, during data transmission, the baseband processor 5g-20 generates complex symbols by encoding and modulating a transmitted bit string, performs mapping of the complex symbols on subcarriers, and then configures OFDM symbols through the IFFT operation and CP insertion. Further, during data reception, the baseband processor 5g-20 divides the baseband signal provided from the RF processor 5g-10 in the unit of OFDM symbols, restores the signals mapped on the subcarriers through the FFT operation, and then restores the received bit string through demodulation and decoding. The baseband processor 5g-20 and the RF processor 5g-10 transmit and receive the signals as described above. Accordingly, the baseband processor 5g-20 and the RF processor 5g-10 may be called a transmitter, a receiver, a transceiver, or a communication unit.

The backhaul communication unit 5g-30 provides an interface for performing communication with other nodes in the network.

The storage unit 5g-40 stores therein a basic program for an operation of the master base station, application programs, and data of configuration information. In particular, the storage unit 5g-40 may store information on a bearer allocated to the connected terminal and the measurement result reported from the connected terminal. Further, the storage unit 5g-40 may store information that becomes a basis of determination whether to provide or suspend a multi-connection to the terminal. Further, the storage unit 5g-40 provides stored data in accordance with a request from the controller 5g-50.

The controller 5g-50 controls the whole operation of the master base station. For example, the controller 5g-50 transmits and receives signals through the baseband processor 5g-20 and the RF processor 5g-10 or through the backhaul communication unit 5g-30. Further, the controller 5g-50 records or reads data in or from the storage unit 5g-40. For this, the controller 5g-50 may include at least one processor. The controller 5g-50 may include a multi-connection processor 5g-52.

Sixth Embodiment

In a wireless mobile communication system, it may be necessary to suspend the use of a radio link between a terminal and a network. If data transmission/reception is performed through the radio link of which the use is suspended, a malfunction may occur between the terminal and the network. For example, a serial number that is used for data transmission/reception may be erroneously updated to cause a normal operation not to be performed hereafter, or uplink transmission may be performed in an extremely inferior situation to cause the occurrence of unnecessary interference.

In order to prevent such a problem, if a specific event occurs to suspend the use of the radio link, the terminal suspends not only the operation of a physical channel but also the use of a SRB.

The RRC connection suspension procedure may start as the base station transmits a specific control message to the terminal. The RRC connection suspension procedure is a procedure in which the terminal and the base station store therein currently used configuration information (it may be called UE context, and includes, for example, radio bearer configuration information, security key information, and radio measurement configuration information. Hereinafter referred to as "terminal context"), and during the next RRC connection, the RRC connection is resumed more quickly using the stored configuration information. Since the terminal and the base station already share the security configuration information, integrity protection is applied with respect to the first downlink control message, and for this, the first downlink control message is transmitted using SRB1.

However, if the base station to which the terminal intends to resume connection is not the base station previously connected to the terminal, but a new base station due to mobility of the terminal, a problem may occur in receiving the first downlink control message. This is because if the new base station has security configuration that is different from the security configuration of the terminal, the terminal is unable to decode the encrypted control message that the terminal has received from SRB1. This problem may occur because NextHopChainingCount (hereinafter referred to as "NCC") values that the base station allocates to the terminal may be basically different from each other by base stations.

An embodiment of the present disclosure proposes the operations of the base station and the terminal so that the base station and the terminal can normally transmit/receive the control message to/from each other even if the terminal is connected to a new base station in the case where the base station and the terminal resume their connection after suspending the same.

The (6-1)-th embodiment of the present disclosure proposes a method in which an NCC to be used during the next connection resumption is pre-allocated to an RRC connection release message that is transmitted by a base station to suspend a connection to a terminal, and when the connection is resumed, the terminal reestablishes a PDCP of SRB1 through generation of a new security key using the NCC, so that the terminal and the base station can normally transmit and receive a control message.

For a specific reason, the base station may release the connection to the terminal. When releasing the connection to the terminal, the base station transmits an RRC connection release message (first RRC message) to the terminal. The first RRC message may include a resume identity to be used by the terminal when resuming the RRC connection, a NextHopChainingCount (NCC), and paging region information. If the message is received, the terminal may be shifted to an RRC idle state or an RRC inactive state after storing the terminal context and the NCC to be used when resuming the connection hereafter. The terminal context is also called UE context, and includes, for example, radio bearer configuration information, security key information, and radio measurement configuration information. The terminal may move between cells without reporting such movement to the base station in the paging region, and if the terminal gets out of the paging region, it may report the current cell and update the paging region. The paging region may indicate a list of cells or a paging identification (ID). If the base station and the terminal intend to resume their connection for a specific reason, the terminal includes a resume identity (resume ID) in an RRC connection resumption request message (second RRC message) to transmit the same to the current cell. Before transmitting the RRC connection resumption request message, the terminal performs synchronization with the current cell to know a target physical cell identity (PCI) and a target frequency. Before transmitting the RRC connection resumption request message, the terminal receives generates a new security key using the target PCI and target frequency of the current cell, and the NCC that is received from the first RRC message to be stored, and reestablishes the PDCP of the SRB1 based on this. Further, the terminal transmits the RRC connection resumption request message, receives an RRC connection resumption message (third message) in response to this, and decodes and confirms the RRC connection resumption message with the established PDCP of the SRB1.

The (6-1)-th embodiment of the present disclosure includes the following operations.

An operation at which the terminal receives a first RRC message including a resume identity (resume ID) and a NextHopChaining Count (NCC).

An operation at which the terminal starts UE based mobility after receiving the first RRC message.

An operation at which one of predefined events occurs.

An operation at which the received NCC and the terminal generates a new security key based on a cell identity of the current cell.

An operation at which the terminal reestablishes a PDCP of SRB1.

An operation at which the terminal transmits a second RRC message including the resume identity (resume ID) to the current cell.

An operation at which the terminal receives a third RRC message from the current cell through SRB1.

An operation at which the terminal decodes and confirms the received third RRC message with the generated new security key.

An operation at which the terminal resumes DRBs in accordance with the third RRC message and transmits data through the DRBs.

The second RRC message is transmitted to SRB0, and the predefined events may include the followings.

A case where the terminal receives a paging message from the current cell.

A case where the terminal receives downlink scheduling information from the current cell.

A case where uplink data to be transmitted by the terminal occurs.

The (6-2)-th embodiment of the present disclosure proposes a method in which a base station includes an NCC in unencrypted PDCP control PDU of an RRC connection resumption message to be transmitted if a connection is resumed after the base station suspends the connection to a terminal, and the terminal receives the NCC, generates a new security key based on this, and establishes a PDCP of SRB1, so that the terminal and the base station can normally transmit and receive a control message.

For a specific reason, the base station may release the connection to the terminal. When releasing the connection to the terminal, the base station transmits an RRC connection release message (first RRC message) to the terminal. The first RRC message may include a resume identity to be used by the terminal when resuming the RRC connection and paging region information. If the message is received, the terminal may be shifted to an RRC idle state or an RRC inactive state after storing the terminal context and the NCC to be used when resuming the connection hereafter. The terminal context is also called UE context, and may include, for example, radio bearer configuration information, security key information, and radio measurement configuration information. The terminal may move between cells without reporting such movement to the base station in the paging region, and if the terminal gets out of the paging region, it may report the current cell and update the paging region. The paging region may indicate a list of cells or a paging ID. If the base station and the terminal intend to resume their connection for a specific reason, the terminal includes a resume identity (resume ID) in an RRC connection resumption request message (second RRC message) to transmit the same to the current cell. Before transmitting the RRC connection resumption request message, the terminal performs synchronization with the current cell to know a target PCI and a target frequency. The base station receives the RRC connection resumption request message, analyzes the resume ID, and transmits a terminal context request message (first message) to the old base station of the terminal. In this case, the old base station generates a new security key based on the NCC, a target PCI of a new base station, and a target frequency, and transfers both the security key and the NCC to the new base station. The new base station transmits to the terminal the RRC connection resumption message (third RRC message) and the unencrypted PDCP control PDCU including the NCC in response to the RRC connection resumption request message of the terminal. The terminal receives the RRC connection resumption message, confirms the NCC in the unencrypted PDCP control PDU, generates a new security key together with the target PCI and the target frequency, establishes the PDCP of the SRB1, confirms the RRC connection resumption message, and performs a connection resumption procedure.

The (6-2)-th embodiment of the present disclosure includes the following operations.

An operation at which the terminal receives a first RRC message including a resume identity (resume ID).

An operation at which the terminal starts UE based mobility after receiving the first RRC message.

An operation at which one of predefined events occurs.

An operation at which the terminal transmits a second RRC message including the resume identity (resume ID) to the current cell.

An operation at which a new base station requests terminal context from the old base station of the terminal.

An operation at which the old base station generates a new security key using the NCC and information (PCI and frequency) of a new base station (current cell of the terminal).

An operation at which the old base station transfers the new security key and the NCC to the new base station.

An operation at which the new base station includes the NCC in the unencrypted PDCP control PDU to be generated.

An operation at which the new base station transmits a third RRC message and the PDCP control PDU including the NCC to SRB1.

An operation at which the terminal receives the third RRC message from the current cell through SRB1.

An operation at which the terminal confirms the NCC from the unencrypted PDCP control PDU.

An operation at which the received NCC and the terminal generate a new security key based on a cell identity of the current cell.

An operation at which the terminal reestablishes the PDCP of SRB1 based on the new security keys.

An operation at which the terminal decodes and confirms the received third RRC message with the generated new security key.

An operation at which the terminal resumes DRBs in accordance with the third RRC message and transmits data through the DRBs.

The second RRC message is transmitted to SRB0, and the predefined events may include the followings.

A case where the terminal receives a paging message from the current cell.

A case where the terminal receives downlink scheduling information from the current cell.

A case where uplink data to be transmitted by the terminal occurs

Figure 6A:
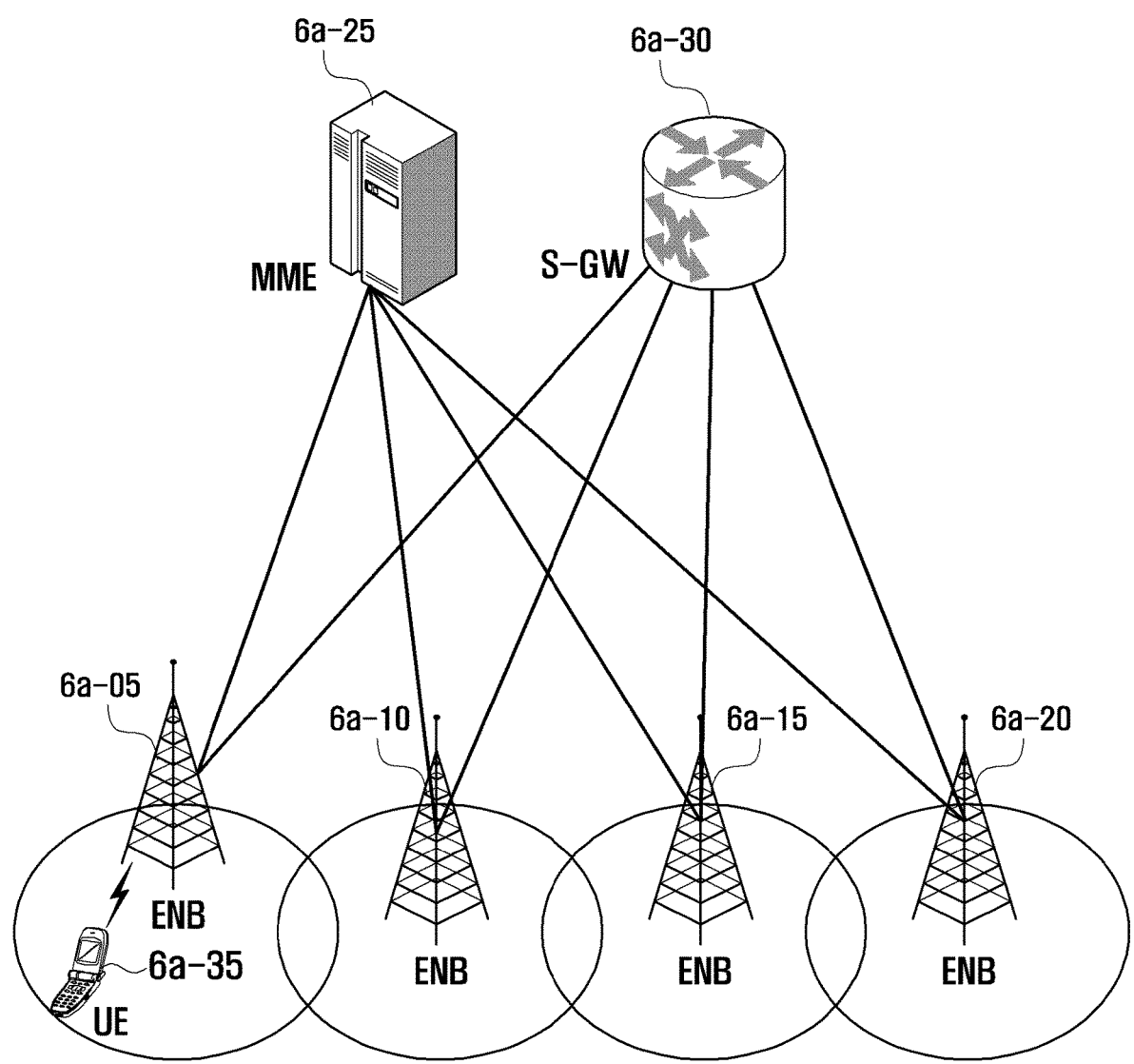
FIG. 6A is a diagram illustrating a structure of an LTE system according to an embodiment of the present disclosure.

FIG. 6A is a diagram illustrating the structure of an LTE system to which partial embodiments of the present disclosure are applied according to an embodiment of the present disclosure.

Referring to FIG. 6A, a radio access network of an LTE system includes ENBs, "node Bs", or "base stations" 6a-05, 6a-10, 6a-15, and 6a-20, an MME 6a-25, and an S-GW 6a-30. UE or "terminal" 6a-35 connects to an external network through the ENBs 6a-05, 6a-10, 6a-15, and 6a-20 and the S-GW 6a-30. In FIG. 6A, the ENBs 6a-05, 6a-10, 6a-15, and 6a-20 correspond to existing node Bs of a UMTS. The ENB is connected to the UE 6a-35 through a radio channel, and plays a role that is more complicate than the role of the existing node B. In the LTE system, since all user traffics including real-time services, such as VoIP, through the Internet protocol are serviced through shared channels, devices that perform scheduling through consolidation of status information, such as a buffer state, an available transmission power state, and a channel state, of UEs, and the ENBs 6a-05, 6a-10, 6a-15, and 6a-20 take charge of this. In general, one ENB controls a plurality of cells. In order to implement a transmission speed of several hundred Mbps, the LTE system uses OFDM as a radio connection technology in a 20 MHz bandwidth. Further, an AMC method that determines a modulation scheme and a channel coding rate to match the channel state of the terminal is applied. The S-GW 6a-30 is a device that provides data bearers, and generates or removes the data bearers under the control of the MME 6a-25. The MME is a device that takes charge of not only a mobility management function for the terminal but also various kinds of control functions, and is connected to a plurality of base stations.

Figure 6B:
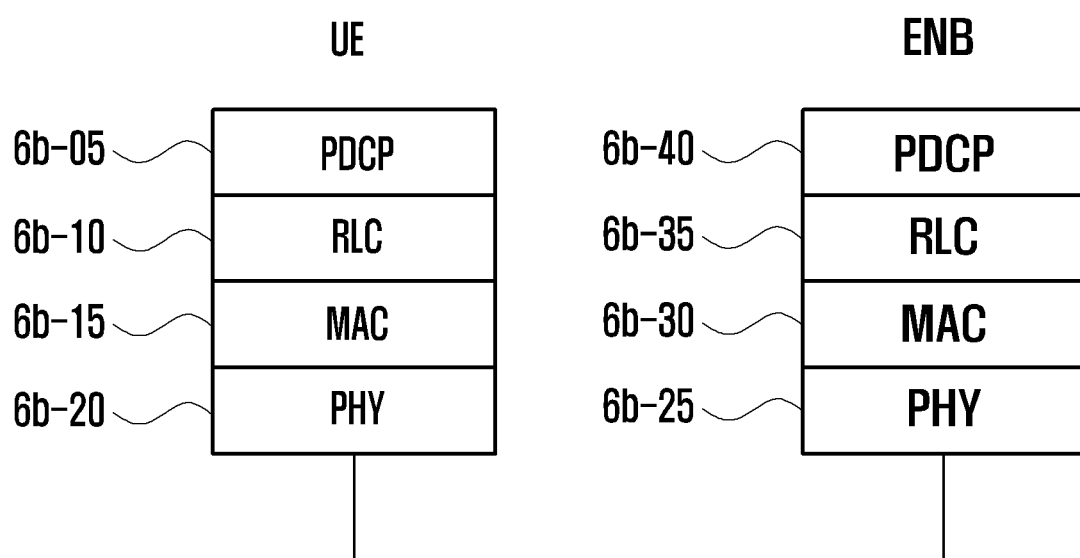
FIG. 6B is a diagram illustrating a radio protocol structure of an LTE system according to an embodiment of the present disclosure.

FIG. 6B is a diagram illustrating a radio protocol structure of an LTE system to which an embodiment of the present disclosure is applied according to an embodiment of the present disclosure.

Referring to FIG. 6B, in a terminal or an ENB, a radio protocol of an LTE system is composed of a PDCP 6b-05 or 6b-40, an RLC 6b-10 or 6b-35, and an MAC 6b-15 or 6b-30. The PDCP 6b-05 or 6b-40 takes charge of IP header compression/decompression operations, ciphering/deciphering, and integrity security, and performs an ARQ operation through reconfiguration of a PDCP PDU with a proper size. The MAC 6b-15 or 6b-30 is connected to various RLC layer devices configured in one terminal, and performs multiplexing of RLC PDUs/MAC SDUs to a MAC PDU and demultiplexing of the RLC PDUs from the MAC PDU. A PHYs 6b-20 or 6b-25 performs channel coding and modulation of upper layer data and produces OFDM symbols to transmit the OFDM symbols through a radio channel, or performs demodulation and channel decoding of the OFDM symbols received through the radio channel to transfer the demodulated and decoded OFDM symbols to an upper layer.

A radio bearer is a logical path formed to provide a proper QoS, and is composed of one PDCP device and one or two RLC devices. The radio bearer that processes data generated on an upper layer, for example, an IP layer, of a user plane is called a DRB. A radio bearer connected to an RRC to process data generated on the RRC is called an SRB. Maximally 3 SRBs may be configured in one terminal.

SRB0: This is a radio bearer that processes a CCCH control message, and security is not applied thereto. Only packets of a specific size are transmitted to an upper link. A PDCP header and an RLC header are not added to an RRC control message transmitted/received to/from the SRB0. In other words, the RRC control message is directly transferred to the MAC without separately processed through the PDCP and the RLC. Further, a MAC-I for integrity protection is not added to a downlink RRC control message that is transmitted/received to/from the SRB0.

SRB1: This is a radio bearer that processes a DCCH control message. The MAC-I is attached to data that is transmitted/received through the SRB1, and a PDCP layer is added to the MAC-I.

SRB2: This is a radio bearer that processes a DCCH control message. Through the SRB2, a control message having a low priority, as compared with the control message that is transmitted/received through the SRB1, is transmitted/received.

The SRB0 is usable without any separate configuration procedure, whereas the SRB1 is configured in an RRC connection establishment process, and the SRB2 is configured in an RRC connection reconfiguration process.

Figure 6C:
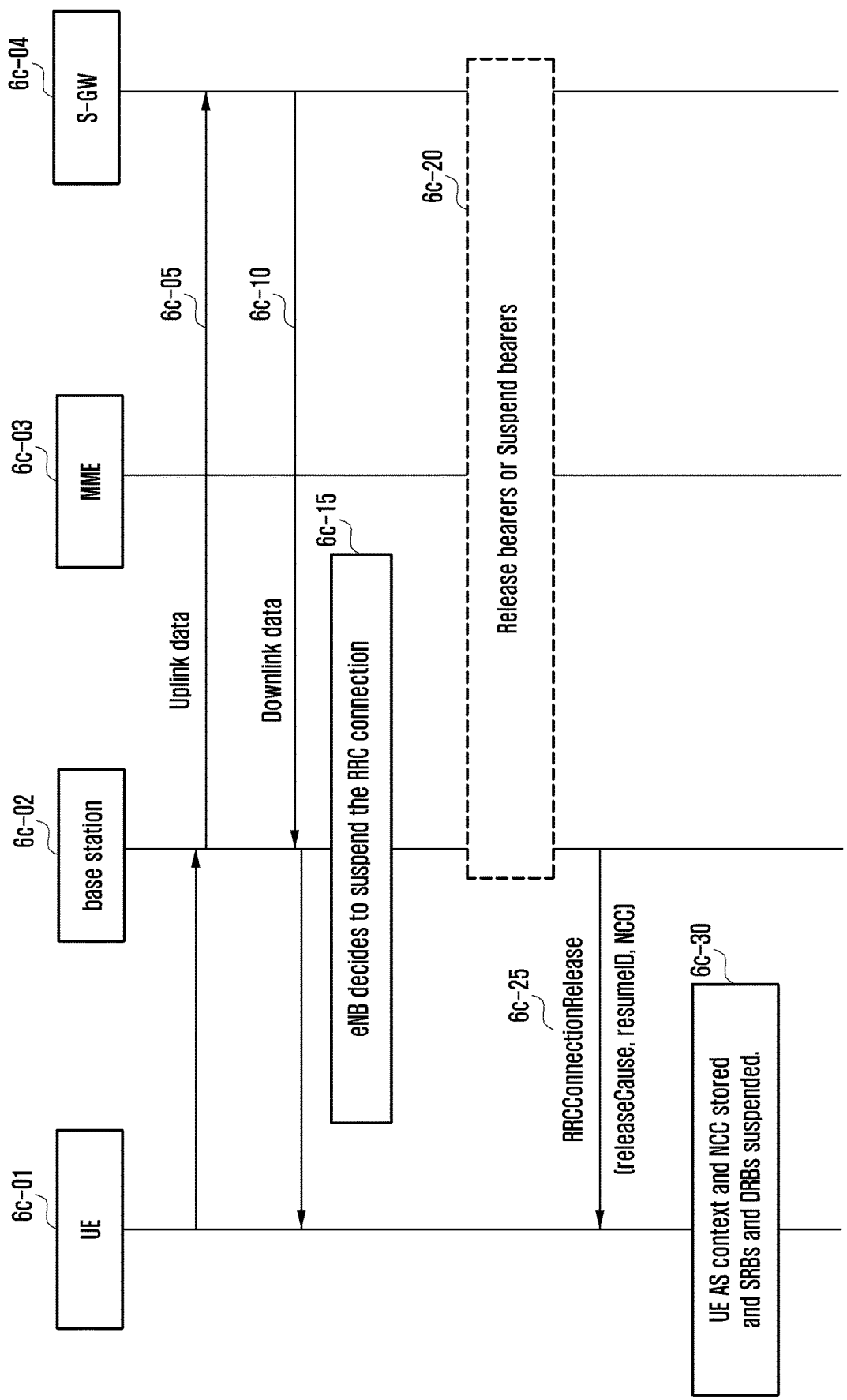
FIG. 6C is a diagram illustrating a procedure in which a network suspends connection with a terminal according to a (6-1)-th embodiment of the present disclosure.

FIGS. 6C and 6D are diagrams illustrating the (6-1)-th embodiment of the present disclosure.

FIG. 6C is a diagram explaining a procedure in which a network releases a connection to a terminal according to the (6-1)-th embodiment of the present disclosure.

Referring to FIG. 6C, in a mobile communication system composed of a terminal 6c-01, a base station 6c-02, an MME 6c-03, and an S-GW 6c-04, while the terminal 6c-01 and a network transmit/receive data to/from each other, at operations 6c-05 and 6c-10, the base station 6c-02 may determine to suspend an RRC connection of the terminal 6c-01, at operation 6c-15, and may release or suspend SRBs and DRBs, at operation 6c-20. Further, the base station 6c-02 transmits an RRC control message (RRC connection release message) including specific control information to the terminal 6c-01, at operation 6c-25. For example, if it is expected to resume communication with the terminal 6c-01 in time although there exists no data to be transmitted to or received from the terminal 6c-01, the base station 6c-02 may suspend the RRC connection rather than releasing the RRC connection of the terminal 6c-01. The specific information of the RRC connection release message may be, for example, a resume identity to be used when the terminal 6c-01 resumes the RRC connection, NextHopChainingCount (NCC), and paging region information. The paging region information may be, for example, a list of cells, and the terminal 6c-01 may reselect a cell that belongs to the paging region without notifying the base station 6c-02 of any separate notification. In the case of reselecting a cell that does not belong to the paging region, the terminal 6c-01 in the new cell may notify the base station 6c-02 that the terminal has moved to the new paging region through transmission of an RRC control message to the base station 6c-02, and may update the paging region. The terminal 6c-01 that has received the RRC control message (RRC connection release message) including the specific control information suspends all SRBs and DRBs, at operation 6c-30, and stores the terminal context and the NCC. The terminal context (that is also called a UE context) may include, for example, radio bearer configuration information, security key information, and radio measurement configuration information, and the NCC may be necessary for security configuration when further resuming the connection.

Then, the terminal performs an operation of determining whether to continuously stay in the current cell or to move to a new cell, i.e., cell reselection operation, in consideration of the downlink channel quality of the current serving cell and the downlink channel quality of a neighbor cell.

FIG. 6D is a diagram explaining a procedure in which the terminal and the network resume the connection according to the (6-1)-th embodiment of the present disclosure.

Referring to FIG. 6D, if a specific reason for resuming the connection occurs at a certain time, for example, if new uplink data occurs in the terminal 6d-01, at operation 6d-10, the terminal 6d-01 starts a random access process in the current serving cell to resume the RRC connection, at operations 6d-15 and 6d-20. In the random access process, the terminal 6d-01 is allocated with the uplink transmission resource for transmitting the specific RRC control message from the base station. The terminal generates new security keys using a target PCI, a target frequency, and the NCC received at operation 6c-25 of FIG. 6C before sending the RRC control message. The security keys may include KeNB*. Further, a terminal 6d-01 reestablishes a PDCP of SRB1 to apply the newly generated security keys, at operation 6d-25.

If the operation of 6d-25 is completed, the terminal 6d-01 sends the RRC control message to a new base station 6d-02, at operation 6d-30. The RRC control message is a control message for requesting the RRC connection resumption, and may include information on resume identity (hereinafter referred to as resume ID) allocated at operation 6c-25 of FIG. 6C, resumeCause, and shortResumeMAC-1. The control message is transmitted through an uplink SRB0.

The new base station 6d-02 that has received the control message identifies an old base station 6d-03 that stores the terminal context through checking of the resume ID, and then receives the terminal context from the old base station 6d-03, at operations 6d-35, 6d-40, and 6d-45. In this case, the old base station 6d-03 generates new security keys using the NCC transferred when releasing the connection to the terminal 6d-01 as shown in FIG. 6C, and PCI and frequency information of the currently new base station, and transfers the generated security keys to the new base station. The security keys may include KeNB*. Further, the new base station 6d-02 transmits a control message for instructing the terminal to resume the RRC connection in order to resume the RRC connection through applying of terminal SRB1 configuration, SRB2 configuration, and DRB configuration using the received terminal contest and the new security keys, at operation 6d-50.

The control message is transmitted through SRB1, and the PDCP generates a MAC-I using the current new security key, and transmits the MAC-I in a state where the MAC-I is appended at the back of the RRC control message. The control message may include the NCC. The terminal 6d-01 that has received the control message performs integrity verification through checking of the MAC-I based on new security key generated at operation 6d-25 and the PDCP of the established SRB1, and resumes the RRC connection using the information in the control message, at operation 6d-55. More specifically, the terminal 6d-01 resumes the operations of the SRB2 and DRBs, and reestablishes RLC devices and PDCP devices of the SRB2 and DRBs to apply the newly generated security keys. The reestablishment of the RLC device means initialization of an RLC serial number and various kinds of variables, and the reestablishment of the PDCP device means initialization of a PDCP serial number and HFN to "0".

After completion of the above-described procedure, the terminal 6d-01 sends a control message indicating that the resumption of the RRC connection has been completed to the new base station 6*d*-02, at operation 6*d*-60. The new base station 6*d*-02 resumes the DRBs if it receives the RRC connection resumption completion message. If the DRBs are released, the new base station 6*d*-02 performs a procedure of newly generating the DRBs, whereas if the DRBs are suspended, the base station performs procedures of correcting and resuming paths of the DRBs, at operation 6*d*-65. Then, the new base station 6*d*-02 requests the old base station 6*d*-03 to release the terminal context, at operation 6*d*-70. Thereafter, the terminal 6*d*-01 transmits/receives data to/from the network in an RRC connection state, at operations 6*d*-75 and 6*d*-80.

Figure 6E:
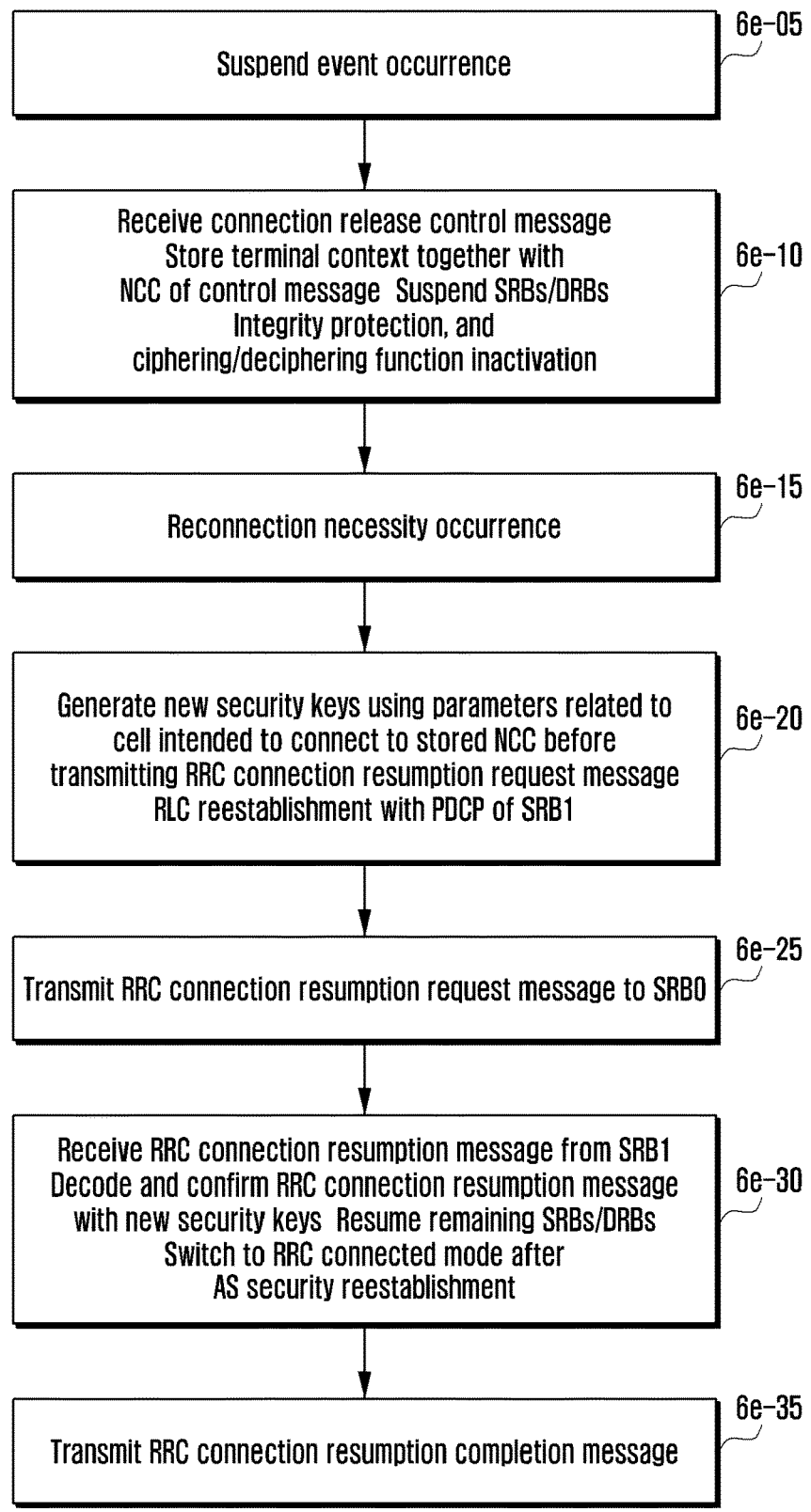
FIG. 6E is a diagram explaining an operation of a terminal according to the (6-1)-th embodiment of the present disclosure.

FIG. 6E is a diagram explaining the operation of a terminal according to the (6-1)-th embodiment of the present disclosure.

Referring to FIG. 6E, if the base station determines to suspend an RRC connection of the terminal in a state where the terminal and the network transmit/receive data to/from each other, at operation 6*e*-05, and transmits an RRC control message (RRC connection release message) including specific control information to the terminal, the terminal receives the RRC control message, at operation 6*e*-10. The specific information of the RRC connection release message may be a resume identity to be used when the terminal resumes the RRC connection, NextHopChainingCount (NCC), and paging region information. The terminal that has received the RRC control message (RRC connection release message) including the control information suspends all SRBs and DRBs, and stores the terminal context and the NCC. The terminal context (that is also called a UE context) may include, for example, radio bearer configuration information, security key information, and radio measurement configuration information, and the NCC may be necessary for security configuration when further resuming the connection. Then, the terminal performs an operation of determining whether to continuously stay in the current cell or to move to a new cell, i.e., cell reselection operation, in consideration of the downlink channel quality of the current serving cell and the downlink channel quality of a neighbor cell. If a specific reason for resuming the connection occurs at a certain time, for example, if new uplink data occurs in the terminal, at operation 6*e*-15, the terminal starts a random access process in the current serving cell to resume the RRC connection, at operation 6*e*-20. In the random access process, the terminal is allocated with the uplink transmission resource for transmitting the specific RRC control message from the base station. The terminal generates new security keys using a target PCI, a target frequency, and the NCC received at operation 6*c*-25 of FIG. 6C before sending the RRC control message. The security keys may include KeNB*. Further, the terminal reestablishes a PDCP and an RLC of SRB1 to apply the newly generated security keys, at operation 6*e*-20.

If the operation of 6*e*-20 is completed, the terminal sends the RRC control message to the base station, at operation 6*e*-25. The RRC control message is a control message for requesting the RRC connection resumption, and may include information on resume identity (hereinafter referred to as resume ID) allocated at operation 6*e*-10, resumeCause, and shortResumeMAC-1. The base station transmits a control message for instructing the terminal to resume the RRC connection in order to resume the RRC connection, and the terminal receives the control message, at operation 6*e*-30. The control message is transmitted through SRB1, and in the base station, the PDCP generates a MAC-I using the current new security key, and transmits the MAC-I in a state where the MAC-I is appended at the back of the RRC control message. The control message may include the NCC. The terminal that has received the control message performs integrity verification through checking of the MAC-I based on new security key generated at operation 6*e*-20 and the PDCP of the established SRB1, and resumes the RRC connection using the information in the control message, at operation 6*e*-30. More specifically, the terminal resumes the operations of the SRB2 and DRBs, and reestablishes RLC devices and PDCP devices of the SRB2 and DRBs to apply the newly generated security keys. The reestablishment of the RLC device means initialization of an RLC serial number and various kinds of variables, and the reestablishment of the PDCP device means initialization of a PDCP serial number and HFN to "0". After completion of the above-described procedure, the terminal sends a control message indicating that the resumption of the RRC connection has been completed to the base station, at operation 6*e*-35.

Figure 6G:
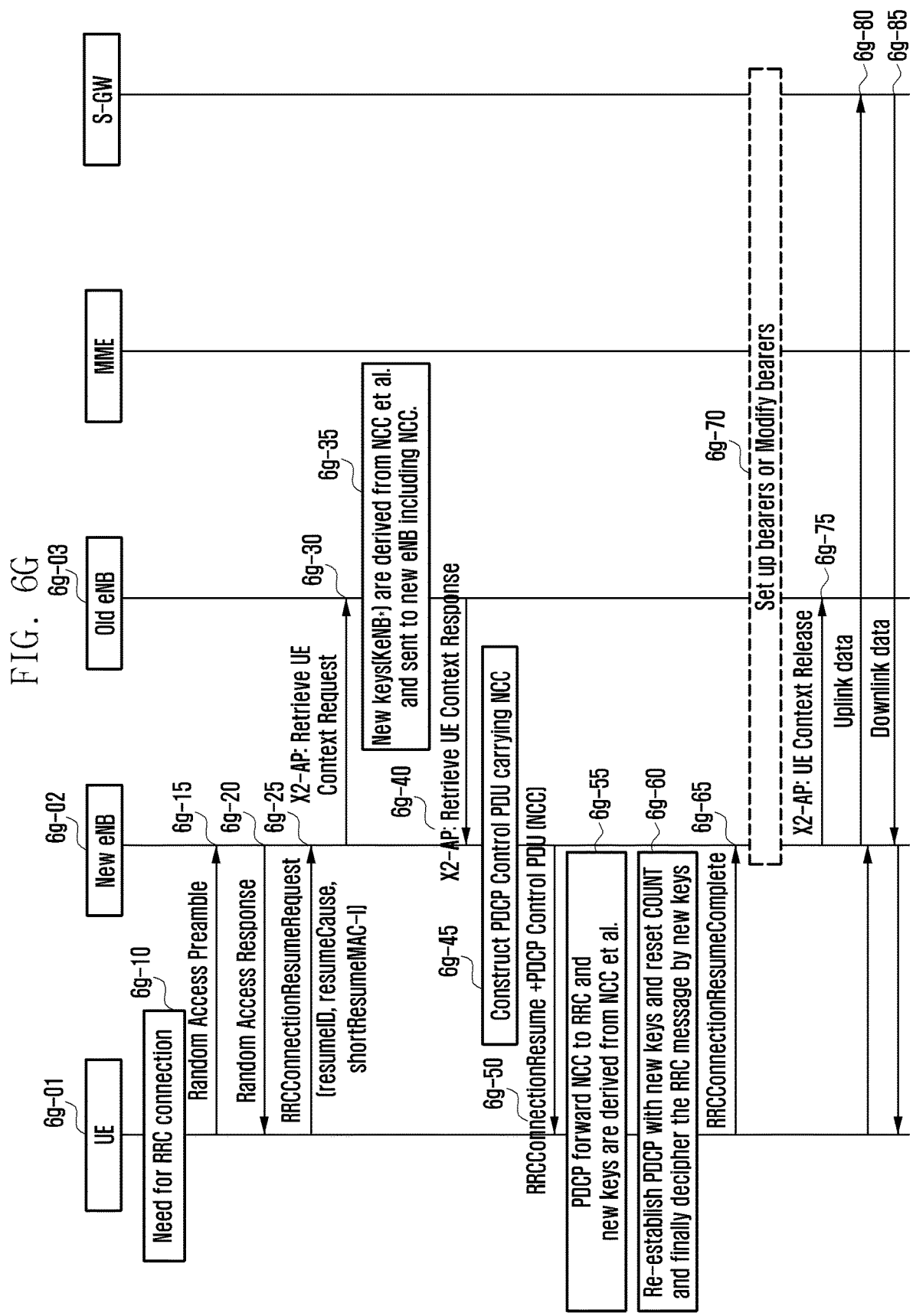
FIG. 6G is a diagram illustrating a procedure in which a terminal and a network resume connection according to the (6-2)-th embodiment of the present disclosure.

FIGS. 6F and 6G are diagrams illustrating the (6-2)-th embodiment of the present disclosure.

FIG. 6F illustrates a procedure in which a network releases a connection to a terminal according to the (6-2)-th embodiment of the present disclosure.

Referring to FIG. 6F, in a mobile communication system composed of a terminal 6*f*-01, a base station 6*f*-02, an MME 6*f*-03, and an S-GW 6*f*-04, while the terminal 6*f*-01 and a network transmit/receive data to/from each other, at operations 6*f*-05 and 6*f*-10, the base station 6*f*-02 may determine to suspend an RRC connection of the terminal 6*f*-01, at operation 6*f*-15, and may release or suspend SRBs and DRBs, at operation 6*f*-20. Further, the base station 6*f*-02 transmits an RRC control message (RRC connection release message) including specific control information to the terminal 6*f*-01, at operation 6*f*-25. For example, if it is expected to resume communication with the terminal 6*f*-01 in time although there exists no data to be transmitted to or received from the terminal 6*f*-01, the base station 6*f*-02 may suspend the RRC connection rather than releasing the RRC connection of the terminal 6*f*-01. The specific information of the RRC connection release message may be, for example, a resume identity to be used when the terminal 6*f*-01 resumes the RRC connection, NextHopChainingCount (NCC), and paging region information. The paging region information may be, for example, a list of cells, and the terminal 6*f*-01 may reselect a cell that belongs to the paging region without notifying the base station 6*f*-02 of any separate notification. In the case of reselecting a cell that does not belong to the paging region, the terminal 6*f*-01 in the new cell may notify the base station 6*f*-02 that the terminal 6*f*-01 has moved to the new paging region through transmission of an RRC control message to the base station 6*f*-02, and may update the paging region. The terminal 6*f*-01 that has received the RRC control message (RRC connection release message) including the specific control information suspends all SRBs and DRBs, at operation 6*f*-30, and stores the terminal context. The terminal context (that is also called a UE context) may include, for example, radio bearer configuration information, security key information, and radio measurement configuration information. The terminal 6*f*-01 performs an operation of determining whether to continuously stay in the current cell or to move to a new cell, i.e., cell reselection operation, in consideration of the downlink channel quality of the current serving cell and the downlink channel quality of a neighbor cell.

FIG. 6G is a diagram illustrating a procedure in which the terminal and the network resume the connection according to the (6-2)-th embodiment of the present disclosure.

Referring to FIG. 6G, if a specific reason for resuming the connection occurs at a certain time, for example, if new uplink data occurs in a terminal 6g-01, at operation 6g-10, the terminal 6g-01 starts a random access process in the current serving cell to resume the RRC connection, at operations 6g-15 and 6g-20. In the random access process, the terminal 6g-01 is allocated with the uplink transmission resource for transmitting the specific RRC control message from a new base station 6g-02, and sends the RRC control message to the new base station 6g-02, at operation 6g-25. The RRC control message is a control message for requesting the RRC connection resumption, and may include information on resume identity (hereinafter referred to as resume ID) allocated at operation 6f-25 of FIG. 6F, resumeCause, and shortResumeMAC-1. The control message is transmitted through an uplink SRB0. The new base station 6g-02 that has received the control message identifies the old base station 6g-03 that stores the terminal context through checking of the resume ID, and then receives the terminal context from the base station, at operations 6g-30 and 6g-40. In this case, the old base station 6g-03 may generate new security keys using a new NCC for new security configuration of the new base station 6g-02, and PCI and frequency information of the currently new base station 6g-02 of the terminal 6g-01, and may transfer the new security keys to the new base station 6g-02 together with the NCC. The security keys may include KeNB*. Operation 6g-35 may be replaced by a procedure in which the old base station 6g-03 sends the old security configuration keys KeNB* to the new base station 6g-02, and the new base station 6g-02 generates new security keys KeNB* using the NCC, PCI, and frequency information generated by the new base station. Further, the new base station may generate unencrypted PDCP control PUD to transfer the NCC information to the terminal 6g-01 that does not know the new security configuration, at operation 6g-45. The PDCP control PDU may include the NCC information. The new base station 6g-02 transmits to the terminal 6g-01 a control message for instructing the terminal 6g-01 to resume the RRC connection in order to resume the RRC connection through applying of SRB1 configuration, SRB2 configuration, and DRB configuration using the terminal contest and the new security keys, and the unencrypted PDCP control PDU, at operation 6g-50. The control message is transmitted through SRB1, and the PDCP generates a MAC-I using the current new security key, and transmits the MAC-I in a state where the MAC-I is appended at the back of the RRC control message. The control message may include the NCC. Since the terminal 6g-01 that has received the control message is unable to decode the control message, it first receives the NCC from the unencrypted PDCP control PDU to transfer the NCC to an RRC layer, and the RRC layer generates new security keys using the NCC, target PCI and target frequency of the current cell, at operation 6g-55. The security keys may include KeNB*. Further, in order to apply the new security keys, the PDCP and RLC of the SRB1 are reestablished, at operation 6g-60. The terminal 6g-01 performs integrity verification through checking of the MAC-I based on the new security key as generated above and the PDCP of the established SRB1, and resumes the RRC connection through confirming of the information included in the control message. More specifically, the terminal 6g-01 resumes the operations of the SRB2 and DRBs, and reestablishes RLC devices and PDCP devices of the SRB2 and DRBs to apply the newly generated security keys. The reestablishment of the RLC device means initialization of an RLC serial number and various kinds of variables, and the reestablishment of the PDCP device means initialization of a PDCP serial number and HFN to "0". After completion of the above-described procedure, the terminal 6g-01 sends a control message indicating that the resumption of the RRC connection has been completed to the new base station 6g-02, at operation 6g-65. The new base station 6g-02 resumes the DRBs if it receives the RRC connection resumption completion message. If the DRBs are released, the new base station 6g-02 performs a procedure of newly generating the DRBs, whereas if the DRBs are suspended, the new base station 6g-02 performs procedures of correcting and resuming paths of the DRBs, at operation 6g-70. Then, the new base station 6g-02 requests the old base station 6g-03 to release the terminal context, at operation 6g-75. Thereafter, the terminal 6g-01 transmits/receives data to/from the network in an RRC connection state, at operations 6g-80 and 6g-85.

The PDCP control PDU may have the following structures.

TABLE 1

| PDCP Control PDU Format 1 | | | |
| --- | --- | --- | --- |
| D/C | DPU Type | R | NCC |

TABLE 2

| PDCP Control PDU Format 1 | | | |
| --- | --- | --- | --- |
| D/C | DPU Type | NCC | R |

The PDCP control PDU is an unencrypted PDU, and may include the NCC as described above. The PDCP control PDU may have the size of one byte, in which NCC of 3 bits, PDU Type of 3 bits, D/C of one bit, and reservation of one bit are included. If the D/C of one bit is "0", it may indicate a control PDU, whereas if the D/C is "1", it may indicate a data PDU. The PDU Type of 3 bits may be newly defined in 011-111 for NCC transmission.

Figure 6H:
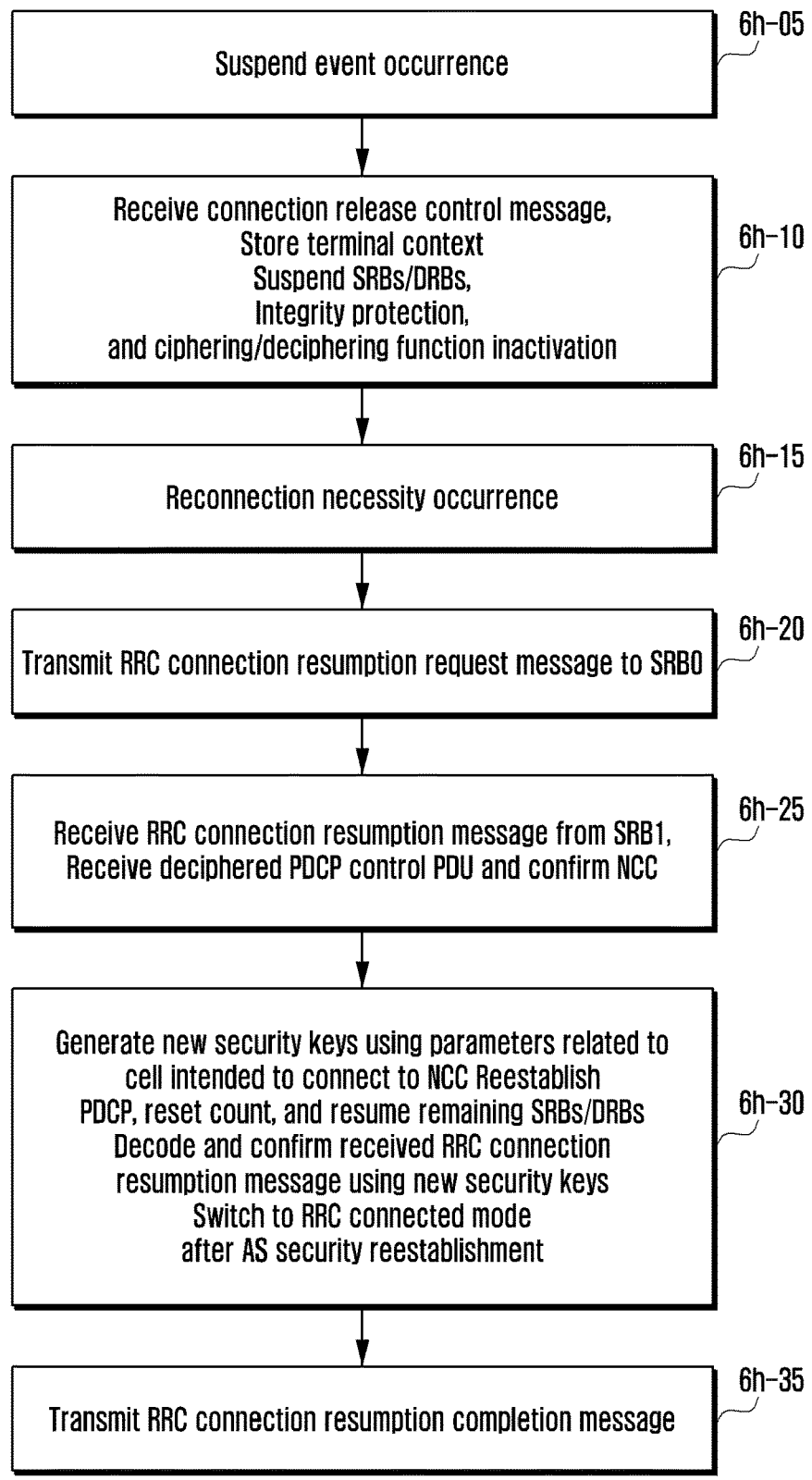
FIG. 6H is a diagram explaining an operation of a terminal according to the (6-2)-th embodiment of the present disclosure.

FIG. 6H is a diagram explaining the operation of a terminal according to the (6-2)-th embodiment of the present disclosure.

Referring to FIG. 6H, if the base station determines to suspend an RRC connection of the terminal in a state where the terminal and the network transmit/receive data to/from each other, at operation 6h-05, and transmits an RRC control message (RRC connection release message) including specific control information to the terminal, the terminal receives the RRC control message, at operation 6h-10. The specific information of the RRC connection release message may be a resume identity to be used when the terminal resumes the RRC connection and paging region information. The terminal that has received the RRC control message (RRC connection release message) including the control information suspends all SRBs and DRBs, and stores the terminal context. The terminal context (that is also called a UE context) may include, for example, radio bearer configuration information, security key information, and radio measurement configuration information.

Then, the terminal performs an operation of determining whether to continuously stay in the current cell or to move to a new cell, i.e., cell reselection operation, in consideration of the downlink channel quality of the current serving cell and the downlink channel quality of a neighbor cell. If a specific reason for resuming the connection occurs at a certain time, for example, if new uplink data occurs in the terminal, at operation 6h-15, the terminal starts a random access process in the current serving cell to resume the RRC connection, at operation 6h-20. In the random access process, the terminal is allocated with the uplink transmission resource for transmitting the specific RRC control message from the base station, and sends the RRC control message to the base station, at operation 6h-20. The RRC control message is a control message for requesting the RRC connection resumption, and may include information on resume identity (hereinafter referred to as resume ID) allocated at operation 6h-10, resumeCause, and shortResumeMAC-1. The control message is transmitted through uplink SRB0. The base station that has received the control message identifies the old base station that stores the terminal context through checking of the resume ID, receives the terminal context from the base station, and receives new security keys and NCC through operations 6g-30, 6g-35, and 6g-40. The new base station may generate an unencrypted PDCP control PDU in order to transfer the NCC information to a terminal that does not know the new security configuration. The PDCP control PDU may include the NCC information. The base station transmits a control message for instructing the terminal to resume the RRC connection in order to resume the RRC connection through applying of SRB1 configuration, SRB2 configuration, and DRB configuration using the terminal context and the new security keys, and also transmits the unencrypted PDCP control PDU including the NCC. The control message is transmitted through SRB1, and the PDCP generates a MAC-I using the current new security key, and transmits the MAC-I in a state where the MAC-I is appended at the back of the RRC control message. The control message may include the NCC.

Since the terminal that has received the control message is unable to decode the control message, it first receives the NCC from the unencrypted PDCP control PDU, at operation 6h-25 to transfer the NCC to an RRC layer, and the RRC layer generates new security keys using the NCC, target PCI and target frequency of the current cell, at operation 6h-30. The security keys may include KeNB*. Further, in order to apply the new security keys, the PDCP and RLC of the SRB1 are reestablished. The terminal performs integrity verification through checking of the MAC-I based on the generated new security key and the PDCP of the established SRB1, and resumes the RRC connection using the information in the control message, at operation 6h-30. More specifically, the terminal resumes the operations of the SRB2 and DRBs, and reestablishes RLC devices and PDCP devices of the SRB2 and DRBs to apply the newly generated security keys. The reestablishment of the RLC device means initialization of an RLC serial number and various kinds of variables, and the reestablishment of the PDCP device means initialization of a PDCP serial number and HFN to "0". After completion of the above-described procedure, the terminal sends a control message indicating that the resumption of the RRC connection has been completed to the base station, at operation 6h-35.

Figure 6I:
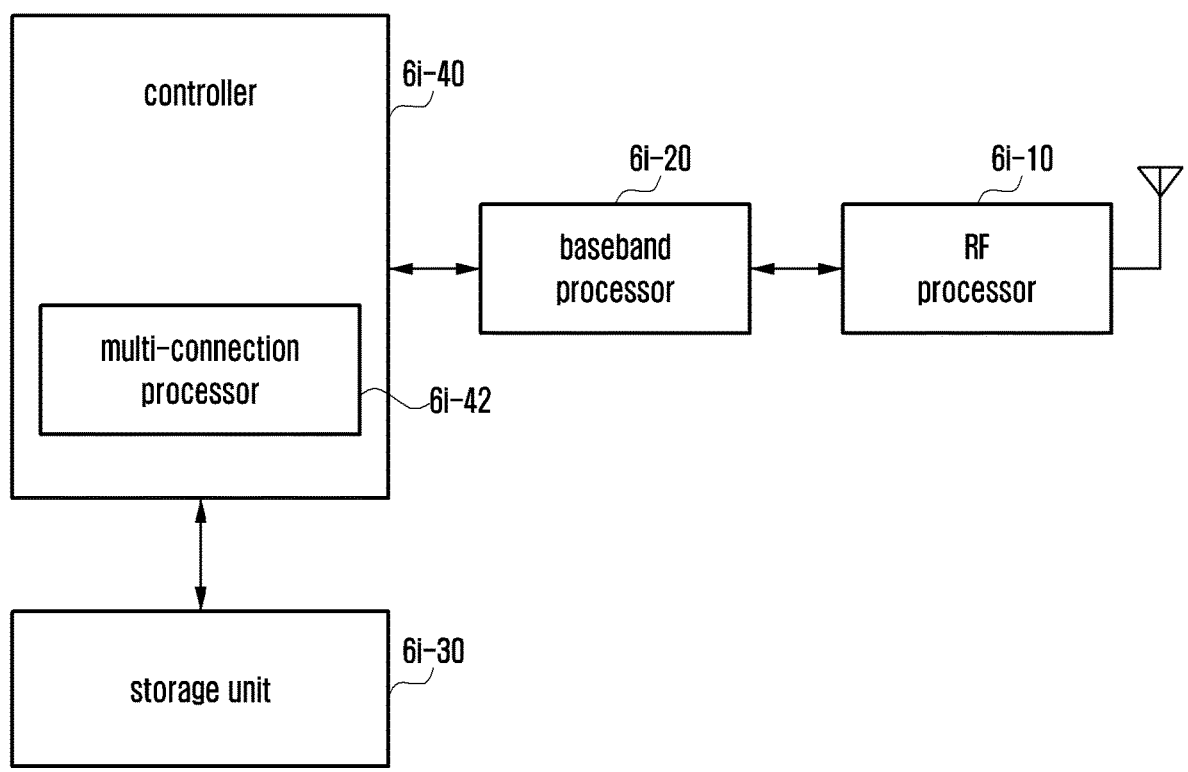
FIG. 6I is a diagram illustrating a configuration of a terminal according to an embodiment of the present disclosure.

FIG. 6I is a diagram illustrating the configuration of a terminal according to an embodiment of the present disclosure.

Referring to FIG. 6I, the terminal includes an RF processor 6i-10, a baseband processor 6i-20, a storage unit 6i-30, and a controller 6i-40.

The RF processor 6i-10 performs a function for transmitting and receiving a signal through a radio channel, such as signal band conversion and amplification. That is, the RF processor 6i-10 performs up-conversion of a baseband signal provided from the baseband processor 6i-20 into an RF-band signal to transmit the converted signal to an antenna, and performs down-conversion of the RF-band signal received through the antenna into a baseband signal. For example, the RF processor 6i-10 may include a transmission filter, a reception filter, an amplifier, a mixer, an oscillator, a DAC, and an ADC. Although only one antenna is illustrated in the drawing, the terminal may be provided with a plurality of antennas. Further, the RF processor 6i-10 may include a plurality of RF chains.

The baseband processor 6i-20 performs conversion between a baseband signal and a bit string in accordance with the PHY standard of the system. For example, during data transmission, the baseband processor 6i-20 generates complex symbols by encoding and modulating a transmitted bit string. Further, during data reception, the baseband processor 6i-20 restores a received bit string by demodulating and decoding the baseband signal provided from the RF processor 6i-10. For example, in the case of following an OFDM method, during data transmission, the baseband processor 6i-20 generates complex symbols by encoding and modulating a transmitted bit string, performs mapping of the complex symbols on subcarriers, and then configures OFDM symbols through the IFFT operation and CP insertion. Further, during data reception, the baseband processor 6i-20 divides the baseband signal provided from the RF processor 6i-10 in the unit of OFDM symbols, restores the signals mapped on the subcarriers through the FFT operation, and then restores the received bit string through demodulation and decoding.

The baseband processor 6i-20 and the RF processor 6i-10 transmit and receive the signals as described above. Accordingly, the baseband processor 6i-20 and the RF processor 6i-10 may be called a transmitter, a receiver, a transceiver, or a communication unit. Further, in order to support different radio connection technologies, at least one of the baseband processor 6i-20 and the RF processor 6i-10 may include a plurality of communication modules. Further, in order to process signals of different frequency bands, at least one of the baseband processor 6i-20 and the RF processor 6i-10 may include different communication modules.

The storage unit 6i-30 stores therein a basic program for an operation of the terminal, application programs, and data of configuration information. The storage unit 6i-30 provides stored data in accordance with a request from the controller 6i-40.

The controller 6i-40 controls the whole operation of the terminal. For example, the controller 6i-40 transmits and receives signals through the baseband processor 6i-20 and the RF processor 6i-10. Further, the controller 6i-40 records or reads data in or from the storage unit 6i-30. Further, the controller 6i-40 controls suspension and operation resumption of the SRB and DRB. For this, the controller 6i-40 may include at least one processor. For example, the controller 6i-40 may include a CP performing a control for communication and an AP controlling an upper layer, such as an application program. The controller 6i-40 may include a multi-connection processor 6i-42.

Figure 6J:
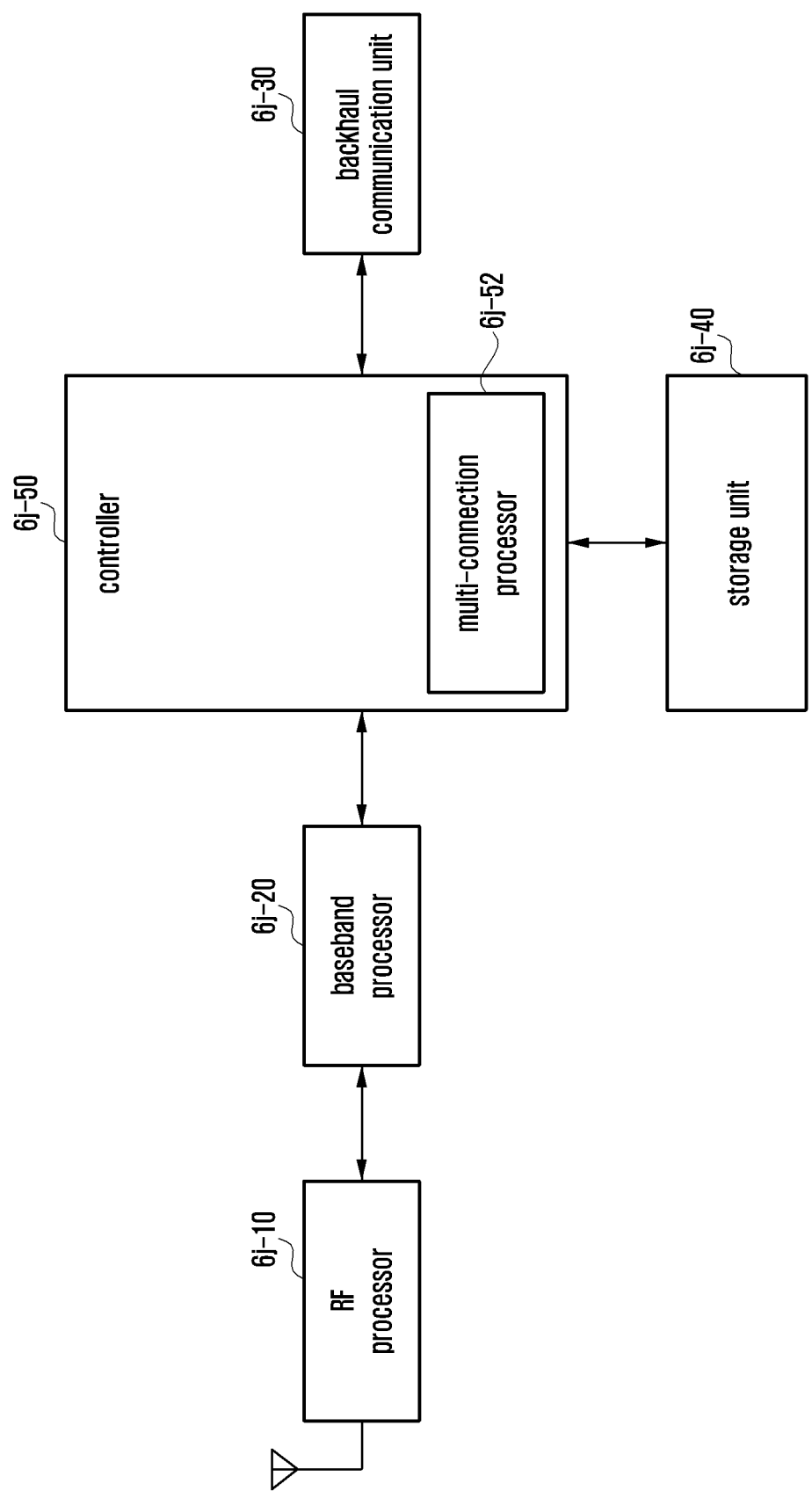
FIG. 6J is a diagram illustrating a configuration of a base station in a wireless communication system according to an embodiment of the present disclosure.

FIG. 6J is a diagram illustrating the configuration of a base station according to an embodiment of the present disclosure.

Referring to FIG. 6J, the base station includes an RF processor 6j-10, a baseband processor 6j-20, a backhaul communication unit 6j-30, a storage unit 6j-40, and a controller 6j-50.

The RF processor 6j-10 performs a function for transmitting and receiving a signal through a radio channel, such as signal band conversion and amplification. That is, the RF processor 6*j*-10 performs up-conversion of a baseband signal provided from the baseband processor 6*j*-20 into an RF-band signal to transmit the converted signal to an antenna, and performs down-conversion of the RF-band signal received through the antenna into a baseband signal. For example, the RF processor 6*j*-10 may include a transmission filter, a reception filter, an amplifier, a mixer, an oscillator, a DAC, and an ADC. Although only one antenna is illustrated in the drawing, the first connection node may be provided with a plurality of antennas. Further, the RF processor 6*j*-10 may include a plurality of RF chains.

The baseband processor 6*j*-20 performs conversion between a baseband signal and a bit string in accordance with the PHY standard of the first radio connection technology. For example, during data transmission, the baseband processor 6*j*-20 generates complex symbols by encoding and modulating a transmitted bit string. Further, during data reception, the baseband processor 6*j*-20 restores a received bit string by demodulating and decoding the baseband signal provided from the RF processor 6*j*-10. For example, in the case of following an OFDM method, during data transmission, the baseband processor 6*j*-20 generates complex symbols by encoding and modulating a transmitted bit string, performs mapping of the complex symbols on subcarriers, and then configures OFDM symbols through the IFFT operation and CP insertion. Further, during data reception, the baseband processor 6*j*-20 divides the baseband signal provided from the RF processor 6*j*-10 in the unit of OFDM symbols, restores the signals mapped on the subcarriers through the FFT operation, and then restores the received bit string through demodulation and decoding. The baseband processor 6*j*-20 and the RF processor 6*j*-10 transmit and receive the signals as described above. Accordingly, the baseband processor 6*j*-20 and the RF processor 6*j*-10 may be called a transmitter, a receiver, a transceiver, or a communication unit.

The backhaul communication unit 6*j*-30 provides an interface for performing communication with other nodes in the network.

The storage unit 6*j*-40 stores therein a basic program for an operation of the master base station, application programs, and data of configuration information. In particular, the storage unit 6*j*-40 may store information on a bearer allocated to the connected terminal and the measurement result reported from the connected terminal. Further, the storage unit 6*j*-40 may store information that becomes a basis of determination whether to provide or suspend a multi-connection to the terminal. Further, the storage unit 6*j*-40 provides stored data in accordance with a request from the controller 6*j*-50.

The controller 6*j*-50 controls the whole operation of the master base station. For example, the controller 6*j*-50 transmits and receives signals through the baseband processor 6*j*-20 and the RF processor 6*j*-10 or through the backhaul communication unit 6*j*-30. Further, the controller 6*j*-50 records or reads data in or from the storage unit 6*j*-40. For this, the controller 6*j*-50 may include at least one processor. The controller 6*j*-50 may include a multi-connection processor 6*j*-52.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method performed by a terminal in a wireless communication system, the method comprising:
   receiving a radio resource control (RRC) release message for a suspension of an RRC connection, the RRC release message including a resume identity and a next hop chaining count (NCC);
   performing a procedure associated with a transmission of an RRC resume request message for requesting a resumption of the RRC connection suspended based on the RRC release message,
   wherein the performing of the procedure includes:
      updating a security key based on the NCC,
      reestablishing a packet data convergence protocol (PDCP) entity for an SRB 1 based on the security key, and
      transmitting, to a base station, the RRC resume request message including the resume identity through a signaling radio bearer (SRB) 0;
   receiving, from the base station, an RRC resume message through the SRB 1 as a response to a transmission of the RRC resume request message; and
   resuming, if the RRC resume message is received, an SRB 2 and at least one data radio bearer (DRB),
   wherein the RRC resume message is ciphered based on the security key.

2. The method of claim 1, further comprising:
   deciphering the RRC resume message based on the security key.

3. The method of claim 1, further comprising:
   resuming the SRB 1.

4. The method of claim 1, further comprising:
   restoring, in response to the reception of the RRC resume message, a PDCP entity for the SRB 2 and a PDCP entity for the at least one DRB.

5. The method of claim 1, further comprising:
   suspending, in response to reception of the RRC release message, SRBs and DRBs except SRB 0;
   storing a context for the terminal; and
   entering an RRC inactive state.

6. The method of claim 1, further comprising:
   identifying whether to trigger an RRC resume procedure;
   transmitting a random access preamble if the RRC resume procedure triggered; and
   receiving a random access response for transmitting the RRC resume request message,
   wherein the RRC release message includes paging area information, and
   wherein the RRC resume request message includes a resume cause and a resume message authentication code—integrity (MAC-I).

7. A terminal in a wireless communication system, the terminal comprising:
   a transceiver; and
   a controller configured to:
      receive, via the transceiver, a radio resource control (RRC) release message for a suspension of an RRC connection, the RRC release message including a resume identity and a next hop chaining count (NCC),
      perform a procedure associated with a transmission of an RRC resume request message for requesting a resumption of the RRC connection suspended based on the RRC release message, wherein, for performing the procedure, the controller is configured to:
update a security key based on the NCC,
reestablish a packet data convergence protocol (PDCP) entity for an SRB 1 based on the security key, and
transmit, to a base station via the transceiver, the RRC resume request message including the resume identity through a signaling radio bearer (SRB) 0,
receive, from the base station via the transceiver, an RRC resume message through the SRB 1 as a response to a transmission of the RRC resume request message, and
resume, if the RRC resume message is received, an SRB 2 and at least one data radio bearer (DRB),
wherein the RRC resume message is ciphered based on the security key.

8. The terminal of claim 7, wherein the controller is further configured to:
decipher the RRC resume message based on the security key.

9. The terminal of claim 7, wherein the controller is further configured to
resume the SRB 1.

10. The terminal of claim 7, wherein the controller is further configured to:
restore, in response to the reception of the RRC resume message, a PDCP entity for the SRB 2 and a PDCP entity for the at least one DRB.

11. The terminal of claim 7, wherein the controller is further configured to:
suspend, in response to reception of the RRC release message, SRBs and DRBs except SRB 0,
store a context for the terminal, and
enter an RRC inactive state.

12. The terminal of claim 7,
wherein the controller is further configured to:
identify whether to trigger an RRC resume procedure,
transmit a random access preamble if the RRC resume procedure triggered, and
receive a random access response for transmitting the RRC resume request message,
wherein the RRC release message includes paging area information, and
wherein the RRC resume request message includes a resume cause and a resume message authentication code—integrity (MAC-I).

* * * * *